(12) United States Patent
Harutyunyan et al.

(10) Patent No.: US 10,592,372 B2
(45) Date of Patent: Mar. 17, 2020

(54) CONFIDENCE-CONTROLLED SAMPLING METHODS AND SYSTEMS TO ANALYZE HIGH-FREQUENCY MONITORING DATA AND EVENT MESSAGES OF A DISTRIBUTED COMPUTING SYSTEM

(71) Applicant: VMware, Inc., Palo Alto, CA (US)

(72) Inventors: Ashot Nshan Harutyunyan, Yerevan (AM); Arnak Poghosyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 185 days.

(21) Appl. No.: 15/652,705

(22) Filed: Jul. 18, 2017

(65) Prior Publication Data

US 2019/0026206 A1 Jan. 24, 2019

(51) Int. Cl.
*G06F 11/00* (2006.01)
*G06F 11/30* (2006.01)
(Continued)

(52) U.S. Cl.
CPC ...... *G06F 11/3006* (2013.01); *G06F 11/0781* (2013.01); *G06F 11/3034* (2013.01);
(Continued)

(58) Field of Classification Search
CPC ............ G06F 11/3006; G06F 11/3034; G06F 11/3051; G06F 11/3452; G06F 11/30;
(Continued)

(56) References Cited

U.S. PATENT DOCUMENTS 6,601,048 B1 * 7/2003 Gavan ................ H04J 3/175
379/111
8,006,302 B2 * 8/2011 Abeni ................ H04L 63/1408
726/22

(Continued)

OTHER PUBLICATIONS

Jiang et al., "Ranking the importance of alerts for problem determination in large computer systems." Cluster Computing 14, No. 3 (2011): 213-227. (Year: 2011).*

(Continued)

*Primary Examiner* — Anthony J Amoroso

(57) ABSTRACT

Methods and systems of automatic confidence-controlled sampling to analyze, detect anomalies and problems in monitoring data and event messages generated by sources of a distributed computing system are described. A source can be virtual or physical object of the distributed computing system, a resource of the distributed computing system, or an event source running in the distributed computing. Monitoring data includes metric data generated by resources and data that represents meta-data properties of event sources. Confidence-controlled sampling is used to determine characteristics of the monitoring data, identify periodic patterns in the behavior of a source, detect changes in behavior of a source, and compare the behavior of two sources. Confidence-controlled sampling speeds up characterization the data sets, determination of behavior patterns, and detection and reporting of anomalies and problems of the resources and event sources of the distributed computing system.

24 Claims, 43 Drawing Sheets

(51) Int. Cl.
*G06F 11/34* (2006.01)
*G06F 11/07* (2006.01)

(52) U.S. Cl.
CPC ...... *G06F 11/3051* (2013.01); *G06F 11/3452* (2013.01); *G06F 2201/815* (2013.01)

(58) Field of Classification Search
CPC .. G06F 11/3003; G06F 11/301; G06F 11/302; G06F 11/3037; G06F 11/3055; G06F 11/3058; G06F 11/3065; G06F 11/3089; G06F 11/3093; G06F 11/3096; G06F 11/34; G06F 11/3404; G06F 11/0781; G06F 11/3072; G06F 2201/815; H04L 41/06; H04L 41/0609; H04L 41/0631; H04L 41/064; H04L 43/022; H04L 43/024; H04L 43/04; H04L 43/065; H04L 43/067; H04L 43/08; H04L 43/0817; H04L 43/0823
See application file for complete search history.

(56) References Cited

U.S. PATENT DOCUMENTS

| | | | | |
|---|---|---|---|---|
| 8,098,585 | B2* | 1/2012 | Jiang | G06F 11/0709 370/241 |
| 2002/0135484 | A1* | 9/2002 | Ciccolo | G08B 13/19613 340/573.1 |
| 2003/0095687 | A1* | 5/2003 | Montgomery | G06K 9/00362 382/103 |

OTHER PUBLICATIONS

Marvasti, et al., "An Enterprise Dynamic Threshold System," 11th International Conference on Autonomic Computing (ICAC '14), Jun. 18-20, 2014, pp. 128-135 (Year: 2014).*
Burns, L., et al. "Towards discovery of event correlation rules." 2001 IEEE/IFIP International Symposium on Integrated Network Management Proceedings. Integrated Network Management VII. Integrated Management Strategies for the New Millennium (Cat. No. 01EX470). IEEE, 2001. (Year: 2001).*
Xu, Wei, Ling Huang, Armando Fox, David Patterson, and Michael Jordan. "Online system problem detection by mining patterns of console logs." In 2009 Ninth IEEE International Conference on Data Mining, pp. 588-597. IEEE, 2009. (Year: 2009).*
Kelkar, Anuja, Utkarsh Naiknaware, Sachin Sukhlecha, Ashish Sanadhya, Maitreya Natu, and Vaishali Sadaphal. "Analytics-Based Solutions for Improving Alert Management Service for Enterprise Systems." In 2013 IEEE 13th International Conference on Data Mining Workshops, pp. 219-227. IEEE, 2013. (Year: 2013).*
Muelder, Chris, Biao Zhu, Wei Chen, Hongxin Zhang, and Kwan-Liu Ma. "Visual analysis of cloud computing performance using behavioral lines." IEEE transactions on visualization and computer graphics 22, No. 6 (2016): 1694-1704. (Year: 2016).*
Shen, Qijun, Jian Cao, and Hua Gu. "A similarity network based behavior anomaly detection model for computer systems." In 2014 IEEE 17th International Conference on Computational Science and Engineering, pp. 1738-1745. IEEE, 2014. (Year: 2014).*
Marvasti, Mazda A., et al., "An Enterprise Dynamic Threshold System," 11th International Conference on Autonomic Computing (ICAC'14), Jun. 18-20, 2014, pp. 128-135.

* cited by examiner

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 15

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 16

```
                                                    ,-1702
       ,-1708    ,-1710     :      ,-1712
                            .
2013-12-02T10:44:24.095Z li-qe-esx5.vmware.com Rhttpproxy:
[28959B90 verbose 'Proxy Req 46691'] Connected to           ,-1704
localhost:8307                              -1706

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 17

CONFIDENCE-CONTROLLED SAMPLING METHODS AND SYSTEMS TO ANALYZE HIGH-FREQUENCY MONITORING DATA AND EVENT MESSAGES OF A DISTRIBUTED COMPUTING SYSTEM

TECHNICAL FIELD

The present disclosure is directed to confidence-controlled sampling in methods and systems that analyzes and detects anomalous behavior and problems in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In order to proactively manage a distributed computing system, system administrators are interested in detecting anomalous behavior in the operation of the disturbed computing system. Management servers have been developed to collect thousands of different metrics from numerous and various resources of a distributed computing system and event messages from numerous and various event sources running in the distributed computing system. Examples of resources include virtual and physical resources, such as CPU, memory, data storage, and network. Examples of the types of metric data include CPU usage, memory, data storage, and network traffic of a virtual or a physical object. An event source can be an application program, an operating system, a virtual machine, or a container. Each event message describes an event, which can be a status report, input, output, warning, fault, or error in the execution of the event source. However, metric data and event messages are recorded by management servers at a high frequency, such as sub-second frequency, creating high density data sets. As a result, the data sets can become extremely large, which increases the cost of data storage and processing. In addition, management servers push the limits of memory, CPU usage and input/output of server computers to process the extremely large data sets, which drastically slows the determination of behavior patterns, detection of anomalies, identification of problems, and characterization of the data and slows implementation of responses to patterns, anomalies, and problems. System administrators seek methods and systems to analyze the enormous amounts of metric data and event messages.

SUMMARY

Methods and systems are directed to automated confidence-controlled sampling of monitoring data and event messages to analyze and detect anomalies and problems in sources of a distributed computing system. A source can be a virtual or physical object of the distributed computing system, a resource of the distributed computing system, or an event source running in the distributed computing system. Monitoring data includes metric data generated by a resource and meta-data of event messages that represents properties of event sources. Monitoring data and event messages generated by a source may be retrieved from a database stored in a data-storage device of a distribution computing system. Confidence-controlled sampling enables random selection of a small number of data points of the monitoring data or event messages with a selected confidence level. Confidence-controlled sample is used to determine characteristics of the monitoring data, which includes determining if the monitoring data is constant, semi-constant, or non-constant monitoring data; determining if the monitoring data is normal or sparse; determining a monitoring interval or the monitoring data (i.e., regular frequency at which the monitoring data is measured); and determining if the monitoring data is trendy or non-trendy. Confidence-controlled sampling is used to identify periodic patterns in the behavior of the source based on either monitoring data or event messages. Confidence-controlled sampling is used to compare the behavior of two sources based on either monitoring data or event messages generated by the two sources in the same time interval. Confidence-controlled sampling is used to detect changes in behavior of a source based on monitoring data or event messages generated in two time intervals. Confidence-controlled sampling speeds up characterization the data sets, speeds up determination of behavior patterns, and speeds up detection and reporting of anomalies and problems associated with the resources and event sources of the distributed computing system without compromising accuracy of the reported results.

DESCRIPTION OF THE DRAWINGS

FIG. 15 shows an example of a log write instruction.

FIG. 16 shows an example of an event message generated by a log write instruction.

FIG. 17 shows a small, eight-entry portion of an event log.

DETAILED DESCRIPTION

Figure 1:
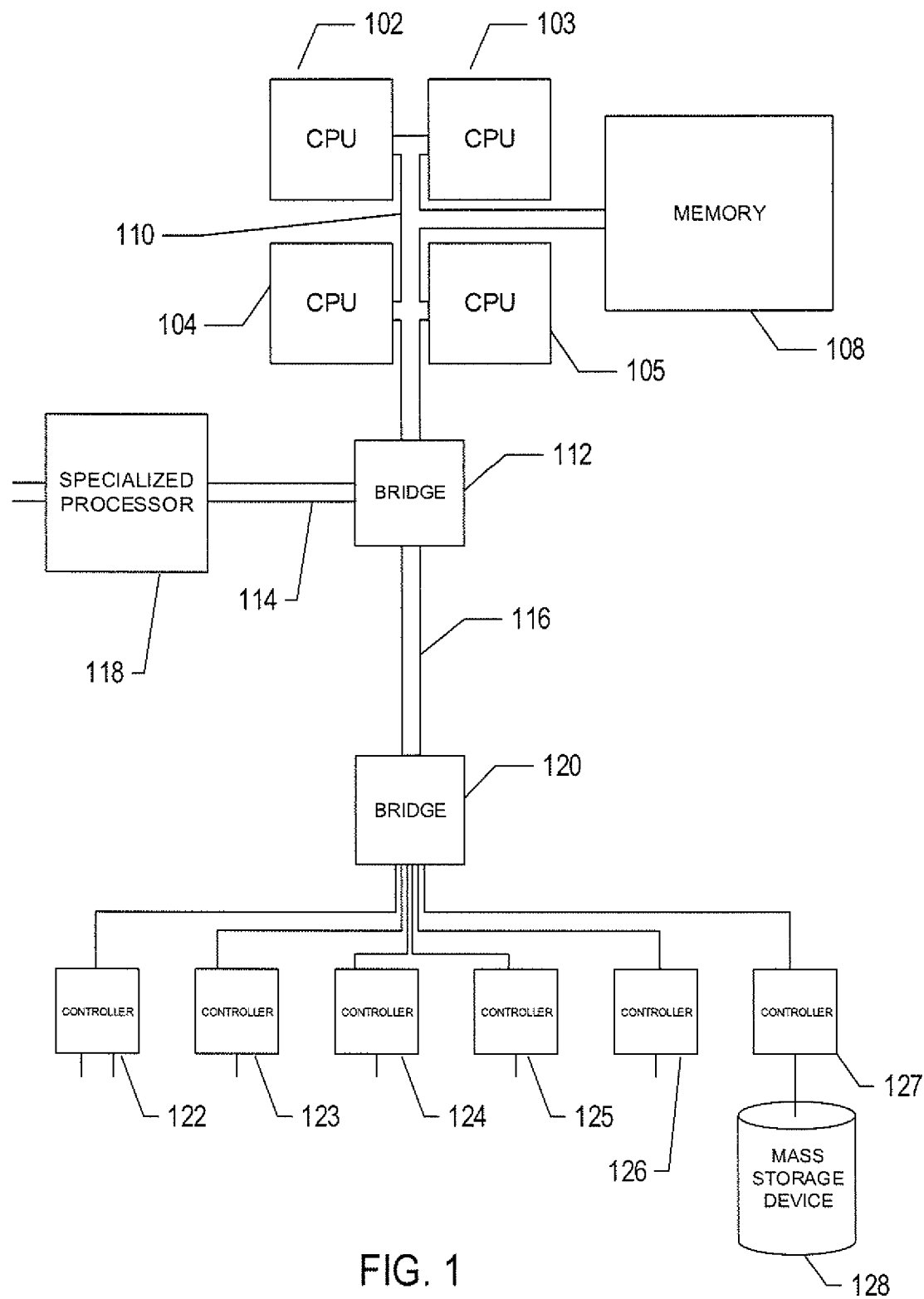
FIG. 1 shows a general architectural diagram for various types of computers.

This disclosure presents automated computational methods and systems to sample, analyze, and detect anomalies in monitoring data of a distributed computing system. In a first subsection, computer hardware, complex computational systems, and virtualization are described. Containers and containers supported by virtualization layers are described in a second subsection. Logging event messages in event logs is described in a third subsection. Methods of confidence-controlled sampling to analyze and detect anomalous behavior and problems from monitoring data and event messages of a distributed computing system are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
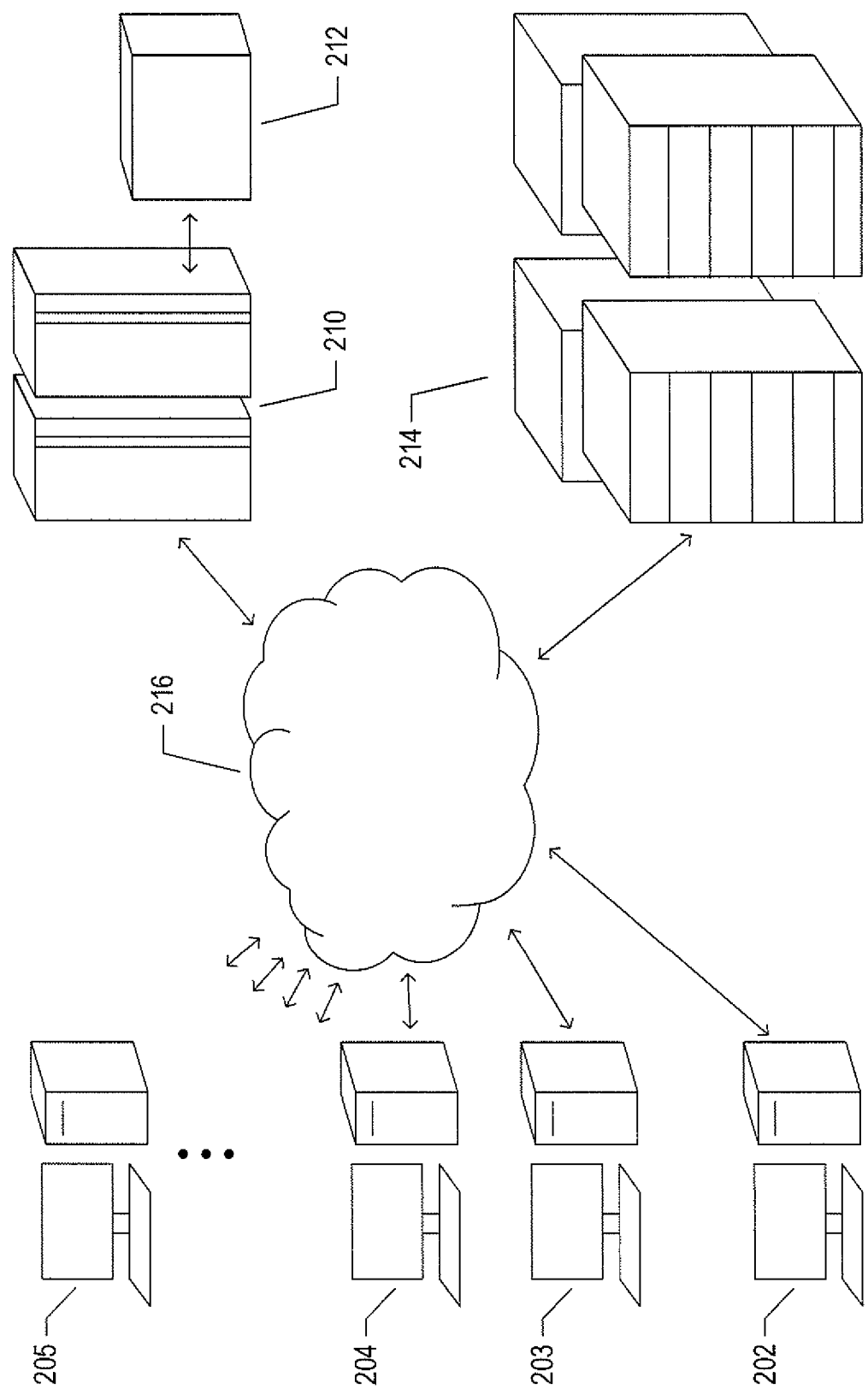
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
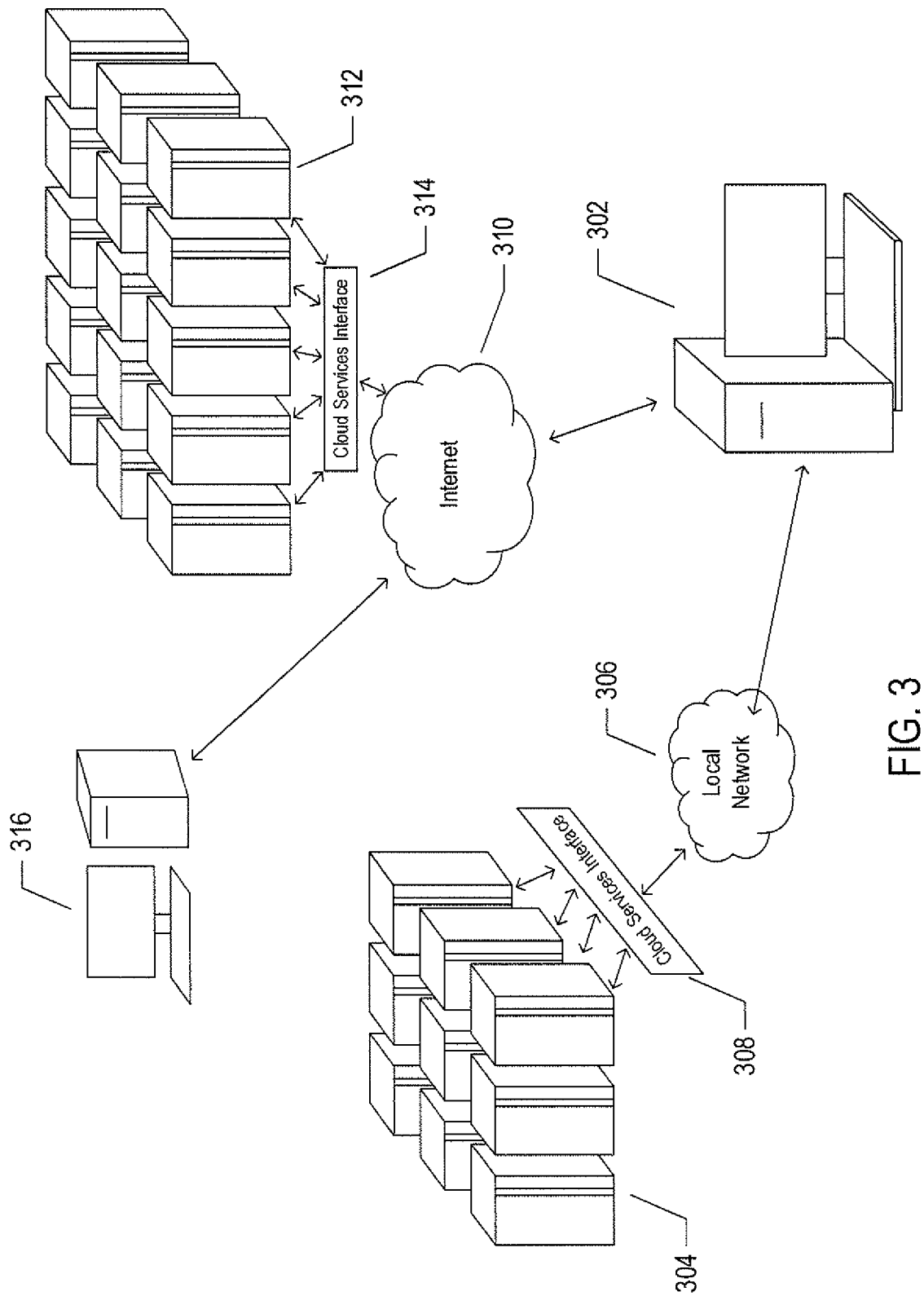
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
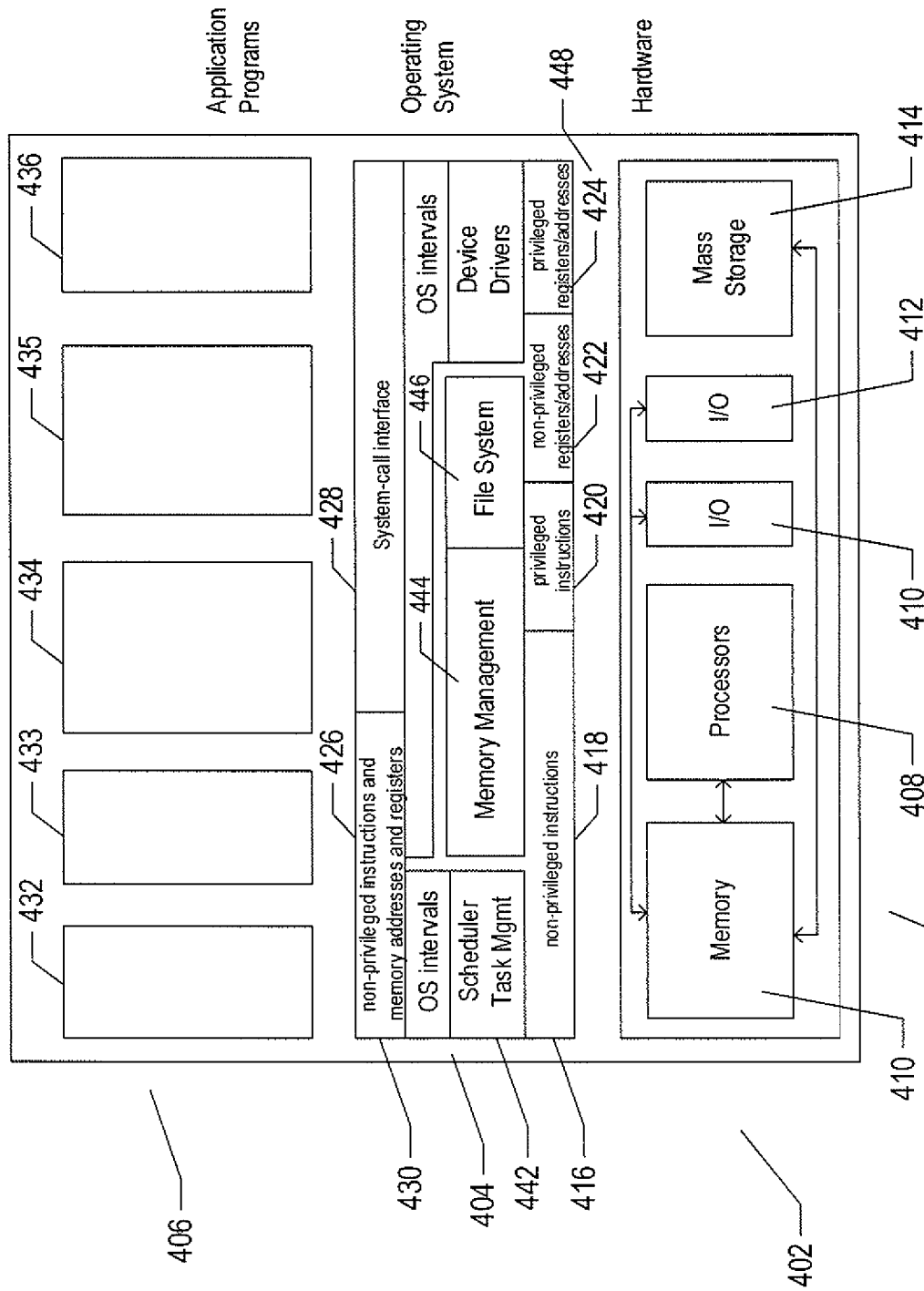
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
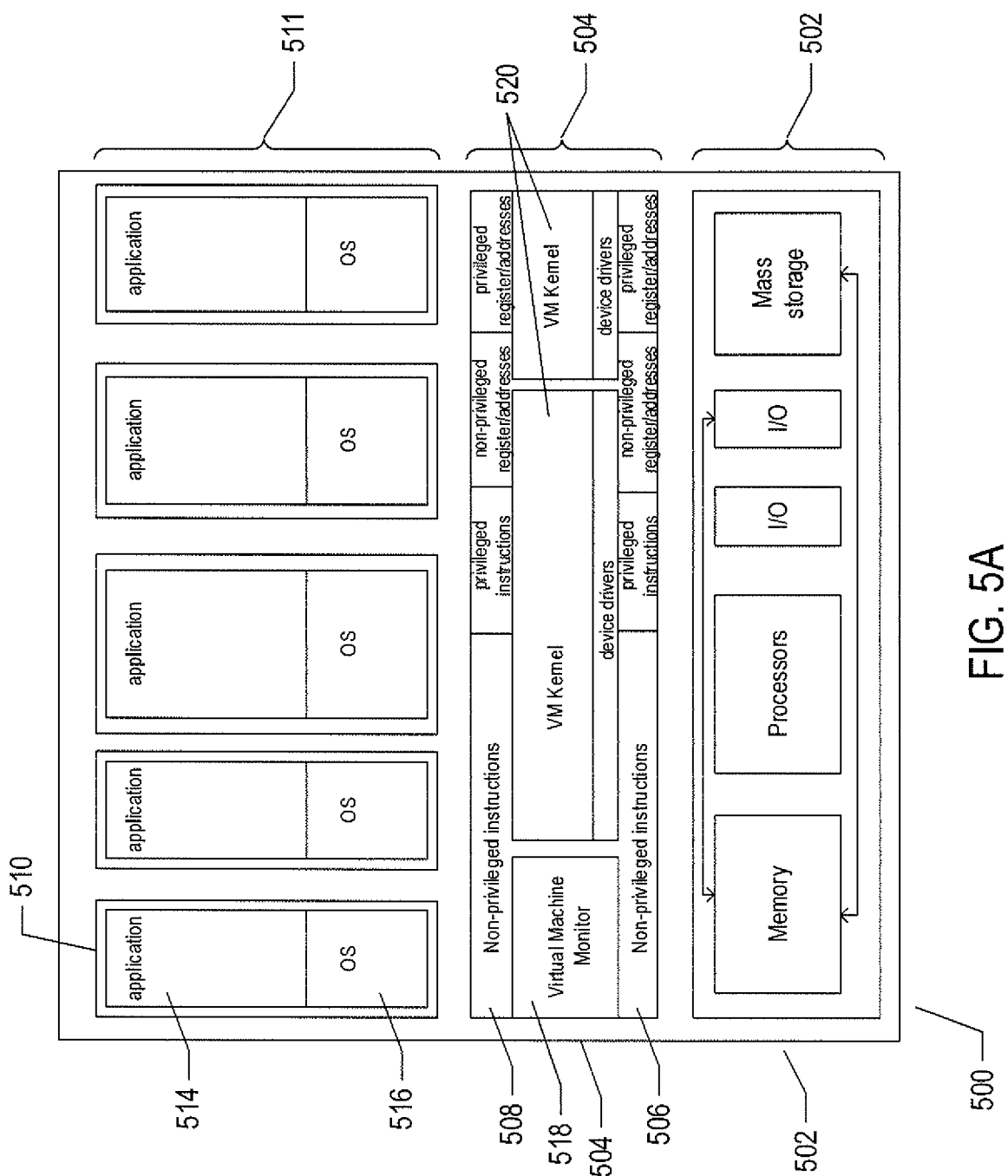
FIGS. 5A-5B show two types of virtual machine ("VM") and VM execution environments.
Figure 5B:
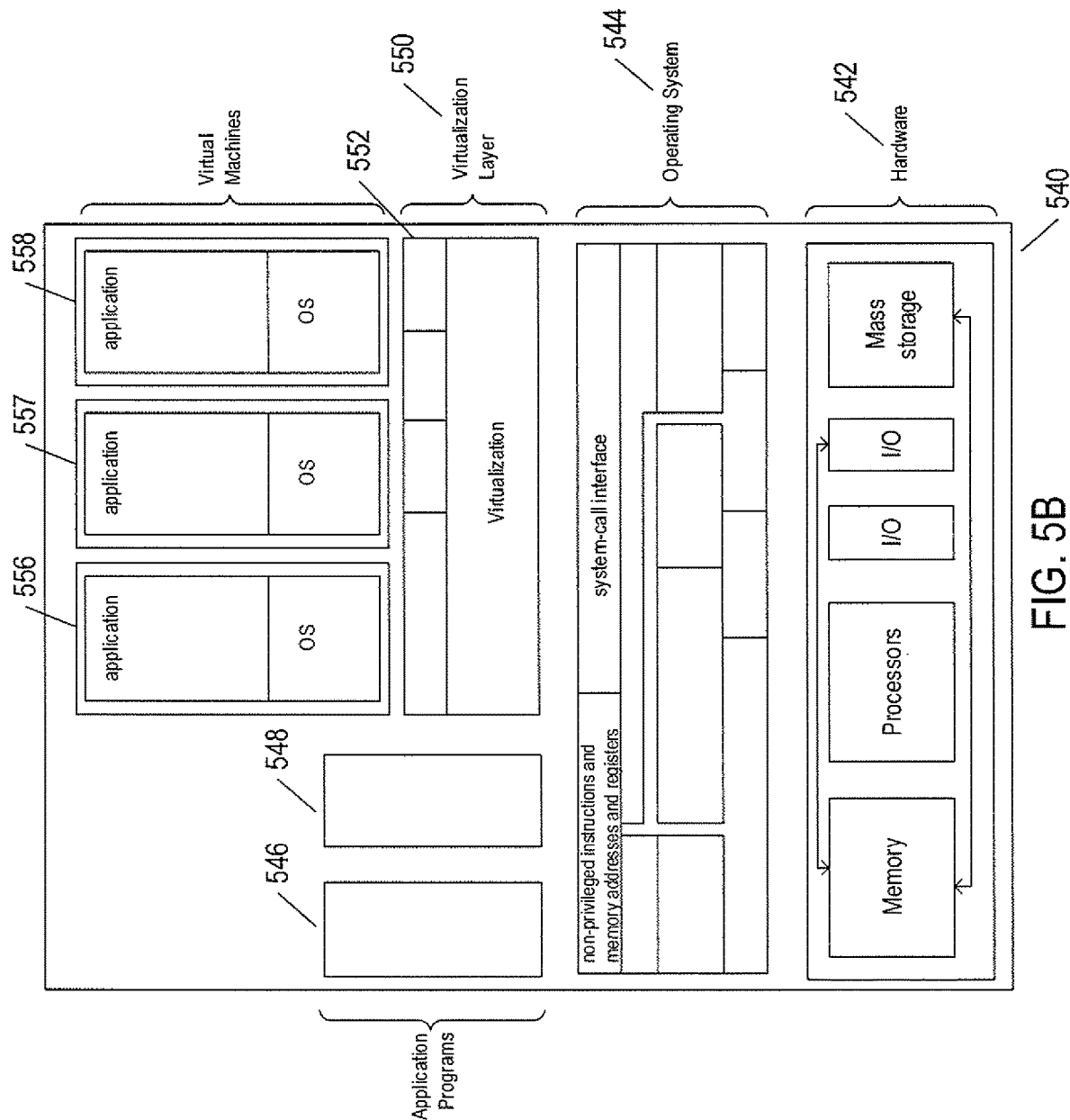

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
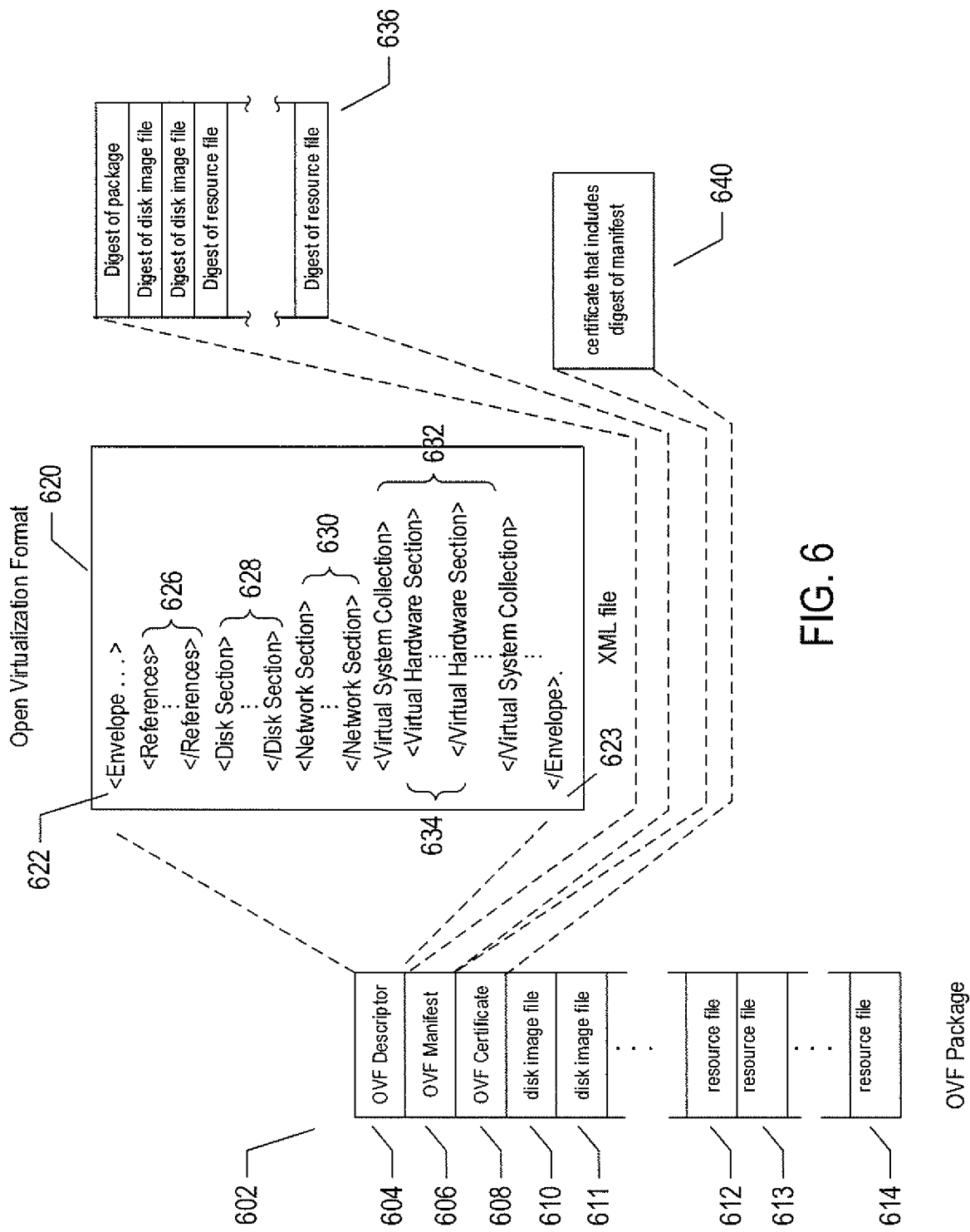
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
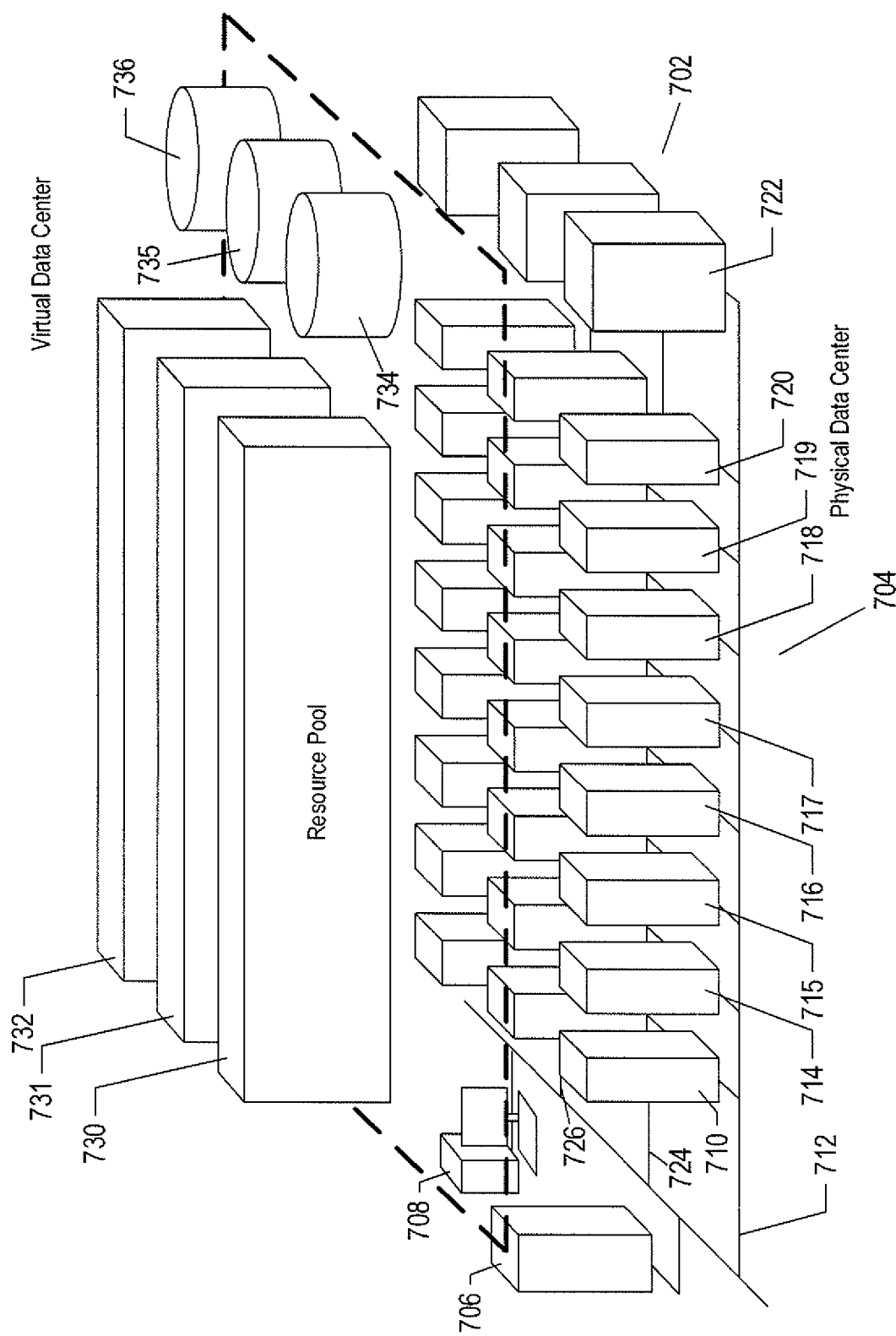
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
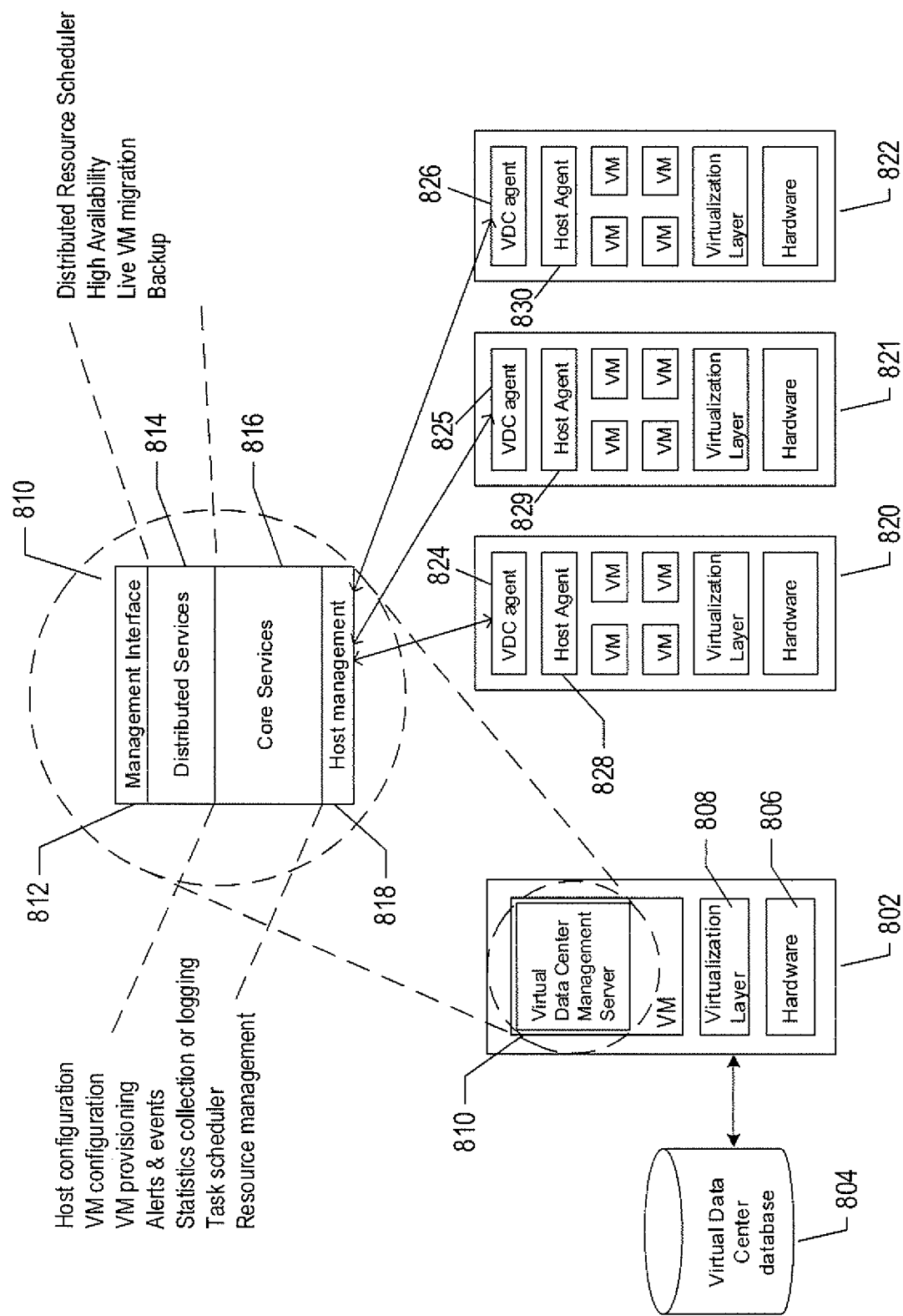
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
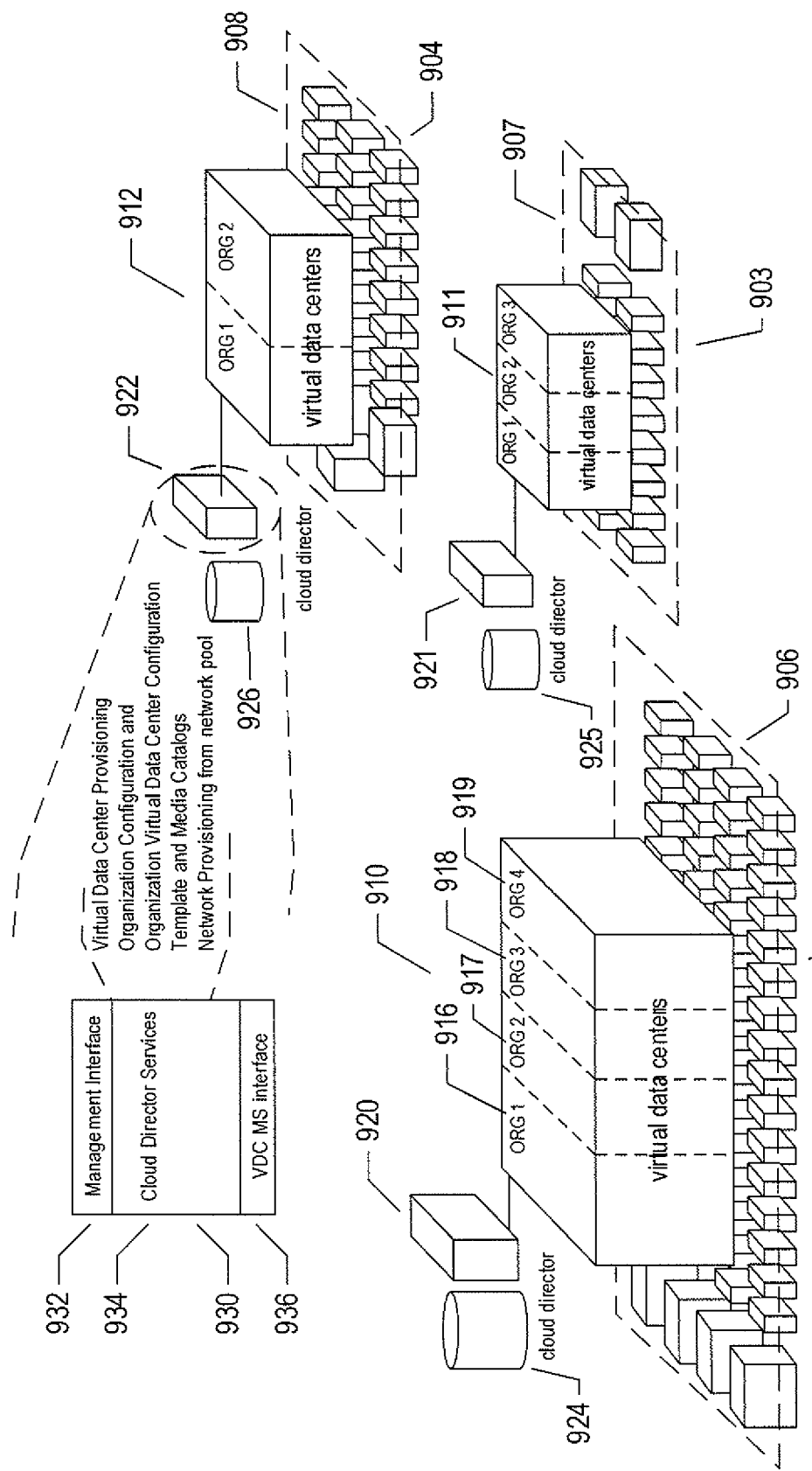
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
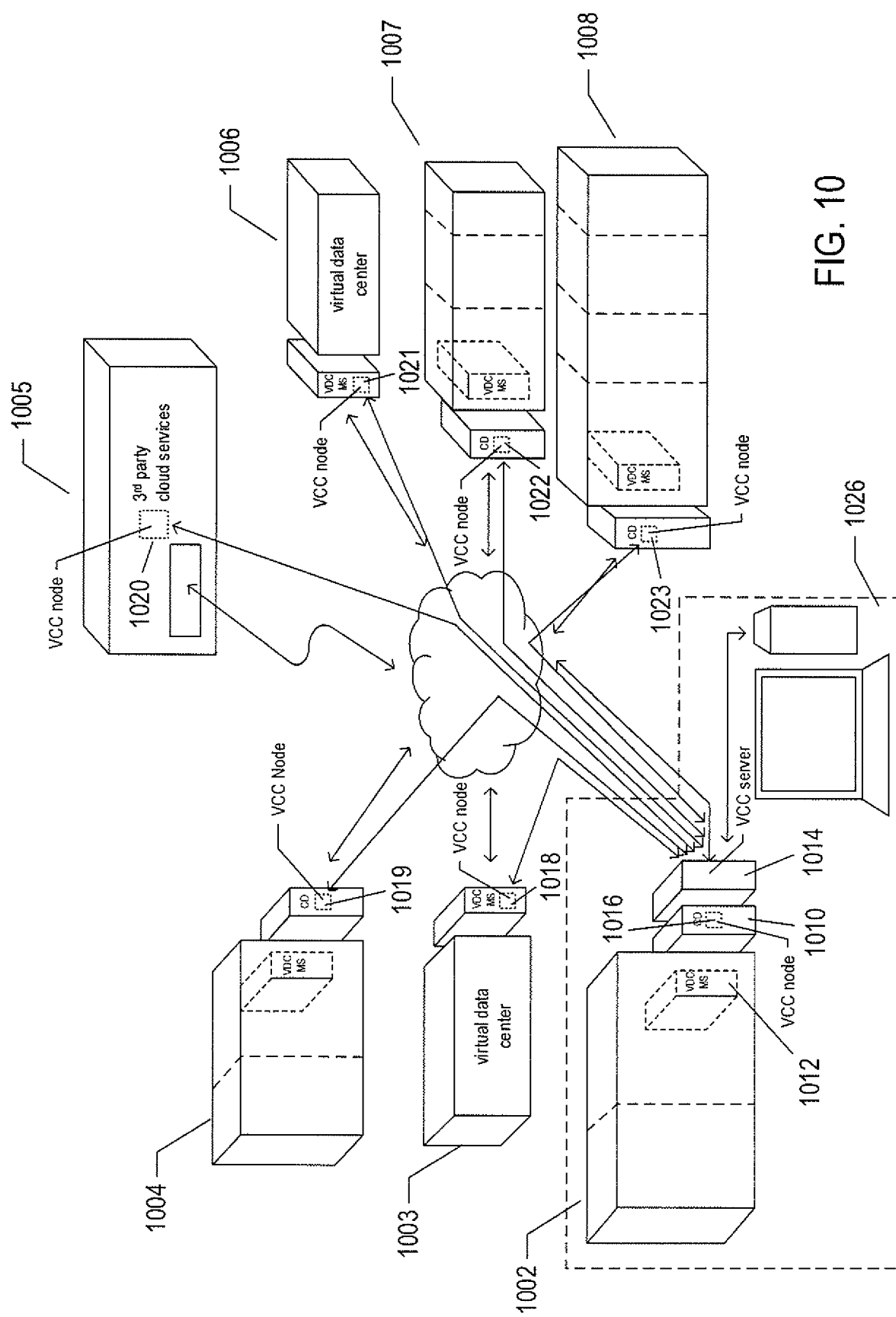
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
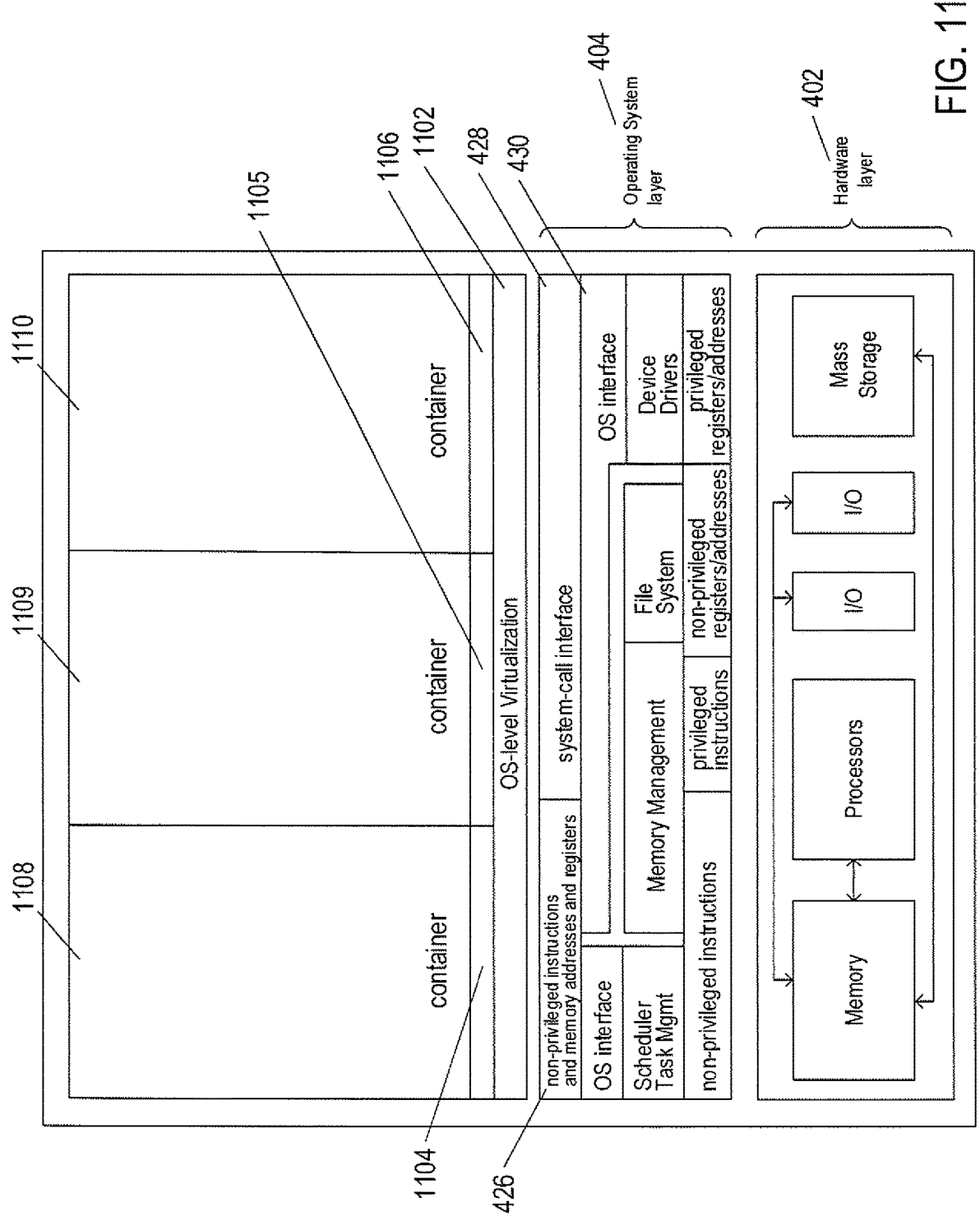
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
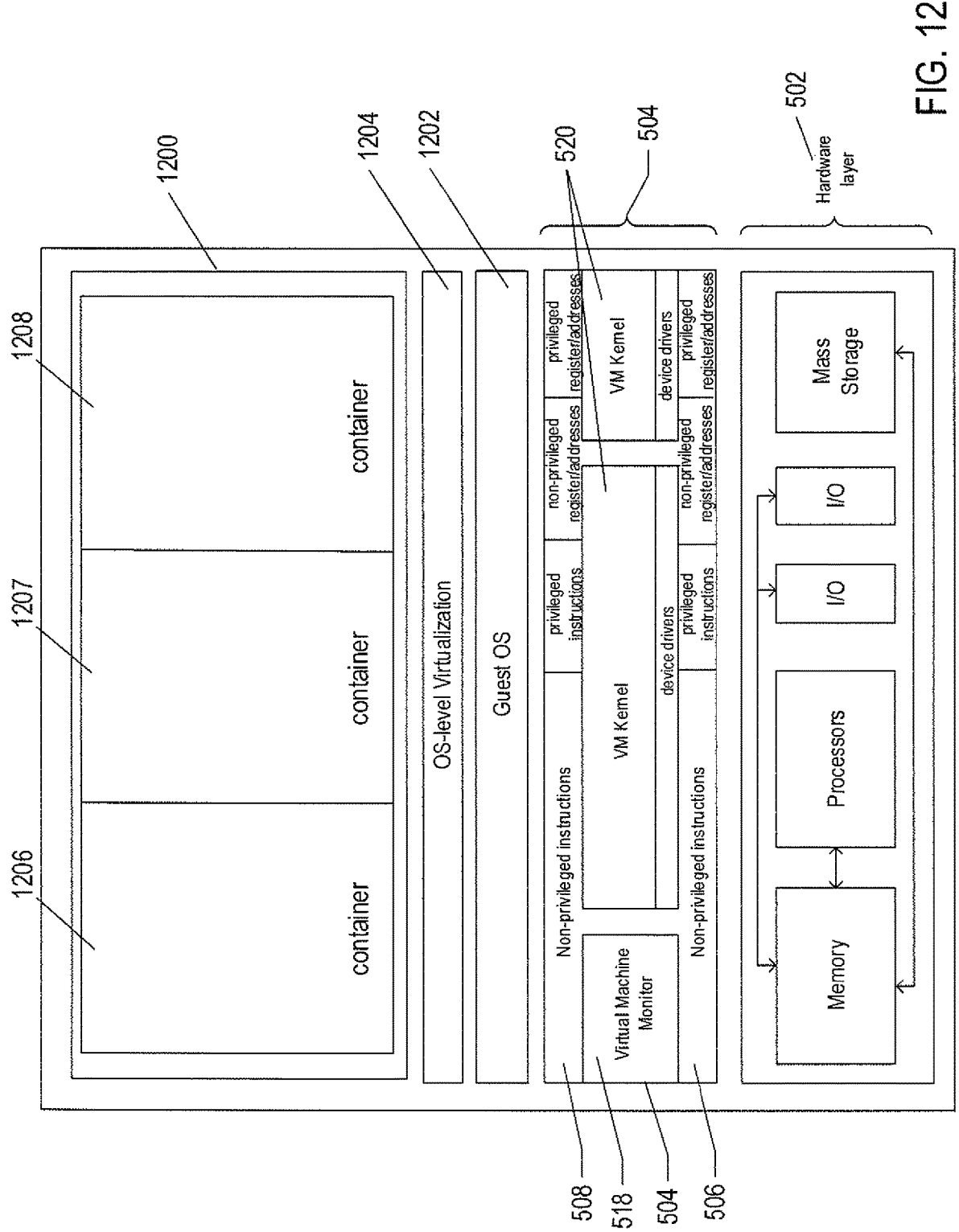
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Event Messages in Event Logs and Determining Event Types

Figure 13:
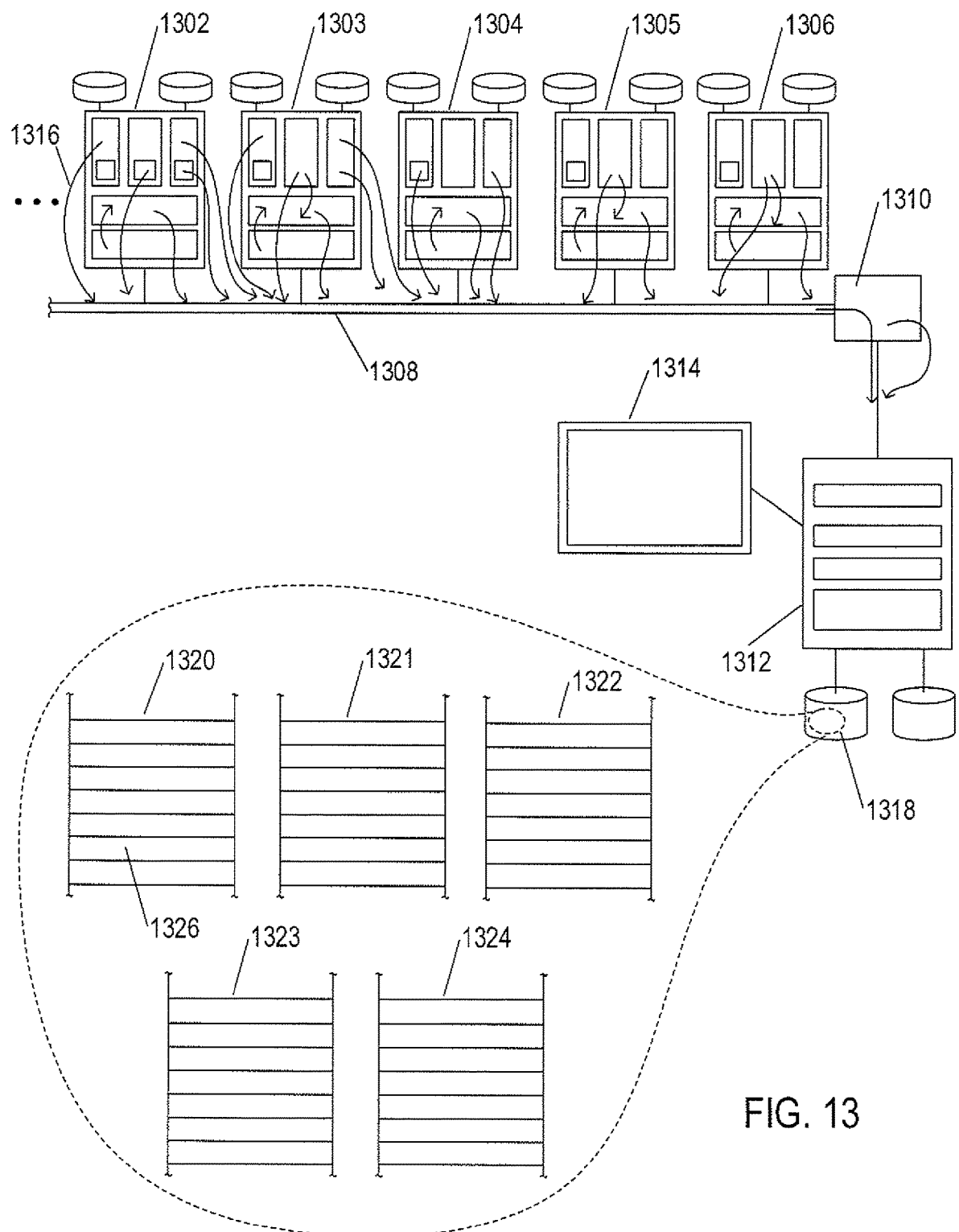
FIG. 13 shows an example of logging event messages in event logs.

FIG. 13 shows an example of logging event messages in event logs. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards event messages to a log management server that runs on the administration console 1314. As indicated by curved arrows, such as curved arrow 1316, multiple components within each of the discrete computer systems 1302-1306 as well as the communications bridge/router 1310 generate event messages that are forwarded to the log management server. Event messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Event messages may be collected at various hierarchical levels within a discrete computer system and then forwarded to the log management server in the administration computer 1312. For example, a log monitoring agent may collect and forward the event messages at various hierarchical levels. The log management server in the administration computer 1312 collects and stores the received event messages in a data-storage device or appliance 1318 as event logs 1320-1324. Rectangles, such as rectangle 1326, represent individual event messages. For example, event log 1320 may comprise a list of event messages generated within the computer system 1302. Each log monitoring agent has an agent monitoring configuration that includes a log path and a log parser. The log path specifies a unique file system path in terms of a directory tree hierarchy that identifies the storage location of an event log associated with the event source on the administrative console 1314 or the data-storage device or appliance 1318. The log monitoring agent receives specific file and event channel log paths to monitor event logs and the log parser includes log parsing rules to extract and format lines of event message into event message fields. The log monitoring agent then sends the constructed structured event messages to the log management server. The administrative console 1314 and computer systems 1302-1306 can function without log monitoring agents and a log management server, but with less precision and certainty.

Figure 14:
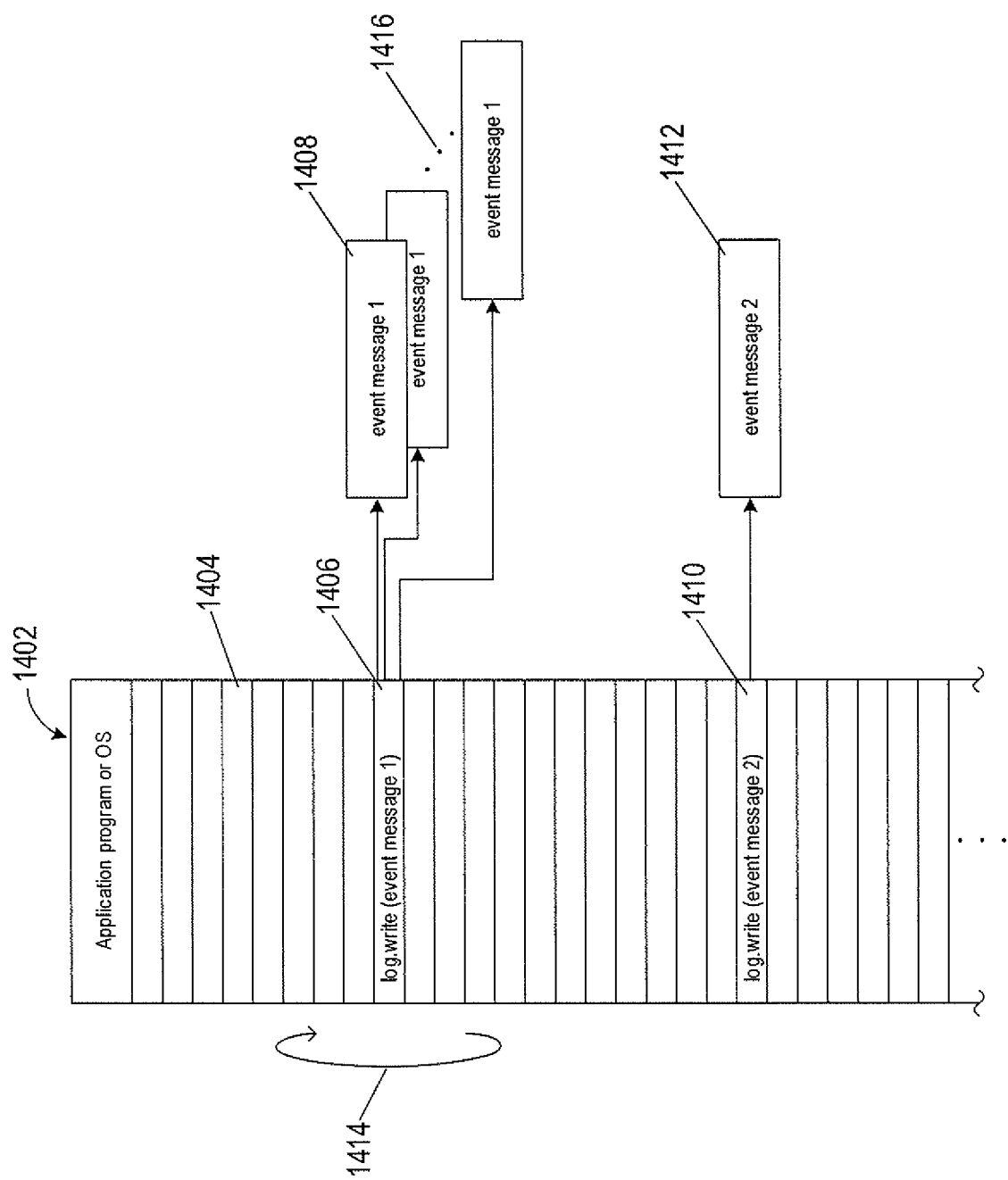
FIG. 14 shows an example of a source code with log write instructions.

FIG. 14 shows an example of a source code 1402 of an application program, an operating system, a VM, a guest operating system, or any other computer program or machine code. The source code 1402 is just one example of an event source that generates event messages. Rectangles, such as rectangle 1404, represent a definition, a comment, a statement, or a computer instruction that expresses some action to be executed by a computer. The source code 1402 includes log write instructions that generate event messages when certain events predetermined by the developer occur during execution of the source code 1402. For example, source code 1402 includes an example log write instruction 1406 that when executed generates an "event message 1" represented by rectangle 1408, and a second example log write instruction 1410 that when executed generates "event message 2" represented by rectangle 1412. In the example of FIG. 14, the log write instruction 1408 is embedded within a set of computer instructions that are repeatedly executed in a loop 1414. As shown in FIG. 14, the same event message 1 is repeatedly generated 1416. The same type of log write instructions may also be located in different places throughout the source code, which in turns creates repeats of essentially the same type of event message in the event log.

In FIG. 14, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. In the example of FIG. 15, the log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as "Repair session" 1508. The text strings between brackets "[ ]" represent file-system paths, such as path 1510. When the log write instruction 1502 is executed, parameters are assigned to the arguments and the text strings and natural-language words and phrases are stored as an event message in an event log.

FIG. 16 shows an example of an event message 1602 generated by the log write instruction 1502. The arguments of the log write instruction 1502 may be assigned numerical parameters that are recorded in the event message 1602 at the time the event message is written to the event log. For example, the time stamp 1504, thread 1505, and IP address 1506 of the log write instruction 1502 are assigned corresponding numerical parameters 1604-1606 in the event message 1602. The time stamp 1604, in particular, represents the date and time the event message is generated. The text strings and natural-language words and phrases of the log write instruction 1502 also appear unchanged in the event message 1602 and may be used to identify the type of event that occurred during execution of the application program or operating system.

As event messages are received from various event sources, the event messages are stored in the order in which the event messages are received. FIG. 17 shows a small, eight-entry portion of an event log 1702. In FIG. 17, each rectangular cell, such as rectangular cell 1704, of the portion of the event log 1702 represents a single stored event message. For example, event message 1702 includes a short natural-language phrase 1706, date 1708 and time 1710 numerical parameters, as well as, an alphanumeric parameter 1712 that appears to identify a particular host computer.

Figure 18:
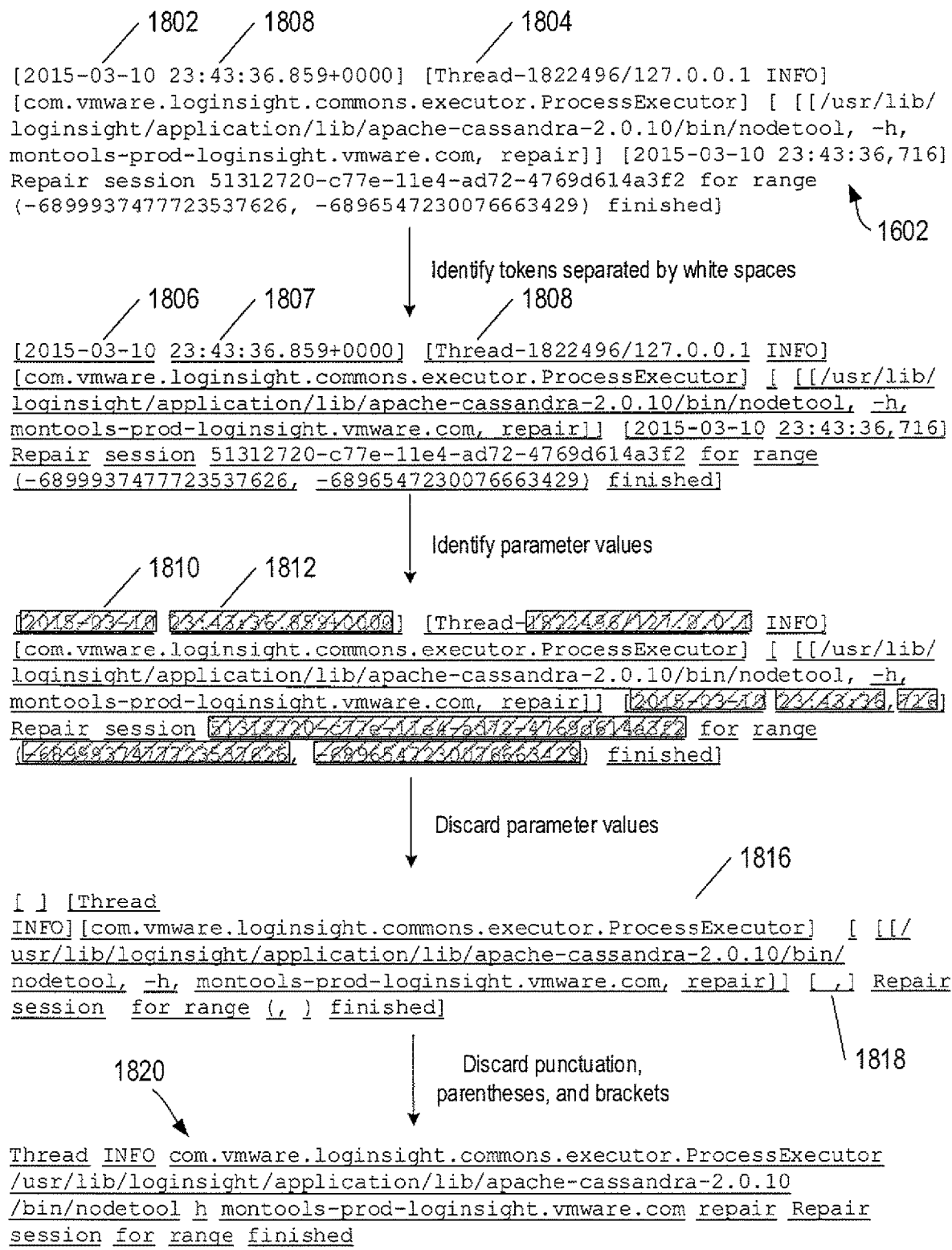
FIG. 18 shows an example of event-type analysis performed on the event message shown in FIG. 16.

FIG. 18 shows an example of event-type analysis performed on the event message 1602 shown in FIG. 16. The event message 1602 is first tokenized by considering the event message as comprising tokens separated by non-printed characters, referred to as "white space." In FIG. 18, this initial tokenization of the event message 1602 is illustrated by underlining of the printed or visible characters. For example, the date 1802, time 1803, and thread 1804 at the beginning of the text contents of the event message 1802, following initial tokenization, become a first token 1806, a second token 1807, and a third token 1808, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 1302 likely occurs within each of many repair session event messages. In FIG. 18, the parametric-valued tokens in the event message following initial token recognition are indicated by shading. For example, initial token recognition determines that the first token 1806 is a date and the second token 1807 is a time. The tokens identified as parameters are identified by shaded rectangles, such as shaded rectangle 1810 of the date 1806 and shaded rectangle of 1812 of the time 1807. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 18, the event message 1602 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 1814 in FIG. 18. For example, brackets and a coma 1818 are underlined. The punctuation, parentheses, and brackets are discarded leaving a textualized event message of interest 1820 that comprises only the non-parametric text strings and natural language words and phrases of the original event message 1302. The textualized event message 1820 represents an event type. Other textualized event messages with the same non-parametric text strings and natural language words and phrase as the textualized event messages 1820 are the same event type. Another textualized event message with one or more different non-parametric text strings or natural language words and phrase from those of the textualized event messages 1820 is of a different event type.

Figure 19:
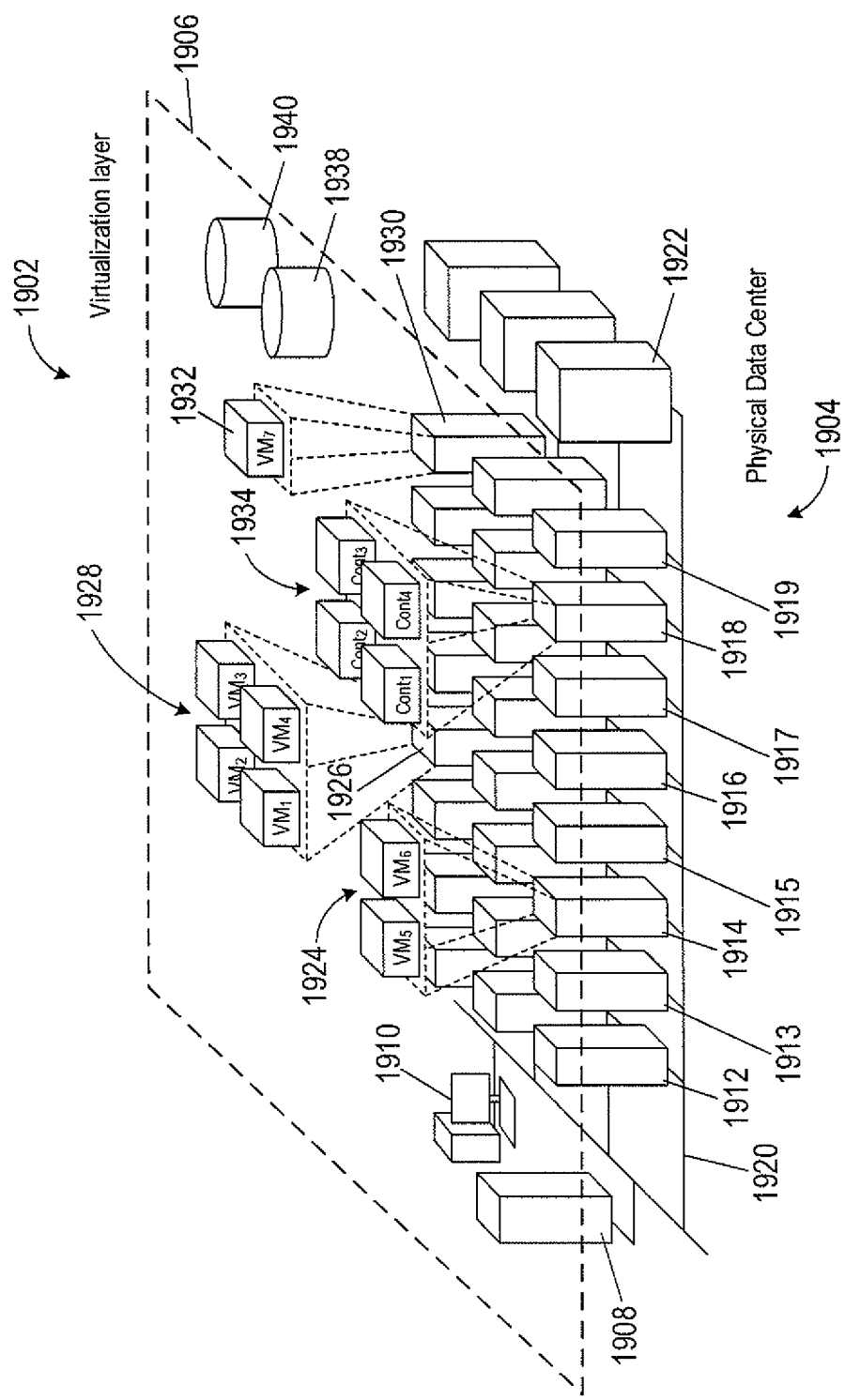
FIG. 19 shows an example of a virtualization layer located above a physical data center.

Methods of Confidence-Controlled Sampling to Analyze and Detect Anomalous Behavior and Problems from Monitoring Data and Event Messages of a Distributed Computing System FIG. 19 shows an example of a virtualization layer 1902 located above a physical data center 1904. The virtualization layer 1902 is separated from the physical data center 1904 by a virtual-interface plane 1906. The physical data center 1904 comprises a management server computer 1908 and any of various computers, such as PC 1910, on which a virtual-data-center management interface may be displayed to system administrators and other users. The physical data center 1904 additionally includes many server computers, such as server computers 1912-1919, that are coupled together by local area networks, such as local area network 1920, that directly interconnects server computers 1912-1919 and a mass-storage array 1922. The physical data center 1904 includes three local area networks that each directly interconnects a bank of eight server computers and a mass-storage array. Different physical data centers may include many different types of computers, networks, data-storage systems and devices connected according to many different types of connection topologies. The virtualization layer 1902 includes virtual objects, such as VMs and containers, hosted by the server computers in the physical data center 1904. Certain server computers host VMs as described above with reference to FIGS. 5A-5B. For example, server computer 1914 hosts two VMs 1924, server computer 1926 hosts four VMs 1928, and server computer 1930 hosts a VM 1932. Other server computers may host containers as described above with reference to FIGS. 11 and 12. For example, server computer 1918 hosts four containers 1934. The virtual-interface plane 1906 abstracts the physical data center 1904 to one or more VDCs comprising the virtual objects and one or more virtual data stores, such as virtual data stores 1938 and 1940, and one or more virtual networks. For example, one VDC may comprise VMs 1928 and virtual data store 1938 and another VDC may comprise VMs 1924 and virtual data store 1940.

Figure 20A:
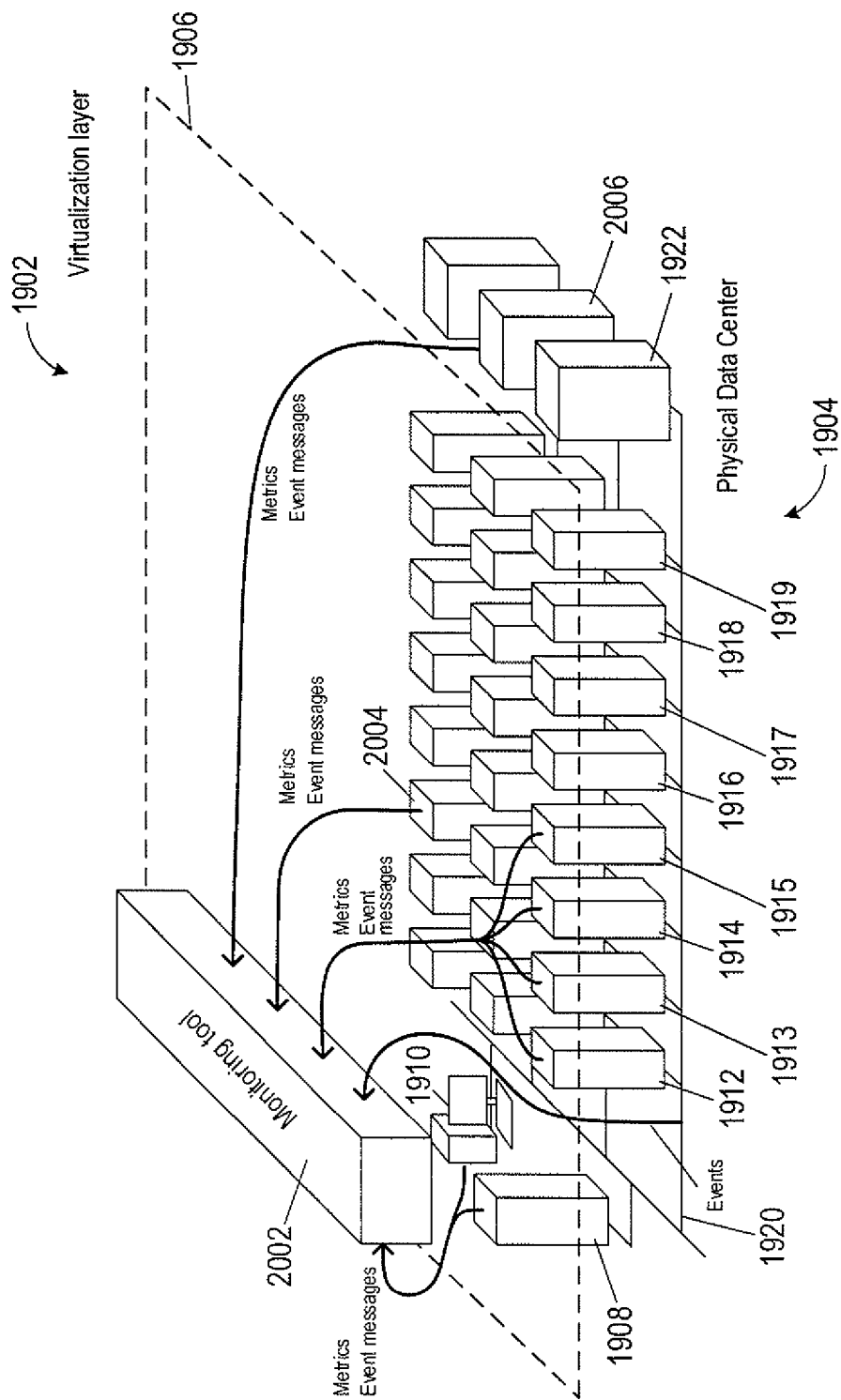
FIGS. 20A-20B show a monitoring tool abstracted to the virtualization layer.
Figure 20B:
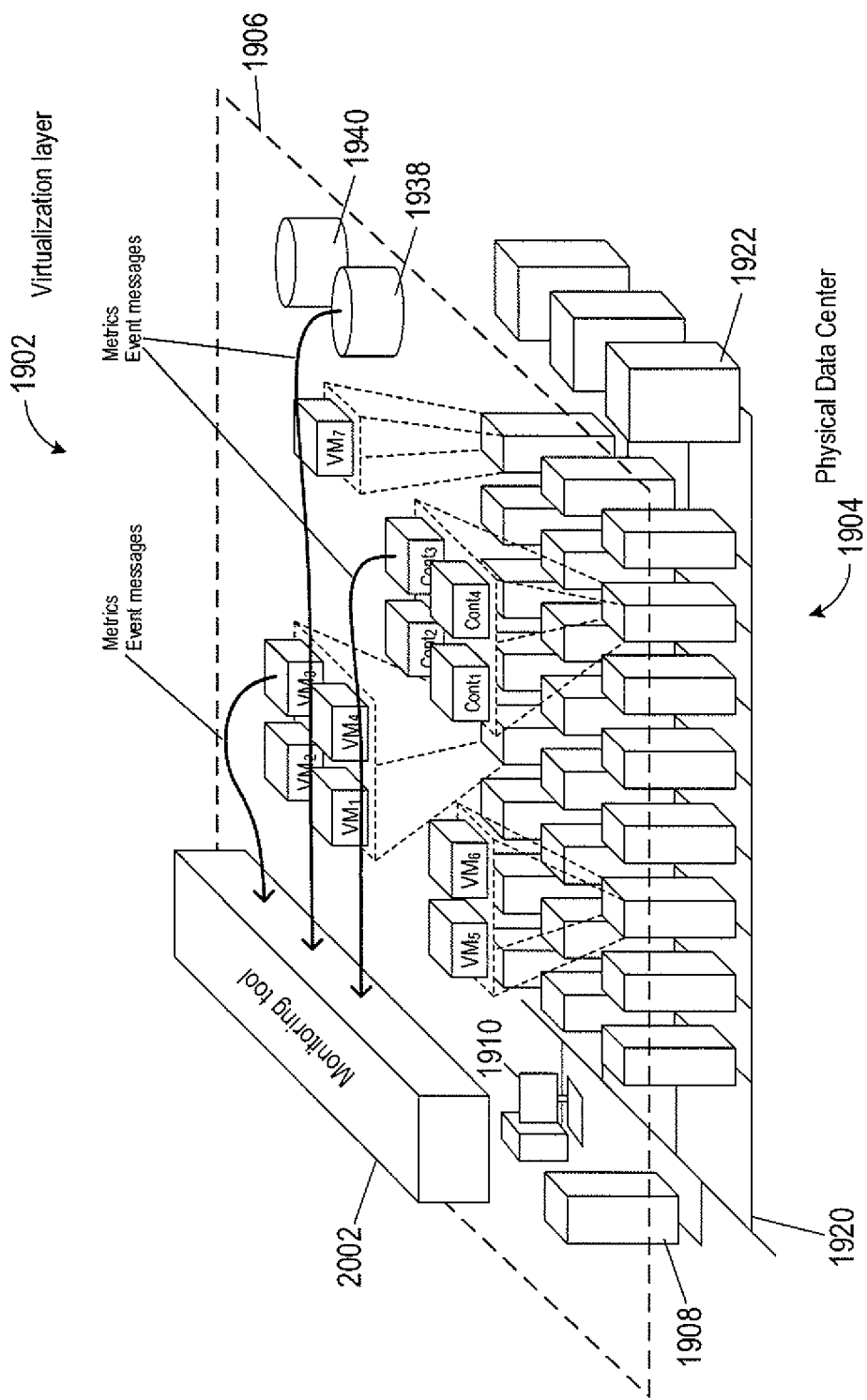

FIGS. 20A-20B show a monitoring tool 2002 abstracted to the virtualization layer 1902. The monitoring tool 2002 is a server application program hosted by the management server computer 1908. The monitoring tool 2002 includes an information technology ("IT") operations management server and a log management server. The IP operations management server monitors, usage, performance, and capacity of physical resources of each computer system, data-storage device, server computer and other components of the physical data center 1904. The physical resources include, but are not limited to, processors, memory, network connections, and storage of each computer system, mass-storage devices, and other components of the physical data center 1904. The IP operations management server monitors physical and virtual resources by collecting metric time series metric data, such as CPU usage, amount of memory, network throughput, network traffic, and amount of storage for physical and virtual resources. CPU usage is a measure of CPU time used to process instructions of an application program or operating system as a percentage of CPU capacity. High CPU usage may be an indication of usually large demand for processing power, such as when an application program enters an infinite loop. Amount of memory is the amount of memory (e.g., GBs) a computer system uses at a given time. The log management server receives event messages sent by various log monitoring agents that run on the physical of virtual objects of the distributed computing system 1904 and receives event messages directly from event sources running on physical or virtual objects without log monitoring agents. The monitoring tool 2002 processes the metric data and the event messages and generates instructions to migrate VMs or containers from one server computer to another in order to optimally or near optimally manage device allocation, provide fault tolerance, and high availability by migrating VMs to most effectively utilize underlying physical hardware devices, to replace VMs disabled by physical hardware problems and failures, to clone VMs, and to ensure that multiple VMs supporting a high-availability virtual appliance are executed on multiple physical computer systems so that the services provided by the virtual appliance are continuously accessible, even when one of the multiple virtual appliances becomes compute bound, data-access bound, suspends execution, or fails. The log management server maintains event logs of the massive amounts of event messages generated by various VMs, containers, and operating systems running in the physical data center 1904.

As shown in FIGS. 20A-20B, directional arrows represent metric data and event messages sent from physical and virtual objects of the physical data center 1904 to the monitoring tool 2002. In FIG. 20A, PC 1910, server computers 1908 and 1912-1915, and mass-storage array 1922 send metric data and event messages to the monitoring tool 2002. Network events, such as network throughput and network traffic, of each component of the physical data center 1904 may also be sent to the monitoring tool 2002. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. Clusters of server computers may also send metric data and event messages to the monitoring tool 2002. For example, a cluster of server computers 1912-1915 sends cluster metric data and event messages to the monitoring tool 2002. In FIG. 20B, metric data and event messages are sent from the VMs, containers, and virtual storage to the monitoring tool 2002.

A sequence of metric time series data is denoted by $$m_i = m(t_i), i = 1, \ldots, N_m \quad (1)$$

where
subscript i is a time index;
$N_m$ is the number of metric data points;
$m(t_i)$ is a data point; and
$t_i$ is a time stamp when the metric data point is recorded.

Figure 21:
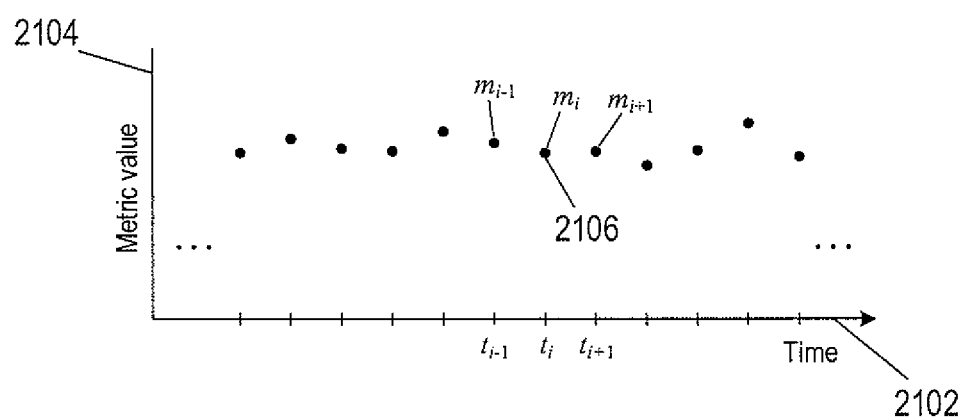
FIG. 21 shows a plot of example metric time series data.

FIG. 21 shows a plot of example metric time series data. Horizontal axis 2102 represents time. Vertical axis 2104 represents a range of metric values. Dots represent individual metric data points recorded at corresponding time stamps. For example, dot 2106 represents a metric data point $m_i$ recorded at a time $t_i$. The metric time series data may represent metric data generated by a physical or a virtual object. For example, the time series data may represent CPU usage of a core in a multicore processor of a server computer at each time stamp. Alternative, the time series data may represent the amount of virtual memory of a VM in use at each time stamp.

Figure 22:
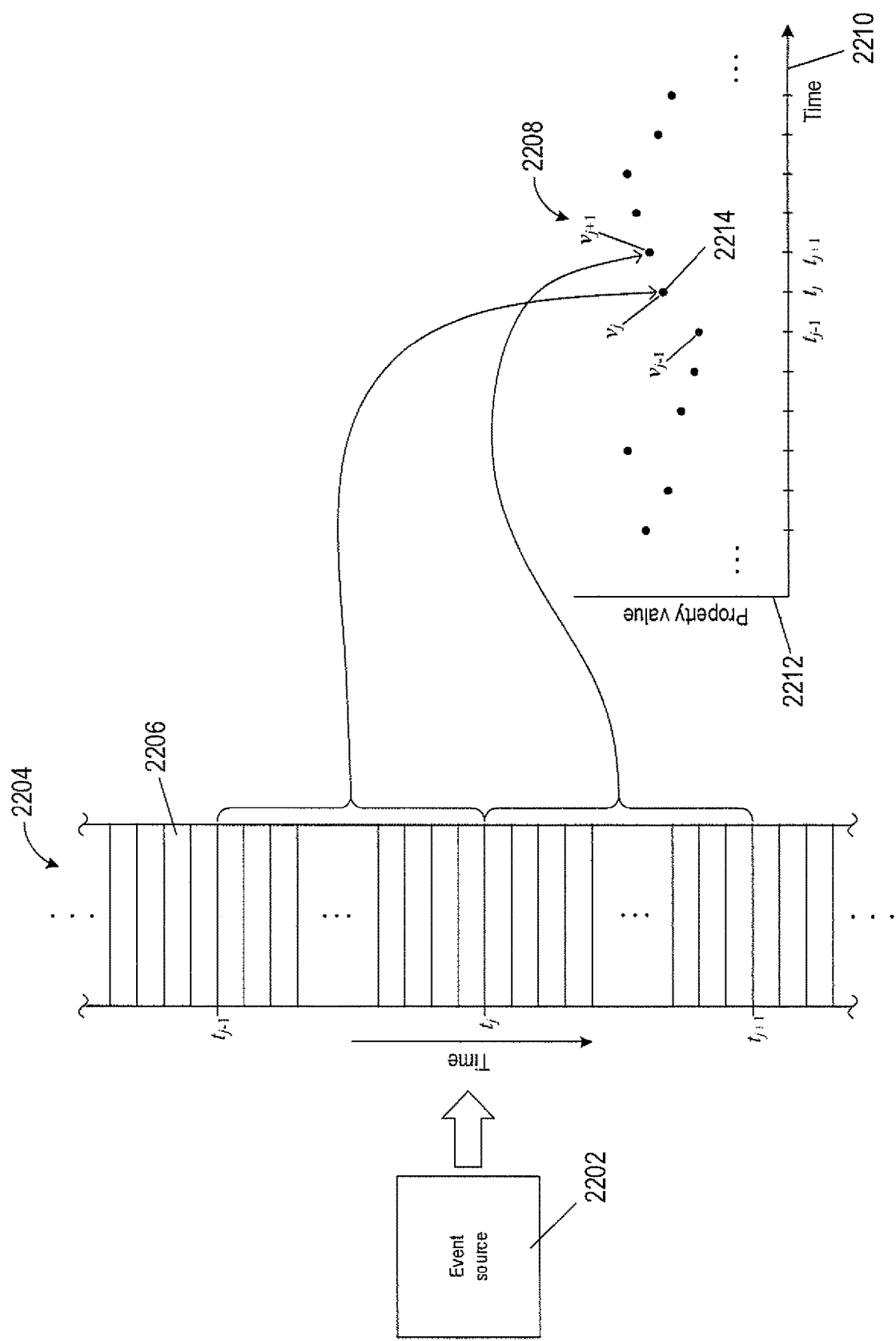
FIG. 22 shows quantification of event messages generated by an event source.

FIG. 22 shows quantification of event messages generated by an event source 2202. The event source 2202 generates a stream of event messages that are sent by a log monitoring agent to a log management server (not shown) that records the event messages in an event log 2204 as described above. Each rectangle, such as rectangle 2206, represents an event message generated by the event source 2202. As described above, when the log management server receives an event message, the log management server writes a time stamp to the event message, indicating the time when the event message is recorded in the event log 2204. The log management server maintains one or more meta-data records of various properties of the event source based on the event messages generated by the event source. For example, the log management server creates a meta-data record of the volume (i.e., number) of event messages received in separate time intervals. Other properties of an event source include event message velocity (i.e., rate of event messages), event message acceleration, and variety of event messages. Each of these properties is a different type of meta-data obtained from the event messages generated the event source. The meta-data record of event messages is stored in a data-storage device as property time series data.

A sequence of property time series data is denoted by $$v_j = v(t_j), k=1, \ldots, N_p \qquad (2)$$

where
subscript j is a time index;
$N_p$ is the number of property data points; and
$v(t_j)$ is a property data point determined for time interval $(t_{j-1}, t_j]$.

FIG. 22 includes a plot of property time series data 2208 that represents a property of the event messages generated in adjacent, equal duration time intervals. For example, the properties represented by the property time series data in FIG. 22 may be volume, velocity, acceleration, or variety of event messages. Horizontal axis 2210 represents time. Vertical axis 2212 represents a range for the property of the event messages, such as volume, velocity, acceleration, or variety. Dots represent property data points of the property time series data. For example, dot 2214 represents the property of the event messages generated by the event source 2202 with time stamps in the time interval $(t_{j-1}, t_j]$.

The metric time series data and property time series date are examples of monitoring data collected by the monitoring tool 2002. In the follow discussion, monitoring data is represented by $$X_k = X(t_k) \qquad (3)$$

where
subscript k is an index that represents the indices i or j; and
$X_k$ represents a discrete metric data point $m_i$ or a property data point $v_j$.

In the following discussion, the term "source" refers to a virtual or physical object or resource of the distributed computing system that generates the monitoring data or refer to an event source of the distributed computing system that generates the monitoring data.

The metric data, property data, and event messages are typically recorded by the monitoring tool 2002 at a high frequency. For example, metric data and event messages may be recorded at a sub-second frequency rates. As a result, each set of metric data, property data, and event log becomes extremely large, which increases infrastructure problems, such as the added cost of data-storage devices. In addition, the various management servers used to process the metric data, property data, and event messages push the limits of memory, CPU usage and input/output of the server computers that host the management servers, which delays characterization, determination of behavior patterns, detection of anomalies, and identification problems from the various data sets. Methods are directed to confidence-controlled sampling of monitoring data and event messages. Confidence-controlled sampling determines a smallest number of randomly selected monitoring data points or event messages based on a selected confidence level. Confidence-controlled sampling speeds up characterization of the monitoring data, speeds up determination of behavior patterns, and speeds up detection and reporting of anomalies and problems associated with the resources and event sources of the distributed computing system without compromising accuracy of the reported results.

Confidence-controlled sampling is a form of random sampling with a minimum number of data points to analyze a characteristic of a sequence of monitoring data for a selected confidence level. In certain implementations, confidence-controlled sampling is based on the binomial probability distribution:

$$\text{Prob}(l \text{ success in } n \text{ trials}) = \binom{n}{l} P^l (1-P)^{n-l} \qquad (4a)$$

where
n is the number of randomly sampled elements of the monitoring data;
P is the probability of a success in which the value of a randomly selected element of the monitoring data matches a defined characteristic of the monitoring data; and
l is the number of elements of the n randomly sampled elements that correspond to the characteristic and is considered a success.

The probability, P, of a randomly selected element satisfying the characteristic of the monitoring data is the same for each element. In other words, each random selection of an element is independent and does change the probability of randomly selecting other elements. The cumulative distribution of the binomial probability distribution is given by:

$$P_{Cum}(L \geq l) = \sum_{i=l}^{n} \binom{n}{i} P^i (1-P)^{n-i} \qquad (4b)$$

where $l \leq L \leq n$.

An element of the monitoring data can be a data point or a time-stamp difference between adjacent data points. The cumulative distribution of Equation (4b) gives a confidence level that 1 or more elements of the n randomly selected elements will satisfy a characteristic of the monitoring data. Equations (4a) and (4b) are used to compute the minimum number of randomly selected elements n and the number of elements l that can be used to identify a characteristic of the monitoring data for a minimum selected confidence level. Confidence-controlled sampling based on Equations (4a) and (4b) can be used to characterize the monitoring data. Characteristics include the monitoring data is constant, semi-constant, or non-constant time series data; the monitoring data is normal or sparse; and the monitoring data is trendy or non-trendy.

Confidence-controlled sampling can be used to characterize the monitoring data as constant, near-constant, semi-constant, or non-constant time series data. Each of these characteristics has a probability of success, P, that defines the characteristic. For example, monitoring data may be defined as near-constant data when 98% of more of the data points in the monitoring data are equal valued. In other implementations, near-constant data may be defined as having 95% or more, 96% or more, or 97% or more equal valued data points. The monitoring data is identified as semi-constant data when more than 50% of the data points in the monitoring data are equal valued. In other implementations, semi-constant data may be defined as having 45% or more, 55% or more, or 60% or more equal valued data points. The monitoring data is identified as non-constant data when the confidence-controlled sampling does not result in constant, near-constant, or semi-constant data points.

In the following examples, the minimum selected confidence level is 99%. In the case of near-constant monitoring data, let the probability of success be defined as P=98%. In other words, near-constant monitoring data is defined as 98% of the data points are equal valued. According to Equations (4a) and (4b), when three or more of a minimum number of five randomly selected data points (i.e., n=5 and l=3) from the monitoring data are equal, the confidence level is $P(L \geq 3)=99.99\%$ that the monitoring data is near-constant time series data. When monitoring data is identified as near-constant, the monitoring data may be compressed to a few percentage data points in order to conserve on storage space in the data-storage device. In the case of semi-constant monitoring data, the probability of success is defined as P=51%. In other words, semi-constant monitoring data is defined as 51% of the randomly selected data points are equal valued. According to Equations (4a) and (4b), when three or more of fifteen randomly selected data points from the monitoring data are equal (i.e., n=15 and l=3), the confidence level is $P(L \geq 3)=99.71\%$ that the monitoring data is semi-constant time series data. When monitoring data is identified as semi-constant, constant portions of the monitoring data may be compressed to a one or two data points in order to conserve on storage space in the data-storage device. If the data does not fall into either of the constant, near-constant, or semi-constant categories, the monitoring data is identified as non-constant time series data. In other implementations, the minimum selected confidence level may be lowered. For example, the minimum selected confidence level may be lowered to 95% or even 90%.

Monitoring data is generated over a long period of time, such as days, weeks, and months. The monitoring data may also be regularly measured and recorded in a data-storage device at a regular frequency, such as every 2 minutes, every second, or every sub-second. The monitoring data may also include gaps in time in which no monitoring data is generated or recorded. The time interval between consecutive data points measured at a regularly frequency is called the "monitoring interval." Consecutive data points are regularly measured data points that have equal magnitude differences between time stamps of the data points. In other words, the monitoring interval is the duration, or interval, of time between regularly recorded consecutive data points. The percentage, or fraction, of the monitoring data that are consecutive data points determines whether monitoring data is characterized as normal or sparse. For example, monitoring data with more than 60% consecutive data points may be characterized as normal and the monitoring interval is the duration or time interval between the time stamps of the consecutive data points. Rather than analyzing the monitoring data over a long period of time to determine if the monitoring data is normal or sparse and determine the monitoring interval, confidence-controlled sampling is applied to the monitoring data to determine whether monitoring data is normal or sparse and the monitoring interval of consecutive data points. In other words, Equations (4a) and (4b) can be used to characterize the monitoring data as normal or sparse and determine the monitoring interval of the monitoring data.

Figure 23:
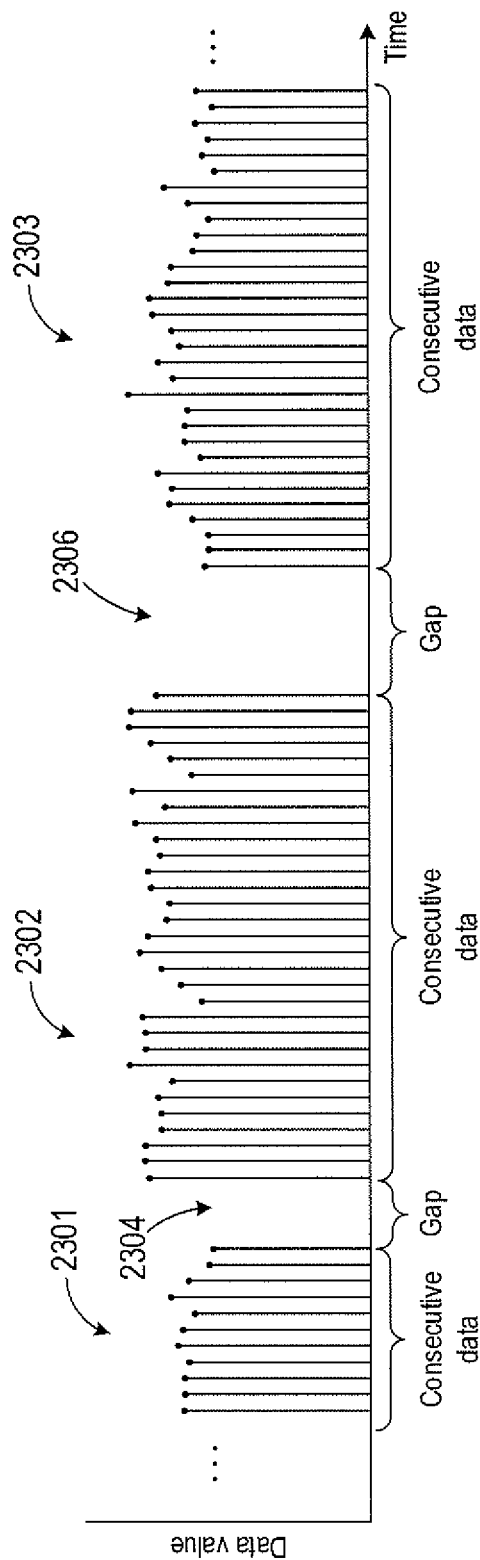
FIG. 23 shows an interval of monitoring data with subintervals of consecutive data points separated by gaps.

FIG. 23 shows an example of monitoring data with sub-intervals 2301-2303 of consecutive data points (i.e., regularly measured) separated by gaps 2304 and 2306 of no reported time series data. Adjacent data points are data points with no data points in between. Two consecutive data points are adjacent data points, such as the data points 2301-2303. But two data points separated by a gap, such as gaps 2304 and 2306, are adjacent data points but not consecutive data points. Using Equations (4a) and (4b), the monitoring may be checked for 60% or more (i.e., P=60% is the probability of success) consecutive data points with a minimum selected confidence level (e.g., 99%). For example, for a probability of success equal to 60%, consider randomly selecting 150 time-stamp differences between adjacent data points of the monitoring data. When 76 or more time-stamp differences (i.e., l=76) of 150 randomly selected time-stamp differences between adjacent data points are equal (i.e., regularly measured), the monitoring data is identified as normal with 60% or more of the monitoring data comprising consecutive data points with a confidence level of 99.2%. The regular frequency or time interval between each of the 76 or more consecutive data points is the monitoring interval. The monitoring data is then subjected to additional testing for abnormal behavior or problems. When less than 76 of the time-stamp differences in the monitoring interval are equal, the monitoring data is irregular. In this case, the monitoring data is considered sparse and no further analysis of the monitoring data is carried out and the monitoring data may be deleted from data storage.

Alternatively, a higher percentage of consecutive data points, such as 70%, may be selected to identify the monitoring data as normal and determine the monitoring interval. For example, for a probability of success equal to 70%, consider randomly selecting 100 time-stamp differences between adjacent data points of the monitoring data. When 50 or more time-stamp differences (i.e., l=50) out of the 100 randomly selected time-stamp differences between adjacent data points are equal, the monitoring data is identified as normal with 70% or more of the monitoring data comprising consecutive data points with a confidence level is 99.99%. When less than 50 time-stamp differences are equal, the monitoring data is regarded as sparse, no further analysis of the monitoring data is carried out, and the monitoring data may be deleted from data storage.

Confidence-controlled sampling may be used to determine if the monitoring data is trendy or non-trendy time series data. When values of the normal monitoring data have a tendency to follow a particular shape or pattern, the monitoring data may be characterized as "trendy." Alternatively, when values of the data points in the monitoring data are randomly distributed, the monitoring data may be characterized as "non-trendy." Data points may be decomposed into trendy and non-trendy components as follows:

$$X(t_k) = x(t_k) + \text{trend}(t_k) \quad (5)$$

where
$x(t_k)$ is the stochastic (i.e., random) component of the data point $X(t_k)$; and
$\text{trend}(t_k)$ is the trend component of the data point $X(t_k)$.
For non-trendy time series data, the trend component is essentially zero (i.e., $\text{trend}(t_k) \approx 0$) and each data point in the normal monitoring data of Equation (5) reduces to $$X(t_k) = x(t_k) \quad (6)$$

On the other hand, for trendy property time series data, the trend component in Equation (5) is not equal to zero (i.e., $\text{trend}(t_k) \neq 0$) and the data point representation in Equation (5) holds.

Figure 24A:
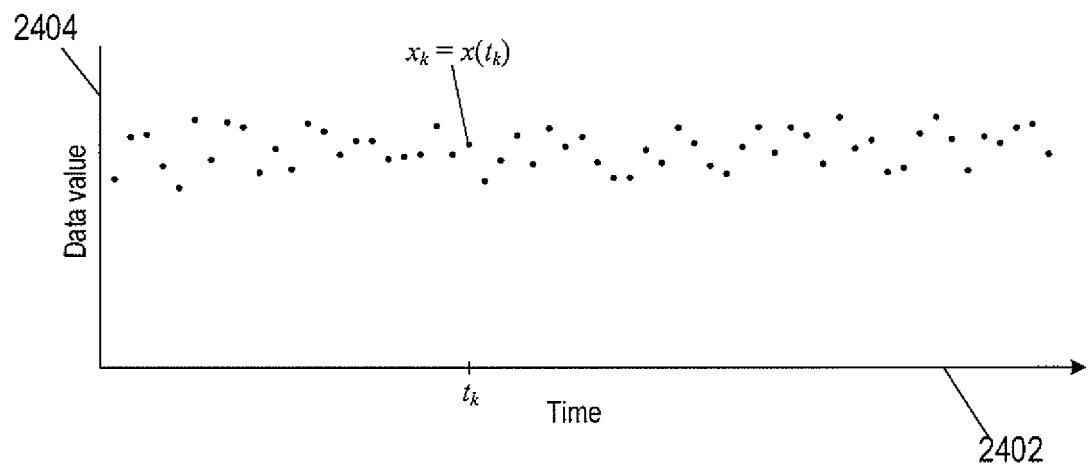
FIGS. 24A-24B show example plots of non-trendy and trendy property time series data, respectively.
Figure 24B:
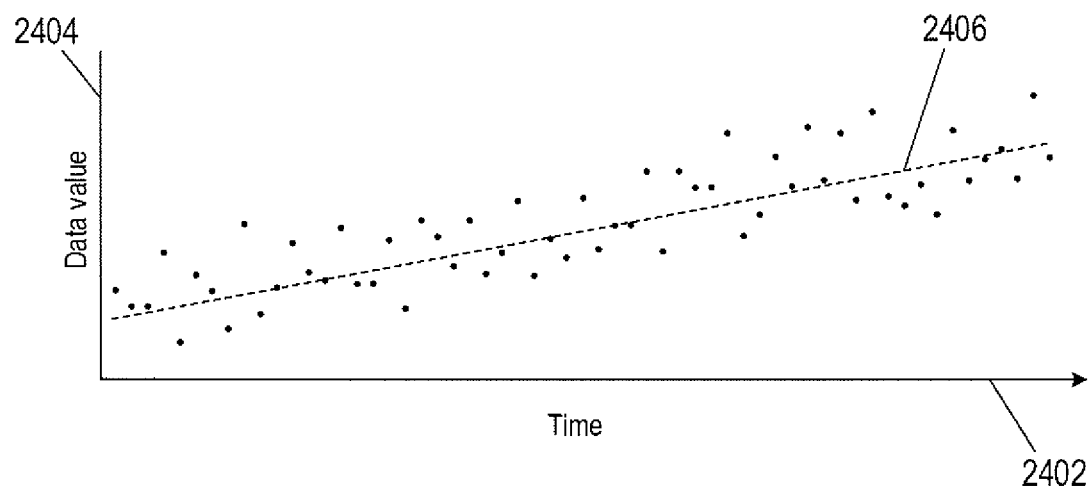

FIGS. 24A-24B show example plots of non-trendy and trendy property time series data, respectively. In FIGS. 24A-24B, horizontal axes 2402 represent time and vertical axes 2404 represents ranges of property data point values. In FIG. 24A, values of the data points of property time series data are randomly distributed and do not exhibit a trend. By contrast, in FIG. 24B, values of the data points of property time series data exhibit a linear trend in which the values of the data points tend to increase with time as represented by dashed line 2406.

A trend for monitoring data may be determined from confidence-controlled sampling of consecutive pairs of data points. The Mann-Kendall ("MK") test can be used to compute a trend statistic given by:

$$S_0 = \sum_{k=1}^{N_{MK}} \sum_{j=k+1}^{N_{MK}-1} \text{sign}(x_j - x_k) \quad (7)$$

where
$N_{MK}$ is the number of confidence-controlled sampled pairs of data points; and $$\text{sign}(x_j - x_k) = \begin{cases} 1 & x_j - x_k > 0 \\ 0 & x_j - x_k = 0 \\ -1 & x_j - x_k < 0 \end{cases}$$

is called the "sign difference."
When $S_0 > 0$, the monitoring data are increasing. When $S_0 < 0$, the monitoring data are decreasing.

Figure 25A:
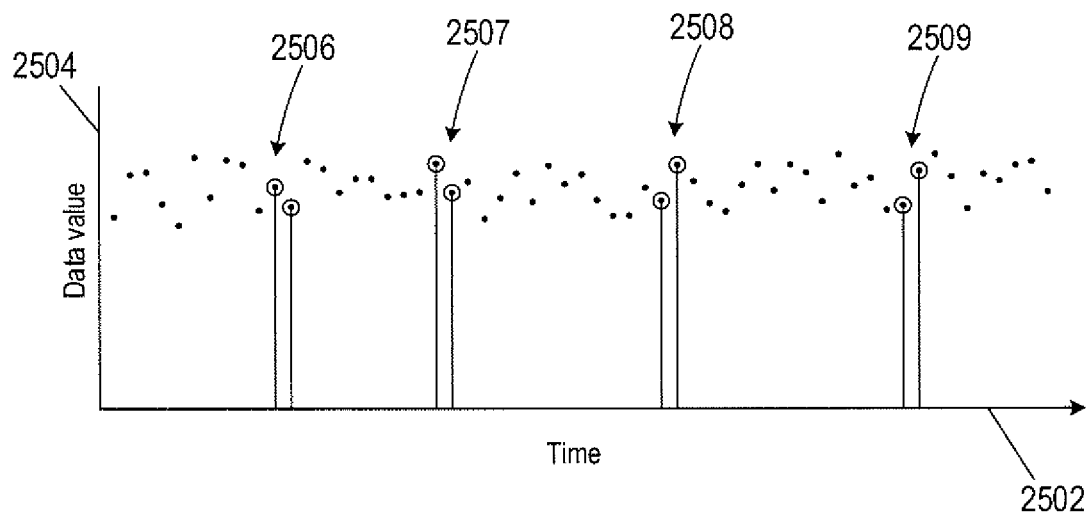
FIGS. 25A-25B show an example of computing a trend statistic from randomly selected consecutive pairs of data points of monitoring time series data.
Figure 25B:
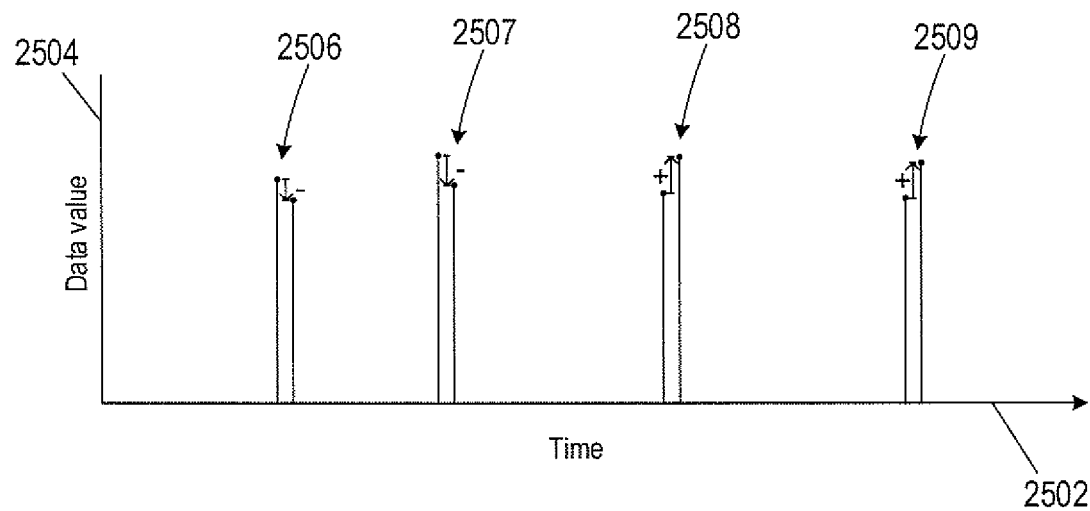

FIGS. 25A-25B show an example of computing a trend statistic from randomly selected consecutive pairs of data points of monitoring time series data. In FIGS. 25A-25B, horizontal axes 2502 represent time and vertical axes 2504 represent ranges of data values. In FIG. 25A, randomly selected consecutive pairs of data points 2506-2509 are enclosed by circles. In FIG. 25B, the randomly selected pairs of data values in FIG. 25A are displayed without the other data points. The first and second pairs 2506 and 2507 are decreasing, and the third and fourth pairs 2508 and 2509 are increasing. Note that the pairs of randomly selected data points in FIGS. 25A-25B are consecutive data points. In alternative implementations, the pairs of data points may not be consecutive data points. The pairs of data points may be randomly selected from all possible pairs of data points in the monitoring data. If the number of data points in the monitoring data is N, then N (N-1)/2 pairs of data points exist.

Whether the normal monitoring data is trendy, may also be determined according to a trend measure given by $$s = \left| \frac{S_0}{S_{max}} \right| 100\% \quad (8)$$

where $$S_{max} = \sum_{k=1}^{N_{MK}-1} \sum_{j=k+1}^{N_{MK}} 1$$

$S_{max}$ is the number of possible differences in the MK test. When the positive-to-negative sign differences computed in the MK test are 60%-to-40%, respectively, the monitoring data has a positive trend. When positive-to-negative sign differences computed in MK test are 40%-to-60%, respectively, the monitoring data has a negative trend. According to Equations (4a) and (4b), confidence-controlled sampling of 150 pairs of data points (i.e., n=150) of the monitoring data, the trend can be identified with a 99% confidence level if 76 or more sign differences are positive or 76 or more sign differences are negative.

Alternatively, a higher percentage of consecutive pairs of data points may be selected to identify the monitoring data as having a trend. When the positive-to-negative sign differences computed in the MK test are 70%-to-30%, respectively, the monitoring data has a positive trend. When positive-to-negative sign differences computed in MK test are 30%-to-70%, respectively, the monitoring data has a negative trend. According to Equations (4a) and (4b), confidence-controlled sampling of 100 pairs of data points (i.e., n=100) of the monitoring data, the trend can be identified with a 99.99% confidence level if 50 or more sign differences are positive or 50 or more sign differences are negative.

Thresholds may be computed for the monitoring data based on confidence-controlled sampling of the monitoring data over a period of time, such as a day, days, a week, weeks, a month or a number of months. In one implementation, the thresholds determined from the property time series data are time-independent thresholds. Time-independent thresholds can be determined for trendy and non-trendy randomly distributed monitoring data. In another implementation, the thresholds determined from the property time series data are time-dependent or dynamic thresholds. Dynamic thresholds can be determined for trendy and non-trendy periodic monitoring data. Methods and systems to determine time-independent thresholds are described in US Patent Application owned be VMware, Inc. and identified as US Publication No. 2015/03791101A1, filed Jun. 25, 2014, which is herein incorporated by reference. Methods and systems to determine dynamic thresholds are described in US Patent Application owned be VMware, Inc. and identified as US Publication No. 2014/0298098A1, filed Mar. 29, 2013, which is herein incorporated by reference.

The thresholds are used to determine dominant and typical ranges for the monitoring data, determine abnormal states of the source of the monitoring data, and predict behavior of the source of the monitoring data at a later time. A threshold is a normalcy bound for the monitoring data. When data points do not violate a threshold, the resource or event source is operating in a normal state or as expected. In other words, the monitoring data does not indicate any non-characteristic behavior. When data points violate a threshold, the resource or event source is operating in an abnormal state. A violation of a threshold triggers an alert, which indicates that the source is behaving anomalously.

An alert is triggered when one or more data points of a sequence of monitoring data points violate an upper or lower threshold as follows:

$$X(t_k) \geq Th_{upper} \quad (9)$$

where $Th_{upper}$ is an upper threshold; and $$X(t_k) \leq Th_{lower} \quad (10)$$

where $Th_{lower}$ is a lower threshold.
The upper and lower thresholds may be time-independent thresholds determined as described in incorporated US Publication No. 2015/03791101A1. Alternatively, the upper and lower thresholds may be time-independent thresholds determined as described in incorporated US Publication No. 2014/0298098A1.

When a threshold is violated, as described above with reference to Equation (9) or Equation (10), an alert is generated, indicating that the resource or event source has entered an abnormal state. The alert may be displayed in a graphical user interface of a systems administration computer so that a systems administrator is alerted to the type of abnormality occurring at the source.

Figure 26:
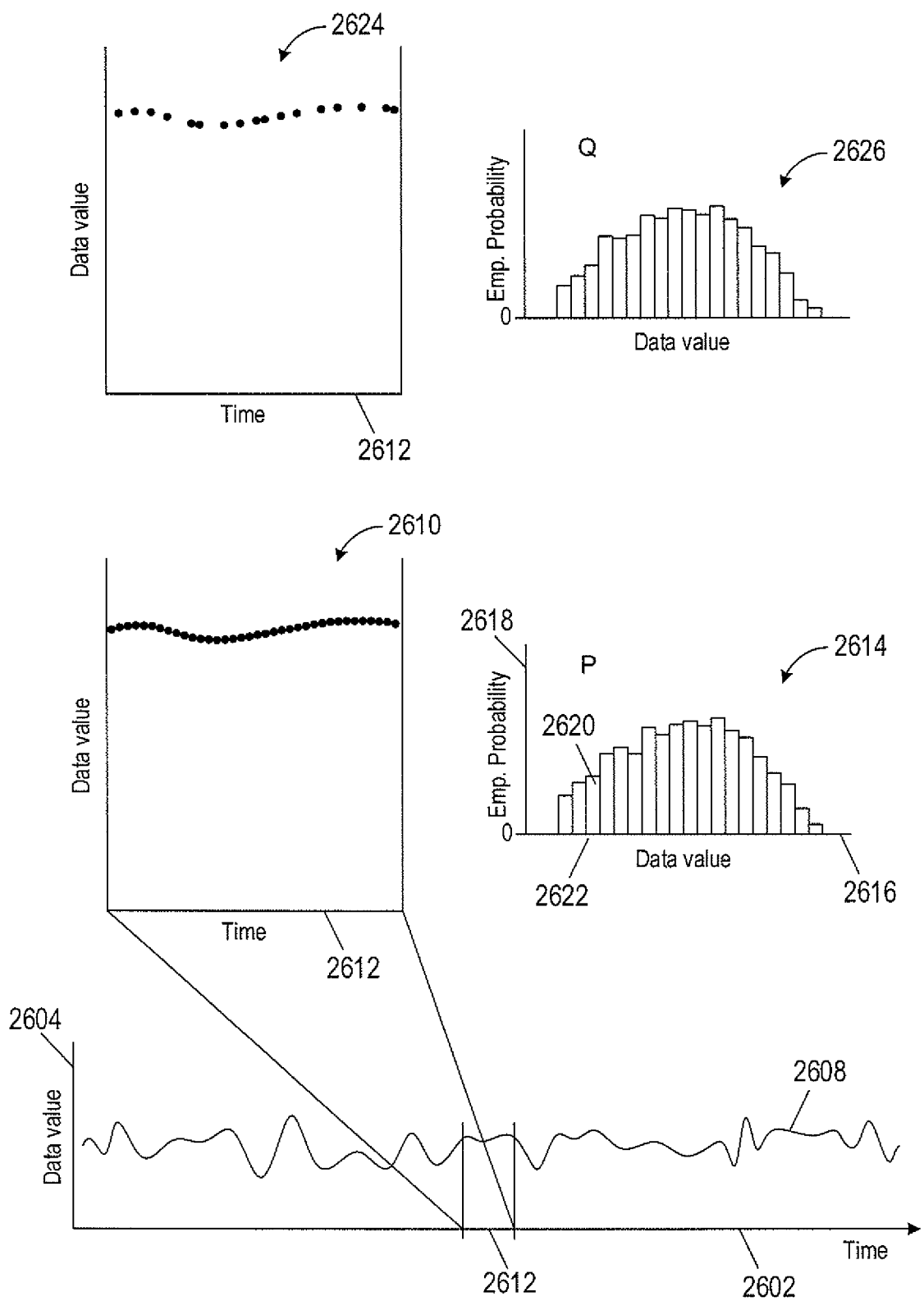
FIG. 26 shows a plot of monitoring data and an enlargement of sampled data points of the monitoring data recorded within the time interval.

Confidence-controlled sampling of monitoring data is used to determine similarity of different sets of monitoring data and search for periodic patterns in the same sequence of monitoring data. FIG. 26 shows a plot 2602 of monitoring data. Horizontal axis 2604 represents time. Vertical axis 2606 represents a range of data values. Curve 2608 represents time variation in the monitoring data. FIG. 26 shows an enlargement 2610 of data values of the monitoring data 2608 recorded within a time interval 2612. FIG. 26 shows a plot of an empirical distribution 2614 computed from the values of data points in the time interval 2612. Horizontal axis 2616 represents a range of values of the data point in the time interval 2612. Vertical axis 2618 represents a range of probability values. An empirical distribution is a histogram of probabilities determined by the number of data values in each sub-interval of the range of the data values. The range of data point values in the time interval 2612 is partitioned into N smaller data value ranges. The probability of a data value randomly selected from the data points in the time interval 2612 lying in the r-th data value range is given by:

$$p_r = \frac{n_r}{N_{TI}} \quad (11)$$

where
$n_r$ is the number of data points in the r-th data value range; and
$N_{TI}$ is the total number of data points recorded in the time interval.

Each bar in the empirical distribution 2614 represents the probability that a randomly selected data point in the time interval 2612 falls within one of the smaller data value ranges. For example, bar 2620 represents the probability a randomly selected data point falls within a data value range 2622. An empirical distribution of monitoring data in a time interval is represented by $$P=(p_1, p_2, \ldots, p_N) \quad (12)$$

where N is the number of data value ranges.

Confidence-controlled sampling is performed with a low error probability given by Equation (17) that guarantees a large enough number of random samples are selected. FIG. 26 shows an enlargement of sampled data points 2624 of the monitoring data 2608 recorded within the time interval 2612. The sampled data points 2624 are determined by confidence-controlled sampling of the data points 2610. FIG. 26 shows a plot of an empirical distribution 2626 of the sampled data points 2624 in the time interval 2612 with values in the N data value ranges. The probability that a sampled data point randomly selected from the sampled data points 2624 lies in the r-th data value range is given by:

$$q_r = \frac{n'_r}{N_{STI}} \quad (13)$$

where
$n'_r$ is the number of sampled data points in the r-th data value range; and
$N_{STI}$ is the total number of sampled data points recorded in the time interval.

Sample empirical distribution of the confidence-controlled sampling applied to monitoring data in a time interval is represented by $$Q=(q_1, q_2, \ldots, q_N) \quad (14)$$

The similarity between the empirical distribution of Equation (12) and the sample empirical distribution of Equation (14) can be computed using $$D_{CS}(P, Q) = 1 - \frac{2}{\pi} \cos^{-1}\left[\frac{\sum_{r=1}^{N} p_r q_r}{\sqrt{\sum_{r=1}^{N}(p_r)^2}\sqrt{\sum_{r=1}^{N}(q_r)^2}}\right] \quad (15)$$

The similarity $D_{CS}(P, Q)$ ranges between 0 and 1 (i.e., $0 \leq D_{CS}(P, Q) \leq 1$). When the similarity $D_{CS}(P, Q)$ equals 0 the distributions P and Q are regarded as dissimilar. When the similarity $D_{CS}(P, Q)$ equals 1 the distributions P and Q are identical. The closer the similarity $D_{CS}(P, Q)$ is to 0 the more dissimilar the distributions P and Q are to each other. The closer the similarity $D_{CS}(P, Q)$ is to 1 the more similar the distributions P and Q are to each other.

In still another implementation, the similarity between distributions may also be measured by computing a Jensen-Shannon divergence between the distributions P and Q as follows:

$$D_{JS}(P, Q) = \\ -\sum_{r=1}^{N} M_r \log M_r + \frac{1}{2}\left[\sum_{r=1}^{N} p_r \log p_r + \sum_{r=1}^{N} q_r \log q_r\right] \quad (16)$$

where $M_r = (p_r + q_r)/2$.

The Jensen-Shannon divergence also ranges between 0 and 1 and has the properties in that the distributions P and Q are dissimilar the closer $D_{JS}(P, Q)$ is to 0 and are similar the closer $D_{JS}(P, Q)$ is to 1. In the following discussion, the similarity $D(P, Q)$ represents the similarity computed using $D_{CS}(P, Q)$ or $D_{JS}(P, Q)$.

An error probability of observing atypical sequences of randomly sampled data points in a time interval decreases exponentially as the number of samples n increases:

$$Pr\{\text{observation is of type } Q\} \leq 2^{-n D_{KL}(P,Q)} \quad (17a)$$

where
n is the number of randomly selected data points of the monitoring data; and $$D_{KL}(P, Q) = \sum_{r=1}^{N} p_r \log \frac{p_r}{q_r} \quad (17b)$$

The Kullback-Leibler divergence $D_{KL}(P, Q)$ ranges between 0 at one extreme and is unbounded at the other extreme. The Kullback-Leibler divergence is a measure of how similarity the distributions P and Q are to one another. The distributions P and Q are similar and approach equality the closer $D_{KL}(P, Q)$ is to 0 and are increasingly dissimilar (i.e., diverge) as $D_{KL}(P, Q)$ increases in value. With n equal to several hundred data points we can achieve a very low error probability (and high confidence of approximation) that we get a "not good enough" reproduction of the original empirical distribution P. Confidence-controlled sampling in the case is determined by the probability that the sample empirical distribution Q does not match the empirical distribution P decreases as the number of random samples n increases. For example, if the monitoring data has approximately 30,000 data points, about 1% can be randomly selected, which is approximately n=300 randomly selected data points. The probability that 300 randomly selected data points will have an empirical distribution Q that is farther from P by 0.1 (i.e., D (P, Q)=0.1) is less than $2^{-30}$, which is a very low probability. A low probability, $2^{-n D_{KL}(P,Q)}$, corresponds to a high confidence in the number n of randomly sampled data points used to form the empirical distribution Q that is close to P. The similarity $D(P, Q)$ may range between 0.1 and 0.5.

Figure 27:
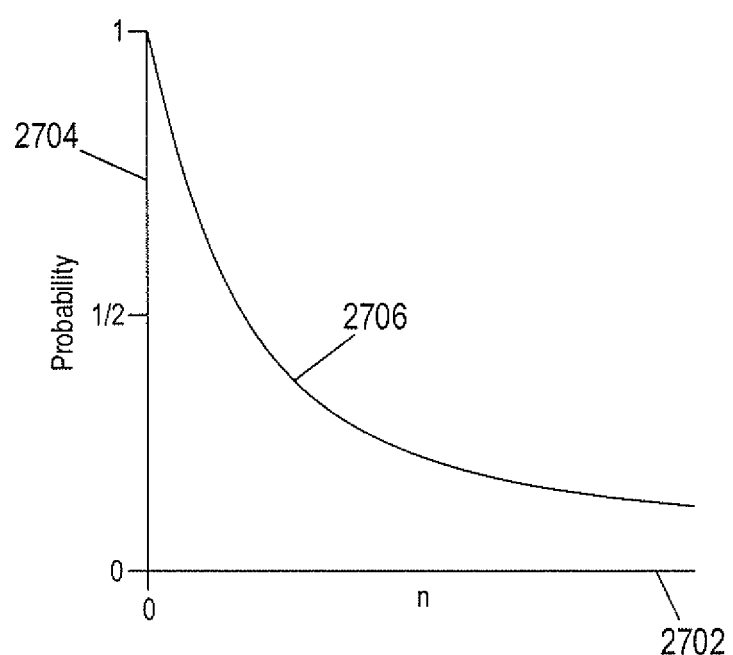
FIG. 27 shows a plot of error probability.

FIG. 27 shows a plot of the error probability of Equation (17) for a fixed value of the similarity $D(P, Q)$. Horizontal axis 2702 represents a range for the number of samples n. Vertical axis 2704 represents a range of error probabilities. Curve 2706 represents the error probability for a fixed similarity $D(P, Q)$ a range of number of samples n. The error probability curve 2706 demonstrates as the number of samples n increases, the error probability of observing atypical sequences of randomly sampled data points in a time interval decreases exponentially. By contrast, as n decreases, the error probability of observing atypical sequences of randomly sampled data points increases exponentially.

One computationally expensive procedure in behavioral pattern analysis of monitoring data is the search for periodic patterns in the monitoring data. The objective is to determine if the monitoring data contains similar patterns within different periods of time which can be used to test for possible cycles, such as cycles that repeat daily, once or week of once a month. Similarity analysis is performed with less complexity using confidence-controlled sampling of data points to determine a sample empirical distribution for each time interval to approximate the actual empirical distribution of each time interval than when using unsampled monitoring data. In other words, in order to determine if a sequence of monitoring data contains a specific cycle, a similarity of sample empirical distributions of the monitoring data is computed for the time intervals.

Let $Q_1 = (q_{1,1}, q_{1,2}, \ldots, q_{1,N})$ represent a first sample empirical distribution computed from applying confidence-controlled sampling of the monitoring data in a first time interval. Let $Q_2 = (q_{2,1}, q_{2,2}, \ldots, q_{2,N})$ represent a second sample empirical distribution is computed from applying confidence-controlled sampling of the monitoring data in a second time interval. A similarity $D(Q_1, Q_2)$ between the first and second empirical distributions is computed for the first and second sample empirical distributions. If the similarity satisfies a condition given by $$D(Q_1, Q_2) \geq Th_Q \quad (18)$$

where $0 \leq Th_Q \leq 1$ (e.g., $Th_Q = 0.9$ or 0.95) is an empirical distribution similarity threshold,
the sample empirical distributions are identified as similar. When the similarity $D(Q_1, Q_2)$ fails to satisfy the condition of Equation (18), the sample empirical distributions are dissimilar.

Figure 28A:
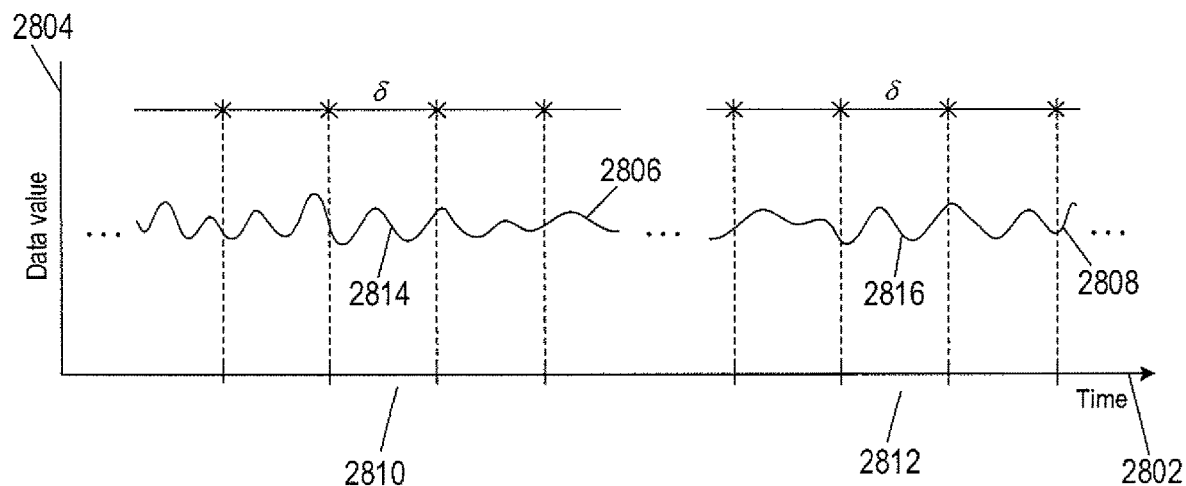
FIGS. 28A-28B show a plot of monitoring data collected over a period of time.
Figure 28B:
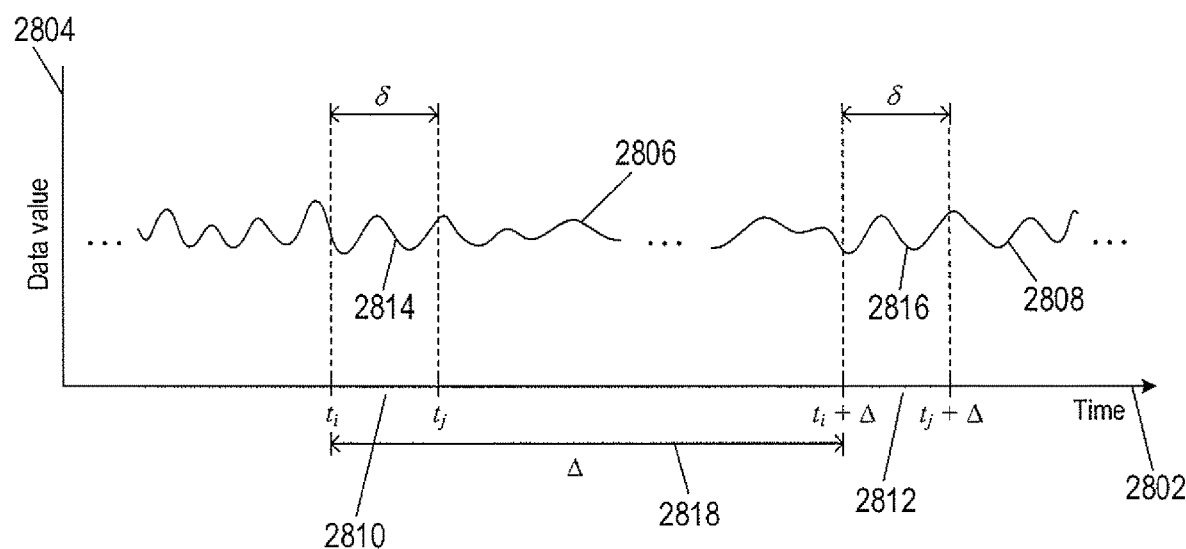

Confidence-controller sampling of data points in different time intervals of a sequence of monitoring data may be used to search for repeated patterns in the monitoring data. FIGS. 28A-28B show a plot of monitoring data collected over a period of time. Horizontal axes 2802 represent time. Vertical axes 2804 represent a range of values for the monitoring data. Curves 2806 and 2808 represent different portions of the same sequence of monitoring data. In FIG. 28A, the monitoring data is partitioned based on series of time intervals with the same duration δ, such as time intervals 2810 and 2812. The monitoring data is randomly sampled using confidence-controlled sampling in each time interval, as described above with reference to FIG. 27, and a sample empirical distribution is computed from the sampled monitoring data. For example, a first sample empirical distribution $Q_1 = (q_{1,1}, q_{1,2}, \ldots, q_{1,N})$ is computed from the randomly sampled monitoring data 2814 in the time interval 2810. A second sample empirical distribution $Q_2 = (q_{2,1}, q_{2,2}, \ldots, q_{2,N})$ is computed from the randomly sampled monitoring data 2816 in the time interval 2812. The similarity may be computed for various pairs of sample empirical distributions separated by a period of time, Δ, to determine in any periodicity exist in the distribution of monitoring data. For example, in FIG. 28B, the sample empirical distributions of the sampled monitoring data in the time intervals 2810 and 2812 are separated by a period of time Δ 2818 and satisfy the condition of Equation (16). The durations of the time interval δ and the period of time Δ may be varied to continue the search for periodicity in the monitoring data.

Sample empirical distributions that satisfy the condition of Equation (18) and are identified as periodic and notice is posted indicating that a periodicity has been identified and the time intervals and period are displayed in graphical user interface of an administration computer. The periodic time intervals may be used to monitor and assign or reassign virtual and physical resources. For example, suppose the monitoring data in FIG. 28B represents metric data for a physical resource of a server computer that hosts a VM that, in turn, runs a server application program, the period Δ is 24 hours, and duration δ of the time intervals 2810 and 2812 is 1 hour. A similarity of the sample empirical distributions of the monitoring data in the time intervals 2810 and 2812 that satisfies Equation (18) is an indication of a repeated pattern in use of the resource by the VM. Suppose the VM experiences a spike in workload during the same time intervals each day. The VM may be scheduled to receive an increase in the allocation of the resource to handle the spike in workload during the same time interval each day.

Figure 29A:
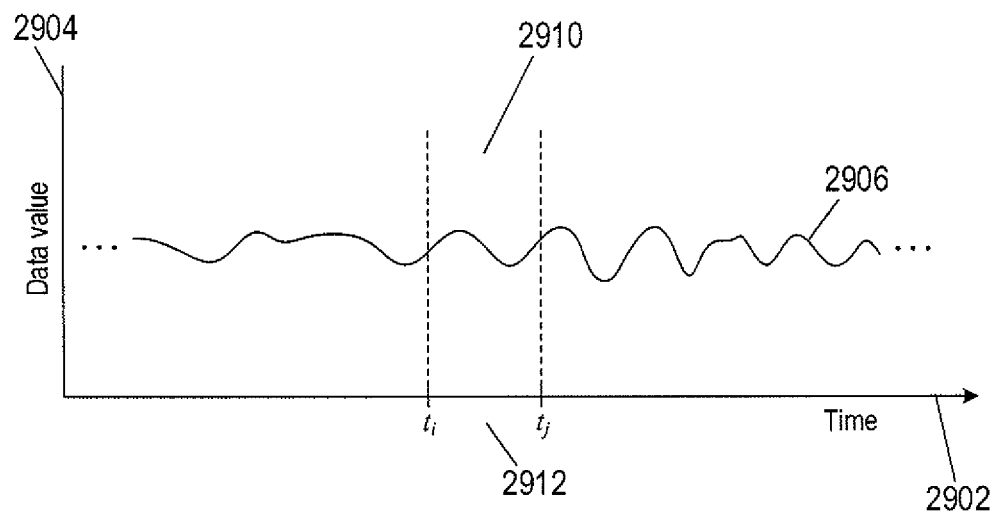
FIGS. 29A-29B show plots of monitoring data from two different sources of monitoring data.
Figure 29B:
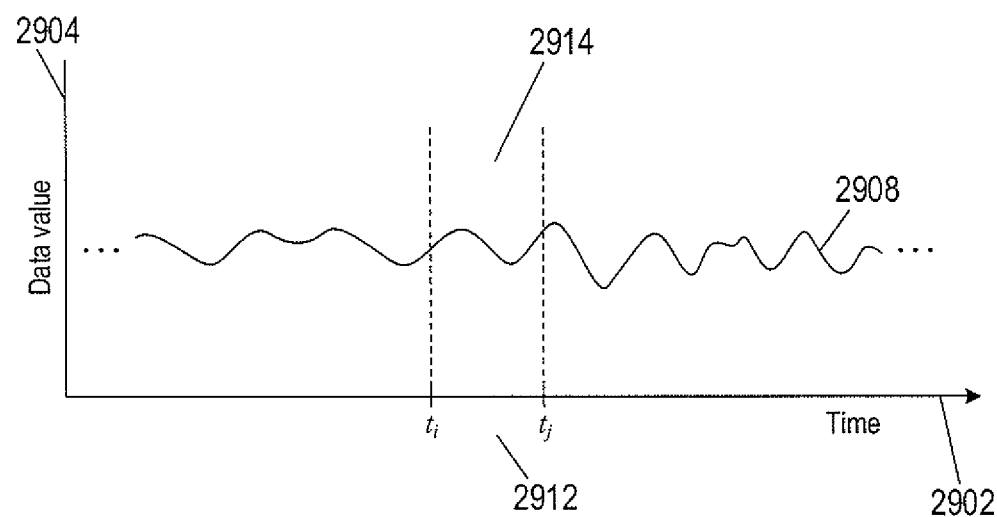

Confidence-controlled sampling of data points in the same time interval of two different sequences of monitoring data may be used to determine if the sources of the two sequences behave in a similar manner. FIGS. 29A-29B show plots of monitoring data from two different sources of monitoring data. Horizontal axes 2902 represent time. Vertical axes 2904 represent a range of values for the two sequences of monitoring data. The monitoring data 2906 and 2908 may be generated by similarly configured VMs, containers, or copies of the same event source. In one implementation, the two sequences of monitoring data 2906 and 2908 may be compared in the same time interval $[t_i, t_j]$ 2912 by computing a first sample empirical distribution $Q_1=(q_{1,1}, q_{1,2}, \ldots, q_{1,N})$ of the monitored data 2910 in a time interval $[t_i, t_j]$ 2912 and computing a second sample empirical distribution $Q_2=(q_{2,1}, q_{2,2}, \ldots, q_{2,N})$ of the monitored data 2910 in a time interval $[t_i, t_j]$ 2912. When the similarity $D(Q_1, Q_2)$ satisfies the condition of Equation (18), the two sources are performing in a similar manner within the time interval $[t_i, t_j]$ 2912. On the other hand, when the similarity $D(Q_1, Q_2)$ does not satisfy Equation (18), the two sources are not performing in the same manner within the time interval $[t_i, t_j]$ 2912, which may trigger an alert indicating that there may be a problem with the VMs, container, and event sources or the computer systems these objects run on.

In an alternative implementation, confidence-controlled sampling using Equations (4a) and (4b) may be used to randomly select pairs of data points $\{(X_j, Y_j)\}_{j=1}^{N_s}$ in the time interval $[t_i, t_j]$ 2912, where $N_s$ is the number of randomly selected data points, $X_j$ is a data points in the monitoring data 2906; $Y_j$ is a data points in the monitoring data 2908. Pairs of data points, $(X_j, Y_j)$ and $(X_i, Y_i)$, are concordant if both $X_j > X_i$ and $Y_j > Y_i$ or if both $X_j < X_i$ and $Y_j < Y_i$. The same pair of data point are discordant if both $X_j > X_i$ and $Y_j < Y_i$ or if both $X_j > X_i$ and $Y_j < Y_i$. A Kendall-tau coefficient is computed as follows:

$$\tau = \frac{2(C_{con} - C_{dis})}{N_s(N_s - 1)} \quad (19)$$

where $C_{con}$ is the number of concordant pairs of data points; and
$C_{dis}$ is the number of discordant pairs of data points.

The Kendall-tau coefficient $\tau$ ranges between $-1$ and $1$ (i.e., $-1 \leq \tau \leq 1$). The Kendall-tau coefficient is a measure of the correlation between the sets of data points $\{X_j\}_{j=1}^{N_s}$ and $\{Y_j\}_{j=1}^{N_s}$. A positive coefficient indicates the ranks of the two sets are increasing. On the other hand, a negative coefficient indicates that as the rank of one set of data points increases, the rank of the other set of data points decreases. When the coefficient equals 1, the agreement between the two rankings are the same (i.e., correlated). When the coefficient equals $-1$, one ranking is the reverse of the other ranking (i.e., not correlated). When the coefficient is close to zero, the sets of data points $\{X_j\}_{j=1}^{N_s}$ and $\{Y_j\}_{j=1}^{N_s}$ are independent. Confidence-controlled sampling may be accomplished by defining a probability of success as corresponding to a coefficient $\tau$ equal to at least 0.70. Consider 100 pairs of data points $\{(X_j, Y_j)\}_{j=1}^{100}$ (i.e., $N_s=100$) randomly selected from the time interval $[t_i, t_j]$ 2912. When more than 50 pairs (i.e., $l=50$) are concordant, the monitoring data 2906 and monitoring data 2908 in the time interval $[t_i, t_j]$ 2912 are correlated with a confidence level equal to 99.99%. When more than 50 pairs are discordant, the monitoring data 2906 and monitoring data 2908 in the time interval $[t_i, t_j]$ 2912 are not correlated with a confidence level equal to 99.99%.

Confidence-controlled sampling may be used to compute an approximate distribution of a selected set of event types within time window comprising hundreds of thousands of event messages recorded in an event log as described above with reference to Equation (17). The size of the time window is determined by the number of event messages recorded within the time window. A large time window, for example, might be a day, a week, or a month of event messages, depending on the number of event messages recorded within the time window. For example, if the number of event messages in a time window is approximately 10,000, about 2% can be randomly selected, which is approximately n=200 randomly selected event messages. The probability that the 200 randomly selected event messages will have an event-type distribution Q that is farther from the event-type distribution P of all the event messages in the time window by 0.2 (i.e., $D(P, Q)=0.2$) is less than $2^{-40}$, which is a very low probability. The event type distribution obtained through the confidence-controlled sampling serves as a "fingerprint image" of an event source and may be used in change and anomaly detection, similarity analysis of the event source with other event sources, and analysis of extreme events.

Figure 30:
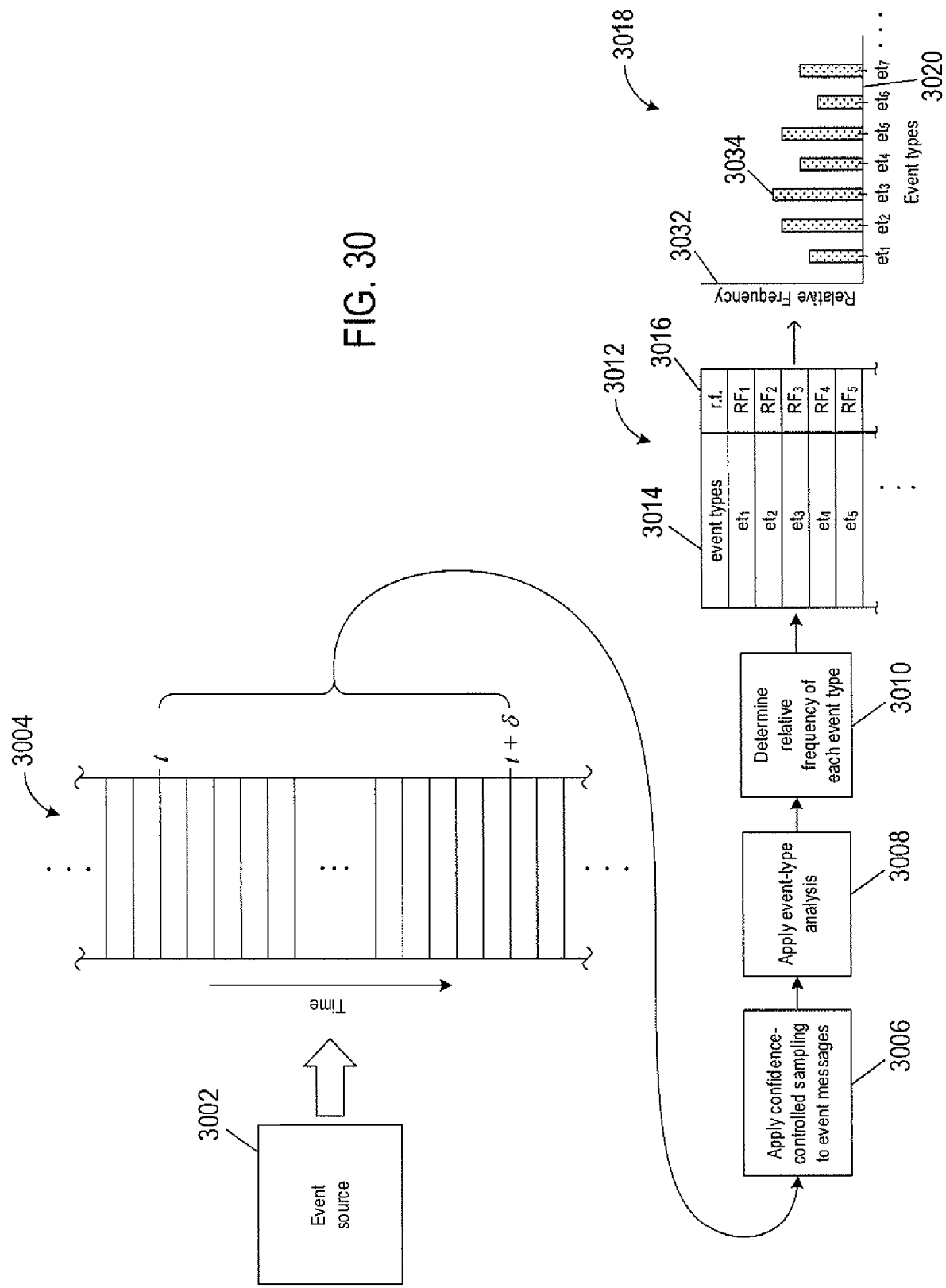
FIG. 30 shows determination of an event-type distribution with confidence-controlled sampling applied to event messages generated by an event source.

FIG. 30 shows determination of event-type distribution with confidence-controlled sampling applied to event messages generated by an event source 3002 and recorded in an event log 3004. In block 3006, confidence-controlled sampling is applied to sampled event messages within a time interval (t, t+δ). In block 3008, event-type analysis is applied to each event message to determine the event type. Event-type analysis reduces the event message to text strings and natural-language words and phrases (i.e., non-parametric tokens), as described above with reference to FIG. 18. In block 3010, relative frequencies of the event types determined in block 3008 are computed according to $$RF_i = \frac{n(et_i)}{N_t} \quad (20)$$

where $n(et_i)$ is the number of times an event type, denoted by $et_i$, appears in the sampled set of event messages recorded in the time interval (t, t+δ); and $N_t$ is the total number of sampled event messages collected in the time interval (t, t+δ).

An event-type log 3012 is formed from the different event types and associated relative frequencies. The event-type log 3012 comprises a list of the different event types 3014 of the event messages and corresponding relative frequencies 3016 of each event type. FIG. 30 also shows a histogram 3018 of an event-type distribution. Horizontal axis 3020 represents the event types. Vertical axis 3032 represents a range of relative frequencies. Shaded bars represent the relative frequency of each event type in the set of sampled event types. For example, shaded bar 3034 represents the relative frequency $RF_3$ of the event type $et_3$. The event-type distribution 3018 obtained from confidence-controlled sampling serves as a "fingerprint image" for the event source 3002 and can be used to compare the event source 3002 with the behavior of a similar event source.

Figure 31:
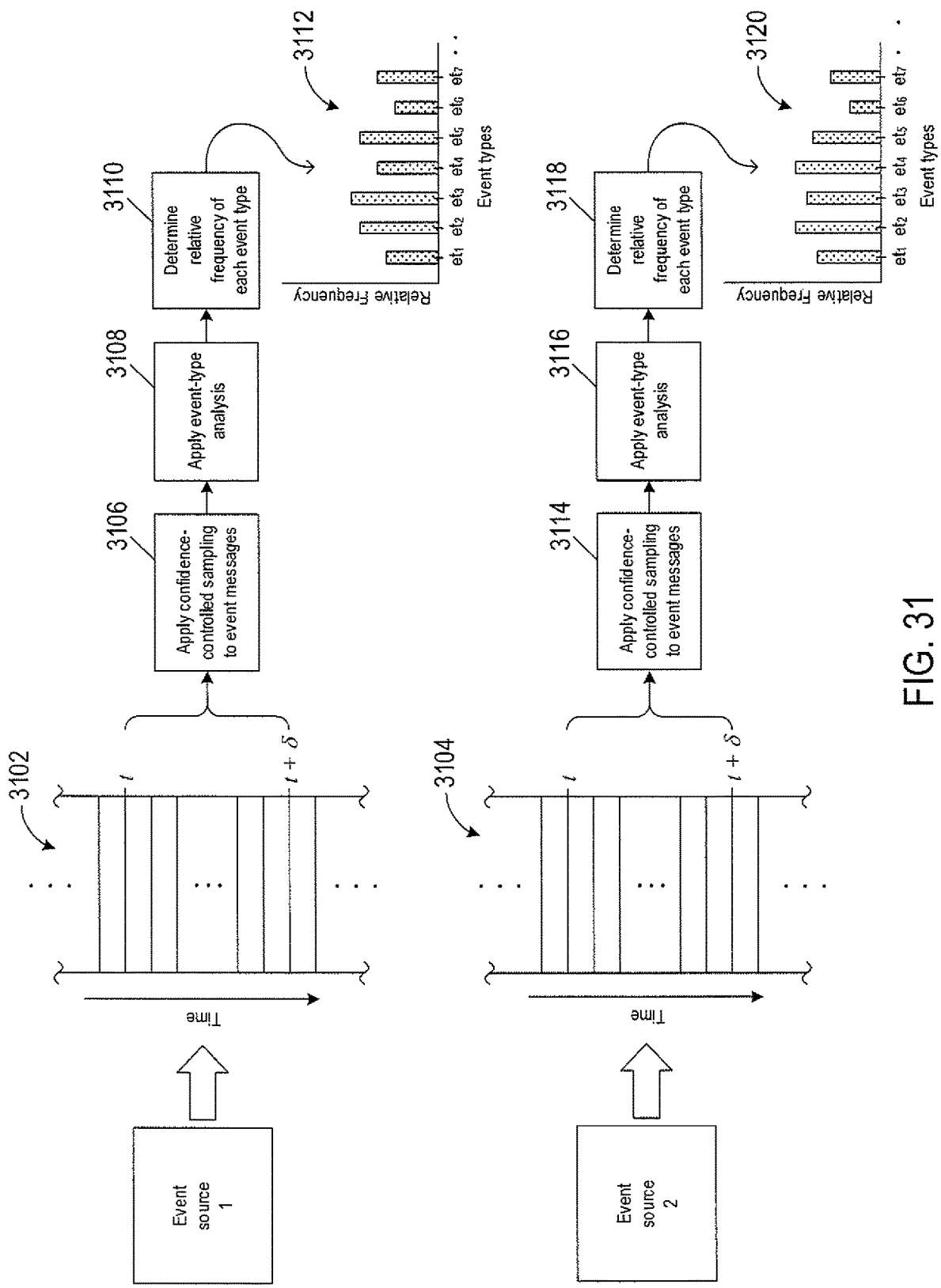
FIG. 31 shows determination of two event-type distributions for two different event sources.

FIG. 31 shows determination of two event-type distributions for two different event sources using event messages collected in the same time interval (t, t+δ]. Event source 1 generates event messages recorded in an event log 3102. Event source 2 generates event messages recorded in an event log 3104. In block 3106, confidence-controlled sampling is applied to event messages recorded in the time interval (t, t+δ] followed by applying event-type analysis to the sampled event messages in block 3108 and determination of relative frequencies of the event types in block 3110 to obtain the relative frequencies 3112 for event source 1. In block 3114, confidence-controlled sampling is applied to event messages recorded in the same time interval (t, t+δ] followed by applying event-type analysis to the sampled event messages in block 3116 and determination of relative frequencies of the event types in block 3118 to obtain the relative frequencies 3120 for event source 2. Behavior of the event sources 1 and 2 may be compared by computing a similarity between the event-type distributions 3112 and 3120.

Let $ETD_1 = (RF_{1,1}, RF_{1,2}, \ldots, RF_{1,m})$ represent the event-type distribution 3112 and $ETD_2 = (RF_{2,1}, RF_{2,2}, \ldots, RF_{2,m})$ represent the event-type distribution 3120. The similarity between the two distributions may be computed using either of Equations (15) and (16). When the similarity satisfies a condition given by $$D_{(ETD_1, ETD_2)} \geq Th_{ETD} \qquad (21)$$

where $0 \leq Th_{ETD} \leq 1$ (e.g., $Th_{ETD} = 0.9$ or $0.95$) is event-type distribution similarity threshold, the two event-type distributions are similar and the event sources 1 and 2 do not appear to be behaving differently. On the other hand, when the similarity $D(ETD_1, ETD_2)$ fails to satisfy the condition of Equation (18), an alert may be generated indicating that the event sources 1 and 2 are not behaving in the same manner. For example, if the event sources are VMs or containers running the same server application program and the similarity fails to satisfy the condition of Equation (18), an alert may be generated indicating the behavior of one or both the event sources has changed and requires troubleshooting.

Hypothesis testing may be used to determine if a change has occurred in two different periods of time of a stream of event messages generated by an event source. Unexpected behavior detected in a distributed computing system may be categorized as an anomaly or a change. An anomaly is an extreme event of a random process that has essentially the same overall characteristics in the present as in the past. On the other hand, a change is an alteration in the characteristics and distribution of the random process itself. A change point is a point in time when the behavior of an event source differs significantly from past behavior. The similarity between event-type distributions obtained from confidence-controlled sampling of different portions of the same stream of event messages generated by an event source can be used to determine if the behavior of the event source has changed.

Figure 32:
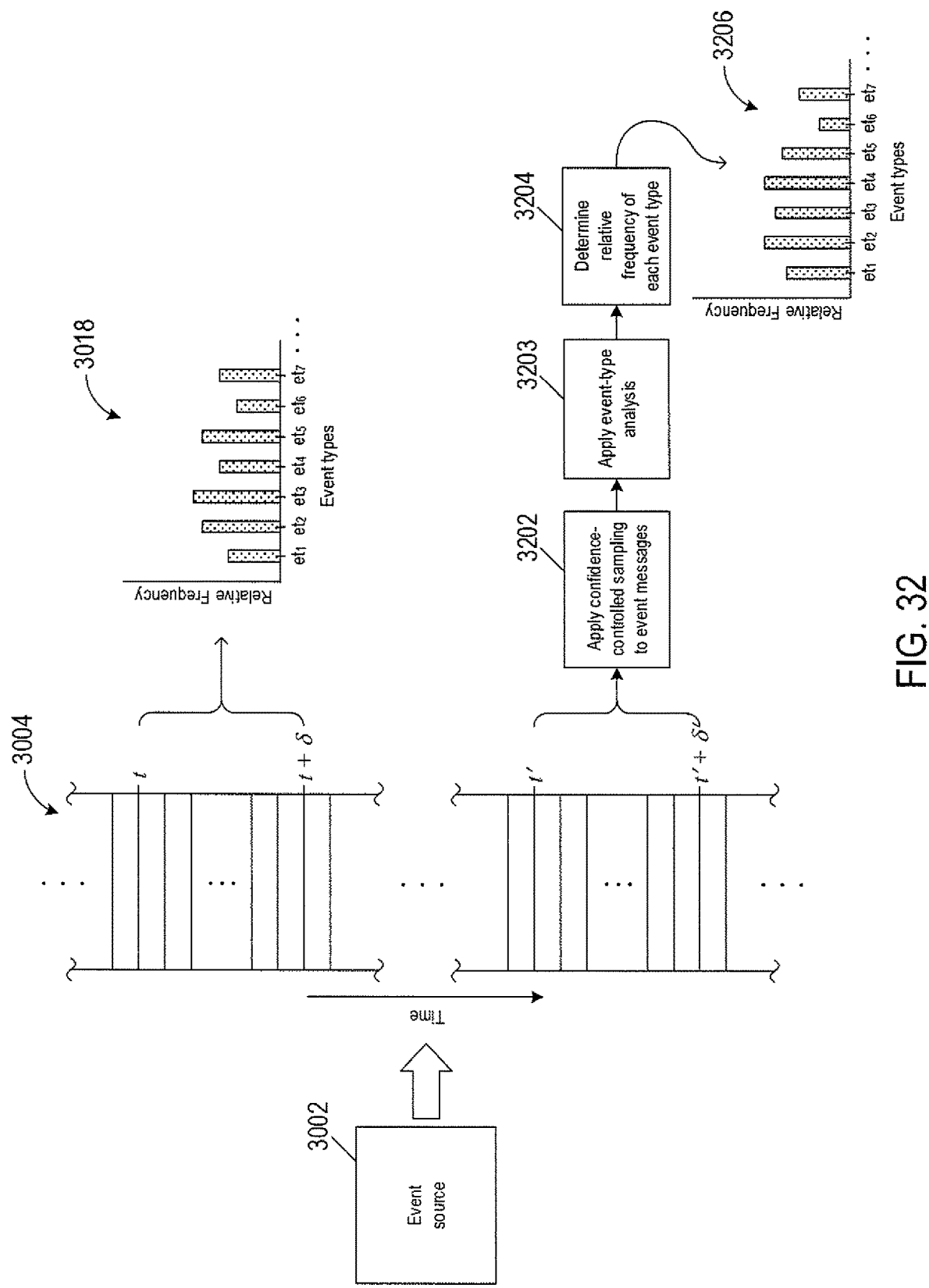
FIG. 32 shows an example of determining event-type distributions for two different time intervals of the event log.

FIG. 32 shows an example of determining event-type distributions for two different time intervals of the event log 3004 in FIG. 30. In block 3202, confidence-controlled sampling is applied to sampled event messages within a time interval (t', t'+δ] that occurs later in time than the time interval (t, t+δ] described in FIG. 30. In block 3203, event-type analysis is applied to each event message obtained from confidence-controlled sampling to determine the different event types. In block 3204, relative frequencies of the event types are computed according to Equation (17) to determine an event-type distribution 3206 for event messages generated in the time interval (t', t'+δ]. The similarity is computed between the event-type distributions 3018 and 3206 by letting $ETD_1 = (RF_{1,1}, RF_{1,2}, \ldots, RF_{1,m})$ represent the event-type distribution 3112 and $ETD_2 = (RF_{2,1}, RF_{2,2}, \ldots, RF_{2,m})$ represent the event-type distribution 3206. The similarity between the event-type distributions may be computed using either of Equations (15) and (16). When the similarity satisfies the condition given by Equation (21) is satisfied the two event-type distributions are similar and there does not appear to have been a change in behavior of the event source 3002. On the other hand, when Equation (18) is not satisfied, at some point in time between the recording of the event messages of the event-type distribution 3018 and the event messages of the event-type distribution 3206 a change has occurred with execution of the event source 3002 and event messages recorded in the event log prior to the time t' may be discarded. Alternative, the change point may be determined using methods for determining the change point of an event source described in U.S. patent application Ser. No. 15/627,925, filed Jun. 20, 2017, owned by VMware, Inc., which is herein incorporated by reference.

Hypothesis testing may be used to determine if a change has occurred in the monitoring data recorded in two different periods of time. The Kolmogorov-Smirnov test is used to measure the difference between two distributions of monitoring data in the two different time periods. Empirical cumulative distributions are computed from confidence-controlled sampling of the monitoring data in the two periods of time. An empirical cumulative distribution is computed from sample empirical distributions represented in Equation (14) as follows:

$$F(X) = \sum_{i=1}^{X} q_i \qquad (22)$$

where X is an integer value in $1 \leq X \leq N$.
A maximum absolute difference between a first empirical cumulative distribution from monitoring data in the first period of time and a second empirical cumulative distribution computed from monitoring data in the second period of time is determined as follows:

$$K = \max_{X} |F_1(X) - F_2(X)| \qquad (23)$$

When the following condition is satisfied $$Th_K \geq K \qquad (24)$$

where $Th_K$ is a cumulative distribution difference threshold (e.g., $Th_K = 0.1$ or $0.05$), the distributions of monitoring data in the time periods have not changed. On the other hand, when $K > Th_K$, the distributions of monitoring data in the time periods have changed, and an alert is triggered indicating that a change occurred between the time periods.

Figure 33:
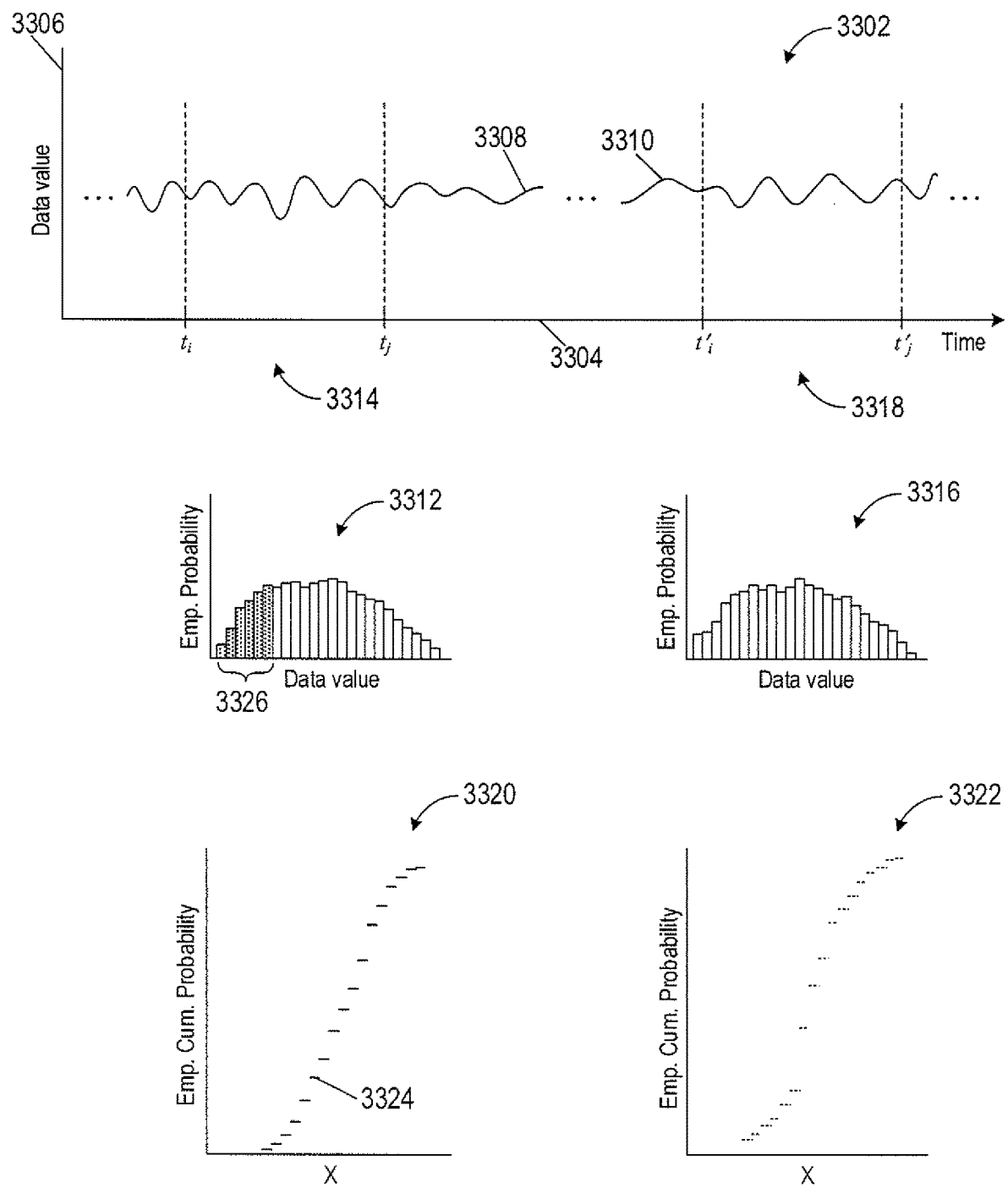
FIGS. 33-34 show an example of hypothesis testing to determine if distributions of monitoring data in two periods of time are different.
Figure 34:
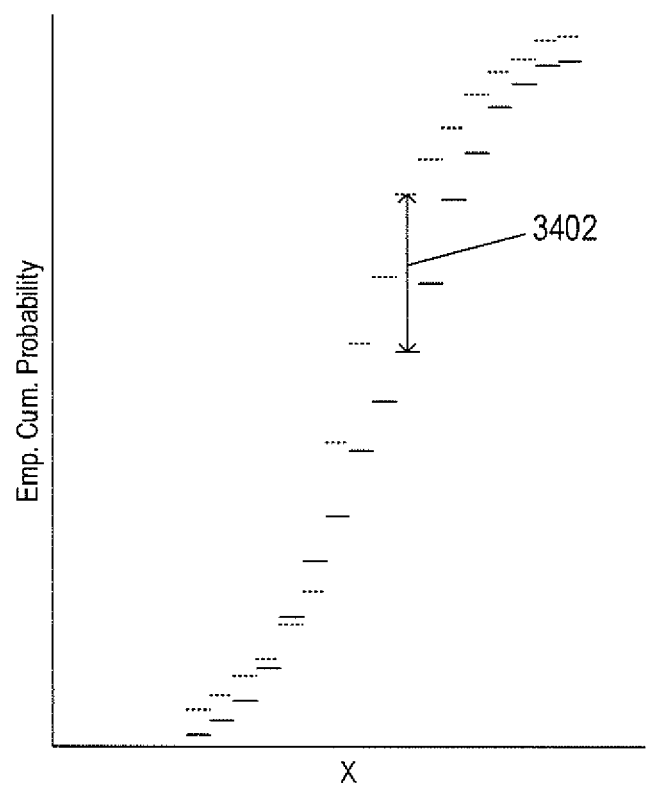

FIGS. 33-34 show an example of hypothesis testing to determine if the distributions of monitoring data in two periods of time are different. FIG. 33 shows a plot 3302 of monitoring data recorded over a long period of time. Horizontal axis 3304 represents time. Vertical axis 3306 represents a range of data values. Curves 3308 and 3310 represent different portions of the same sequence of monitoring data. An empirical distribution 3312 is generated from confidence-controlled sampling of monitoring data in the time interval $[t_i, t_j]$ 3314. An empirical distribution 3316 is generated from confidence-controlled sampling of monitoring data in the time interval [$t'_i$, $t'_j$] 3318. Equation (22) is used to compute an empirical cumulative distribution shown in plot 3320 from the empirical distribution in plot 3312 and compute an empirical cumulative distribution shown in plot 3322 from the empirical distribution 3316. Each horizontal line segment represents a cumulative sum of the empirical distribution according to Equation (22). In plot 3320, solid-line segments represent the cumulative sums of empirical distribution in plot 3312. In plot 3322, dashed-line segments represent the cumulative sums of empirical distribution in plot 3316. For example, solid line segment 3324 represents a sum of probabilities represented by shaded bars 3326 in plot 3320. FIG. 34 shows a single plot of the empirical cumulative distributions in plots 3320 and 3322 in FIG. 30. Directional arrow 3402 is the maximum absolute difference according to Equation (23).

The methods described below with reference to FIGS. 35-43 are stored in one or more data-storage devices as machine-readable instructions that when executed by one or more processors of the computer system shown in FIG. 1 perform automated confidence-controlled sampling to analyze and detect anomalies in operations of a distributed computing system.

Figure 35:
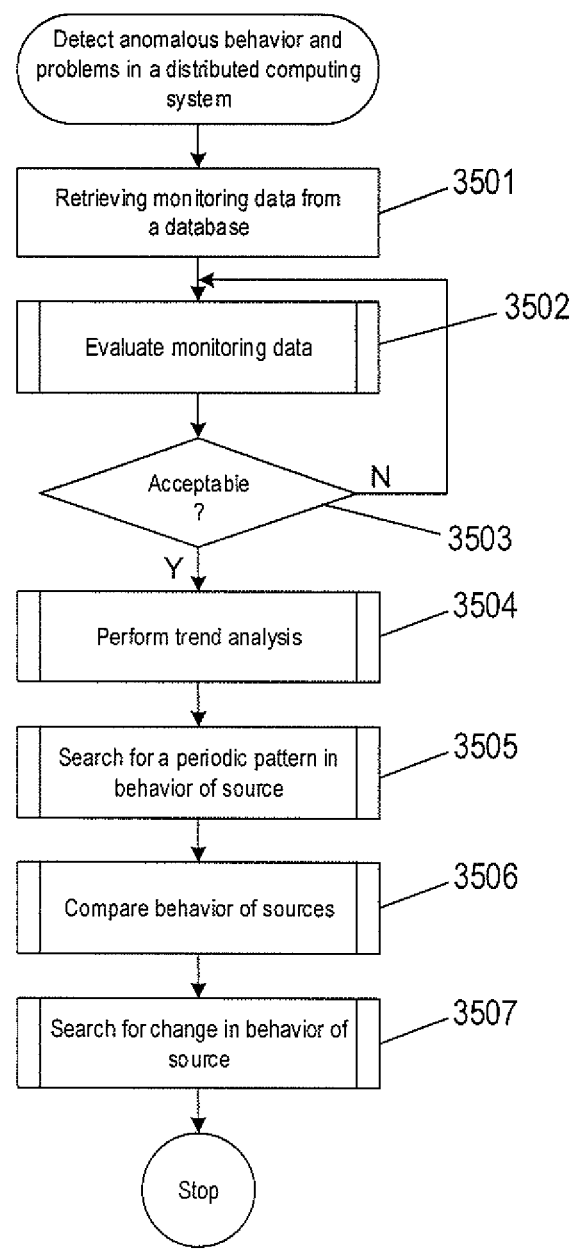
FIG. 35 shows a control-flow diagram of an automated method to detect anomalous behavior and problems in a distributed computing system.

FIG. 35 shows a control-flow diagram of an automated method to detect anomalous behavior and problems in a distributed computing system. In block 3501, monitoring data generated by a source is retrieved from a database stored in a data-storage device of a distribution computing system. The source can be a virtual or physical object or a resource of the distributed computing system or the source can be an event source running on a computer system of the distributed computing system. In block 3502, a routine "evaluate monitoring data" is called to determine if the monitoring data is normal (i.e., sufficient fraction of consecutive data points) or sparse. In decision block 3503, when the monitoring data is identified as acceptable in block 3502, control flows to block 3504. In block 3504, a routine "perform trend analysis" on the monitoring data is called. In block 3505, a routine "search for a periodic pattern in behavior of source" is called. In block 3506, a routine "compare behavior of sources" is called. In block 3507, a routine "detect change in behavior of source" between two time intervals is called.

Figure 36:
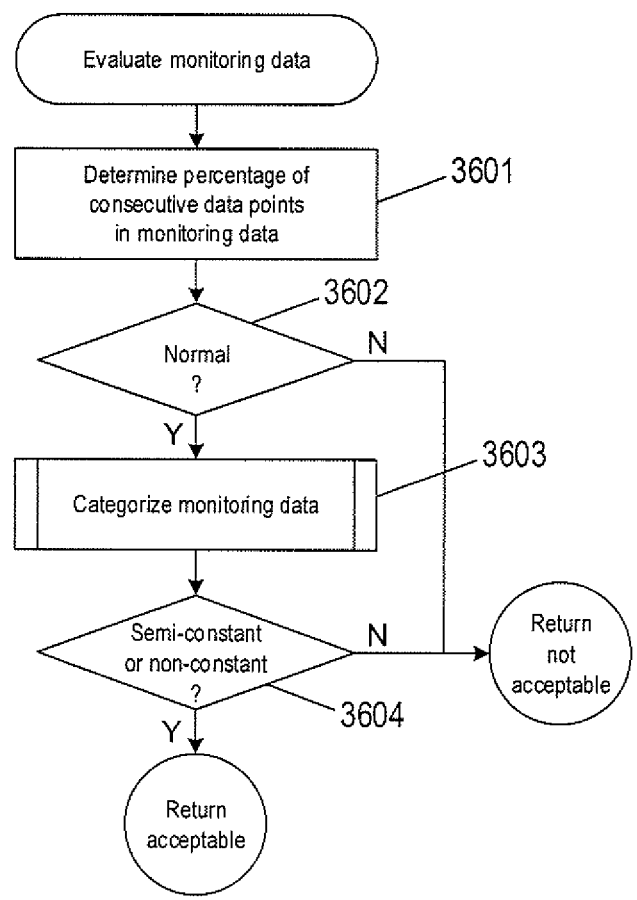
FIG. 36 shows a control-flow diagram of the routine "evaluate monitoring data" called in FIG. 35.

FIG. 36 shows a control-flow diagram of the routine "evaluate monitoring data" called in block 3502 of FIG. 35. In block 3601, a percentage of consecutive data points of the monitoring data is determined using confidence-controlled sampling monitoring data, as described above with reference to FIG. 23. The monitoring data may be characterized as normal or sparse. The monitoring interval is determined for normal monitoring data as described above with reference to FIG. 23. In decision block 3602, when the monitoring data is normal, control flows to block 3603. In block 3603, a routine "categorize monitoring data" is called to categorize the monitoring data as constant, semi-constant, or non-constant. In decision block 3604, when the monitoring data is semi-constant or constant, the routine returns that the monitoring data is acceptable for further processing. Otherwise, when the monitoring data is not acceptable or constant, the routine return the monitoring data is not acceptable.

Figure 37:
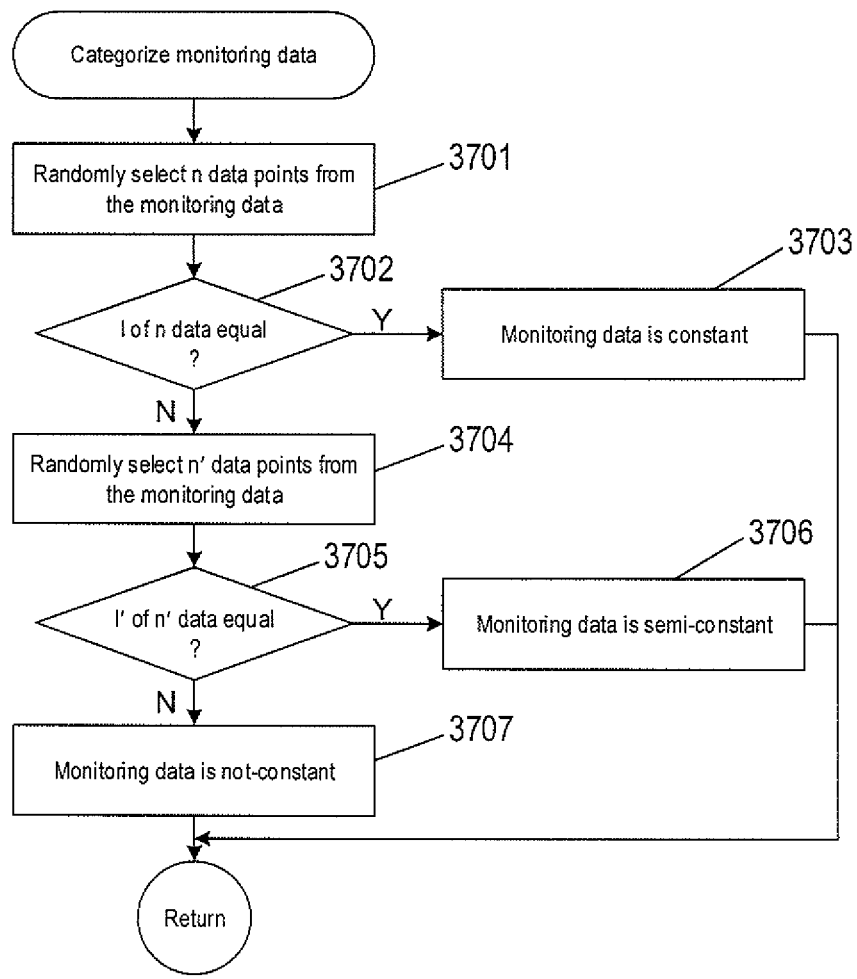
FIG. 37 shows a control-flow diagram of the routine "categorize monitoring data" called in FIG. 36.

FIG. 37 shows a control-flow diagram of the routine "categorize monitoring data" called in block 3603 of FIG. 36. In block 3701, n data points are randomly selected from the monitoring data as described above with reference to Equations (4a) and (4b) for a probability of success that corresponds to constant time series data (e.g., P=98%). In decision block 3702, when a quantity of l or more of the n data points are equal with a confidence level greater than a minimum confidence level (e.g., 99%), control flows to block 3703 and the monitoring data is identified as constant. In block 3704, n' data points are randomly selected from the monitoring data as described above with reference to Equations (4a) and (4b) for a probability of success that corresponds to semi-constant time series data (e.g., P>51%). In decision block 3705, when a quantity of l' or more of the n' data points are equal with a confidence level greater than a minimum confidence level (e.g., 99%), control flows to block 3706 and the monitoring data is identified as semi-constant. In block 3707, the monitoring data is identified as non-constant.

Figure 38:
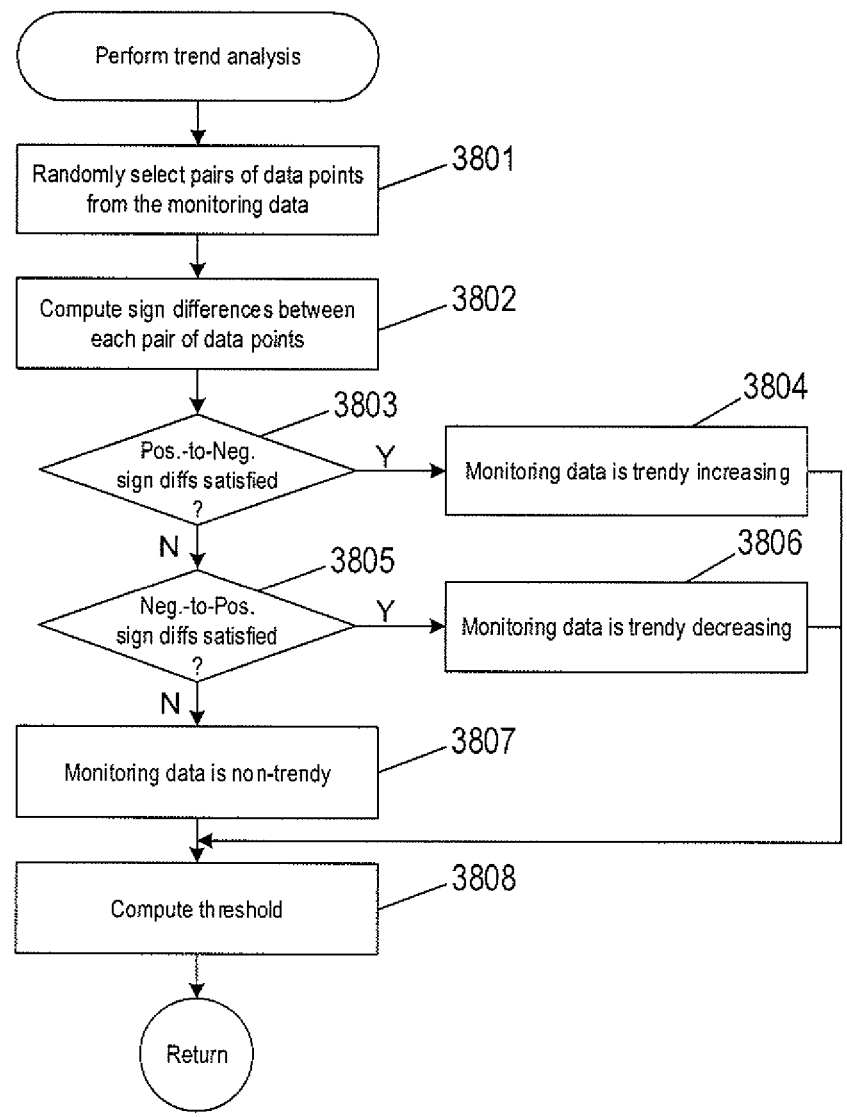
FIG. 38 shows a control-flow diagram of the routine "perform trend analysis" called in block 3504.

FIG. 38 shows a control-flow diagram of the routine "perform trend analysis" called in block 3504 of FIG. 35. In block 3801, n pairs of the monitoring data are randomly selected from the monitoring data for a probability of success P, as described above with reference to FIG. 25A. For example, the probability of success may be 60% positive sign differences to 40% sign differences. The number of pairs n selected is the minimum number of pairs of data points for a ratio of positive-to-negative sign differences defined for trendy increasing data or defined for trendy decreasing data using Equations (4a) and (4b) with a minimum confidence level. In block 3802, sign differences are computed for each pair of the n randomly selected monitoring data in Equation (7) and FIG. 25B. In decision block 3803, when the number of positive sign differences l of the n pairs of monitoring data is greater than a minimum confidence level, control flows to block 3804. In block 3804, the monitoring data is identified as trendy increasing monitoring data. In decision block 3805, when the number of negative sign differences l of the n pairs of monitoring data is greater than a minimum confidence level, control flows to block 3806. In block 3806, the monitoring data is identified as trendy decreasing monitoring data. In block 3807, the monitoring data is characterized as non-trendy monitoring data. In block 3808, thresholds are computed for the monitoring data based on the confidence-controlled samples. If the monitoring data is trendy and periodic, then dynamic thresholds may be computed. If the monitoring data is non-trendy, hard thresholds may be computed.

Figure 39:
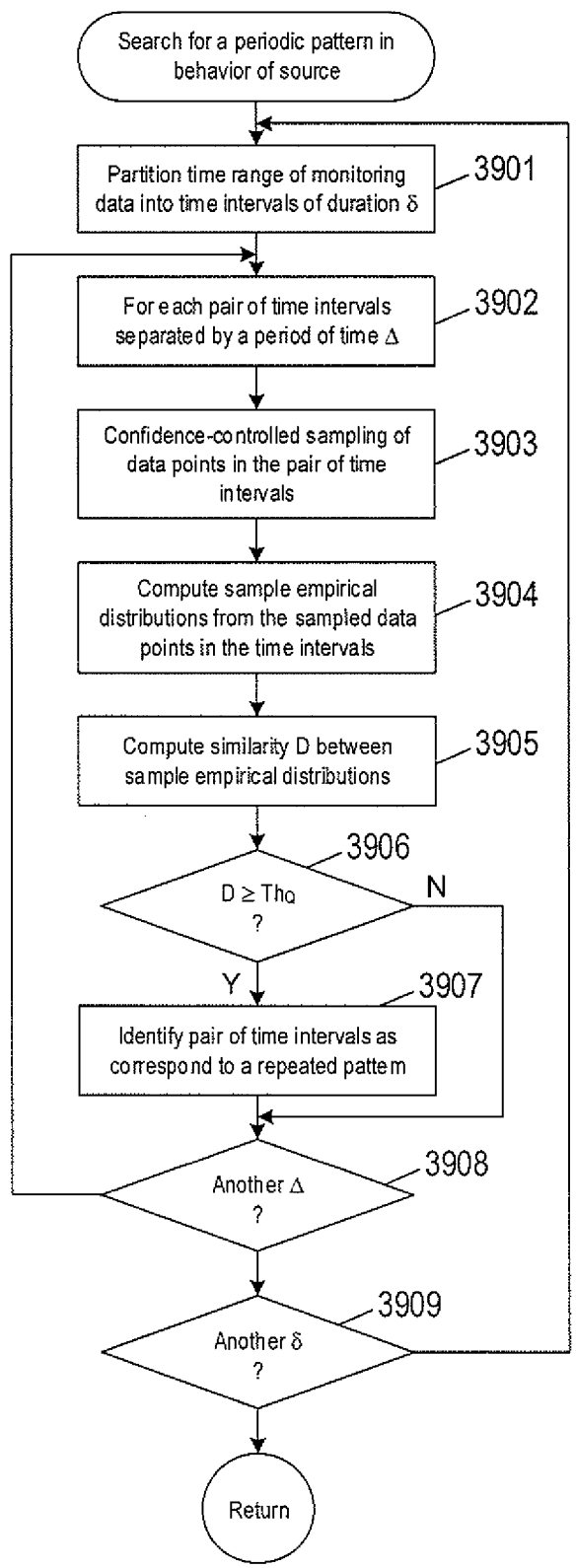
FIG. 39 shows a control-flow diagram of the routine "search for a periodic pattern in behavior of source" called in FIG. 35.

FIG. 39 shows a control-flow diagram of the routine "search for a periodic pattern in behavior of source" called in block 3505 of FIG. 35. In block 3901, a time range of the monitoring data is partitioned into time intervals of duration δ as described above with reference to FIG. 28A. A loop beginning with block 3902, repeats the represented by blocks 3903-3908 for each pair of time intervals separated by a period of time Δ. In block 3903, confidence-controlled sampling is applied to data points in each pair of time intervals. In block 3904, sample empirical distributions are computed from the sampled data points in each pair of time intervals as described above with reference to Equation (14) and FIG. 28B. In block 3905, a similarity $D$ is computed for the sample empirical distributions as described above with reference to Equations (15) and (16). In decision block 3906, when the similarity is greater than a similarity threshold, control flows to block 3907. Otherwise, control flows to decision block 3908. In block 3907, the pair of time intervals are identified as periodic with period of time Δ. In decision block 3908, blocks 3902-3907 are repeated for another period of time Δ. In decision block 3908, blocks 3901-3908 are repeated for another time interval duration δ.

Figure 40:
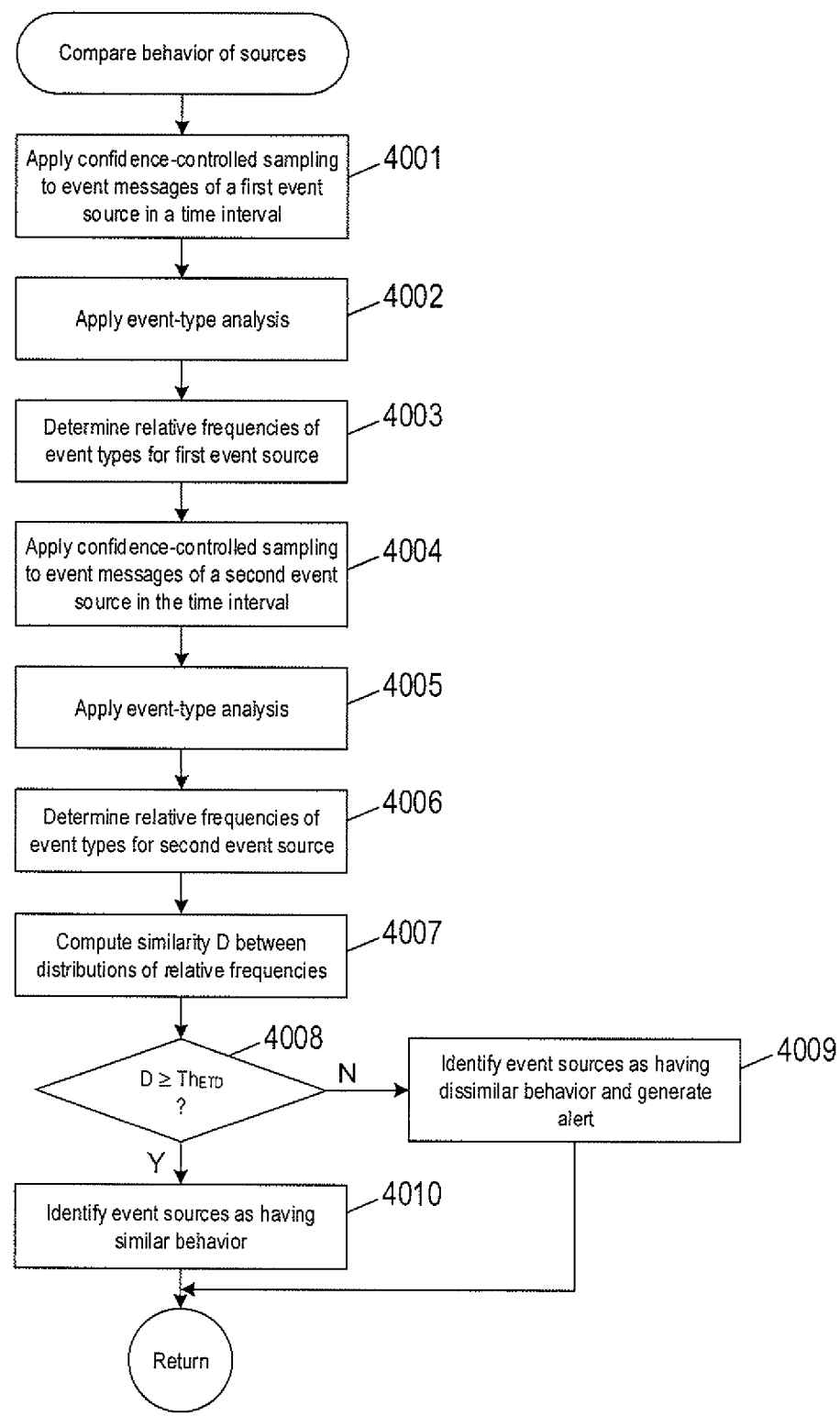
FIG. 40 shows a control-flow diagram of the routine "compare behavior of sources" called in FIG. 35.

FIG. 40 shows a control-flow diagram of the routine "compare behavior of sources" called in block 3506 of FIG. 35. FIG. 40 compares the behavior of two event sources based on event messages generated by the two event sources in the same time interval. In block 4001, confidence-controlled sampling is applied event messages of first event source in a time interval, as described above with reference to FIG. 30. In block 4002, even-type analysis is applied to the event messages to determine even types, as described above with reference to FIG. 18. In block 4003, relative frequencies of the event types are computed as described above with reference to Equation (21). In block 4004, confidence-controlled sampling is applied event messages of second event source in the same time interval, as described above with reference to FIG. 30. In block 4005, even-type analysis is applied to the event messages to determine even types, as described above with reference to FIG. 18. In block 4006, relative frequencies of the event types are computed as described above with reference to Equation (21). In block 4007, a similarity $D$ is computed for the relative frequencies as described above with reference to Equations (15) and (16). In decision block 4008, when the similarity $D$ satisfies the condition given by Equation (21), control flows to block 4010. Otherwise, control flows to block 4009. In block 4009, the event sources are identified as behaving dissimilar and an alert may be generated identifying the event sources. In block 4010, the event sources are identified as behaving similar.

Figure 41:
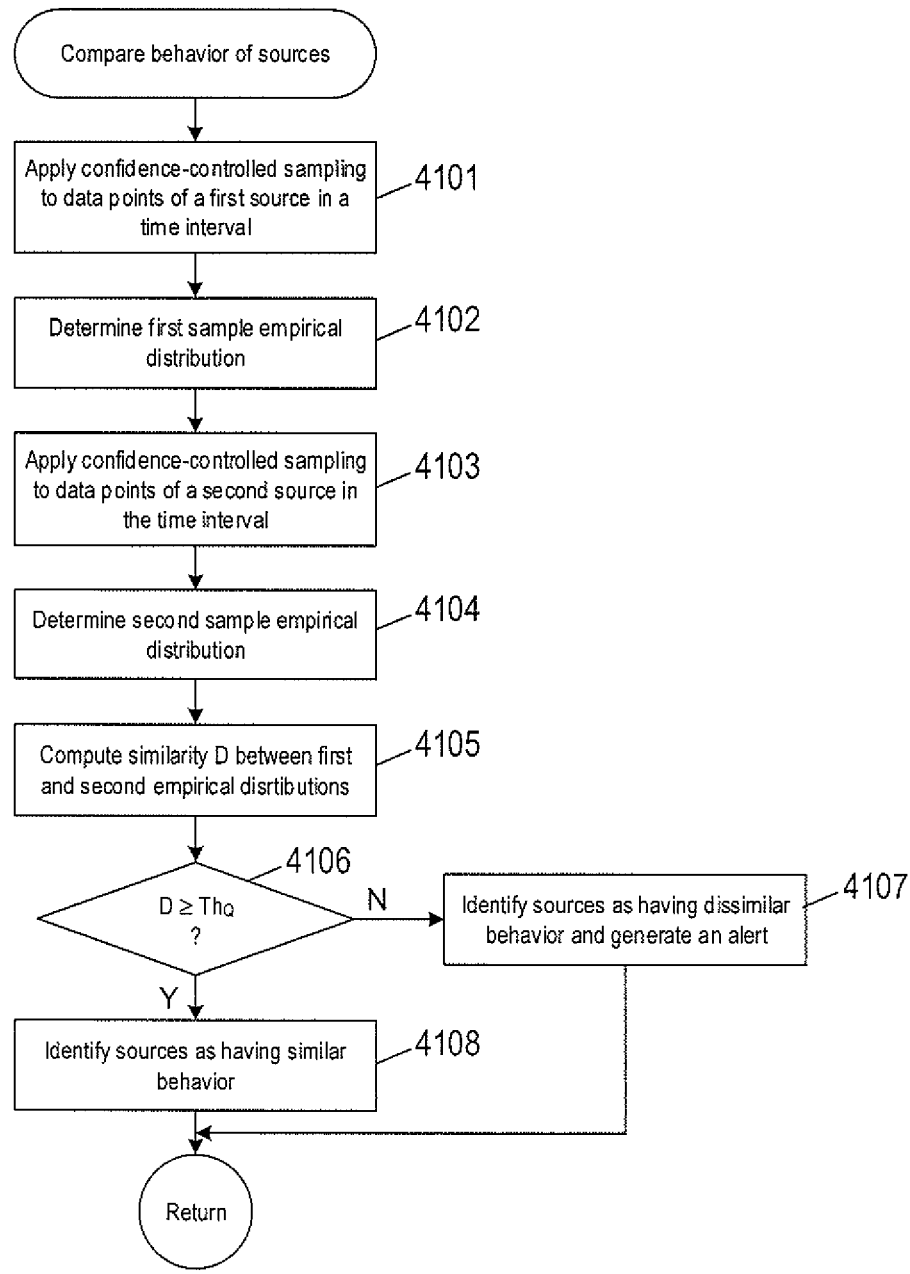
FIG. 41 shows a control-flow diagram of the routine "compare behavior of sources" called in FIG. 35.

FIG. 41 shows a control-flow diagram of the routine "compare behavior of sources" called in block 3506 of FIG. 35. FIG. 41 compares the behavior of two monitoring data sources based on monitoring data generated by the two sources in the same time interval. In block 4101, confidence-controlled sampling is applied to monitoring data of a first source in a time interval, as described above with reference to FIG. 29A. In block 4102, a first sample empirical distribution is computed from the samples of data points, as described above with reference to FIG. 29A. In block 4101, confidence-controlled sampling is applied to monitoring data of a second source in the same time interval, as described above with reference to FIG. 29B. In block 4102, a second sample empirical distribution is computed from the samples of data points, as described above with reference to FIG. 29B. In block 4105, a similarity $D$ is computed for the first and second empirical distributions, as described above with reference to Equations (15) and (16). In decision block 4106, when the similarity $D$ satisfies the condition given by Equation (18), control flows to block 4107. Otherwise, control flows to block 4108. In block 4107, the sources are identified as behaving dissimilar and an alert may be generated identifying the sources. In block 4108, the sources are identified as behaving similar.

Figure 42:
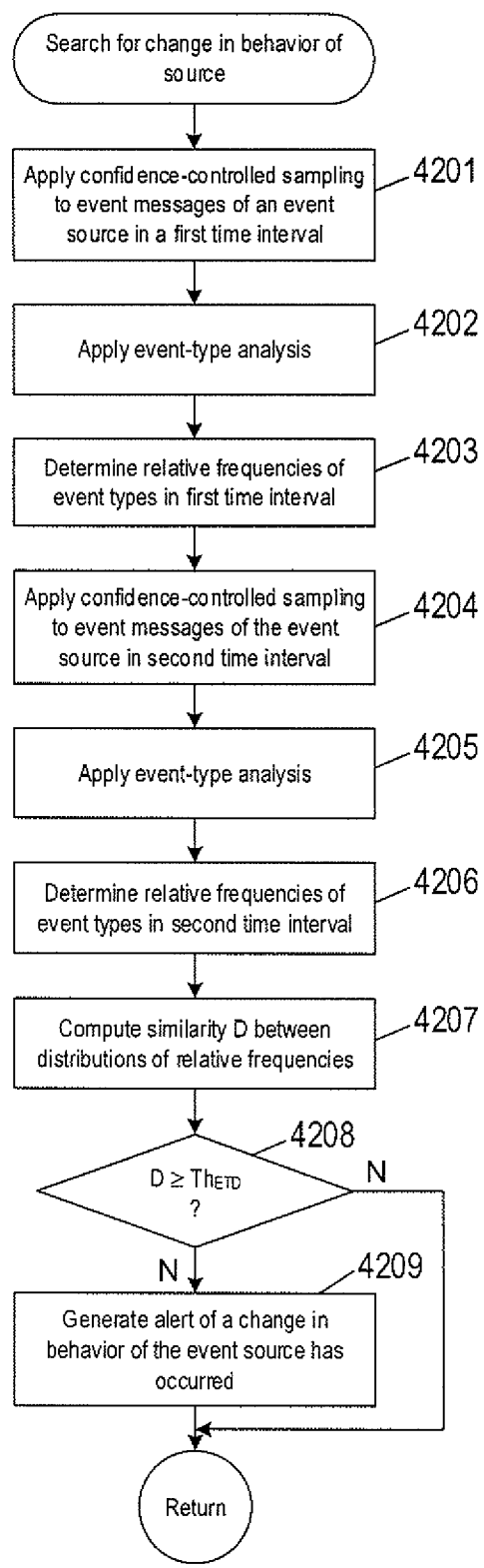
FIG. 42 shows a control-flow diagram of the routine "search for change in behavior of source" called in FIG. 35.

FIG. 42 shows a control-flow diagram of the routine "search for change in behavior of source" between two time intervals called in block 3507 of FIG. 35. FIG. 42 compares the behavior of event messages generated by the same sources two different time interval to detect a change in behavior. In block 4201, confidence-controlled sampling is applied to event messages of an event source in a time interval, as described above with reference to FIG. 32. In block 4202, even-type analysis is applied to the event messages to determine even types, as described above with reference to FIG. 18. In block 4203, relative frequencies of the event types are computed as described above with reference to Equation (20). In block 4204, confidence-controlled sampling is applied to event messages of the event source in a later occurring second time interval, as described above with reference to FIG. 32. In block 4205, even-type analysis is applied to the event messages to determine even types as described above with reference to FIG. 18. In block 4206, relative frequencies of the event types are computed as described above with reference to Equation (20). In block 4207, a similarity $D$ is computed for the relative frequencies in the two time intervals as described above with reference to Equations (15) and (16). In decision block 4208, when the similarity $D$ does not satisfy the condition given by Equation (20), control flows to block 4209. In block 4209, an alert is generated indicating that a change in behavior of the event source has occurred.

Figure 43:
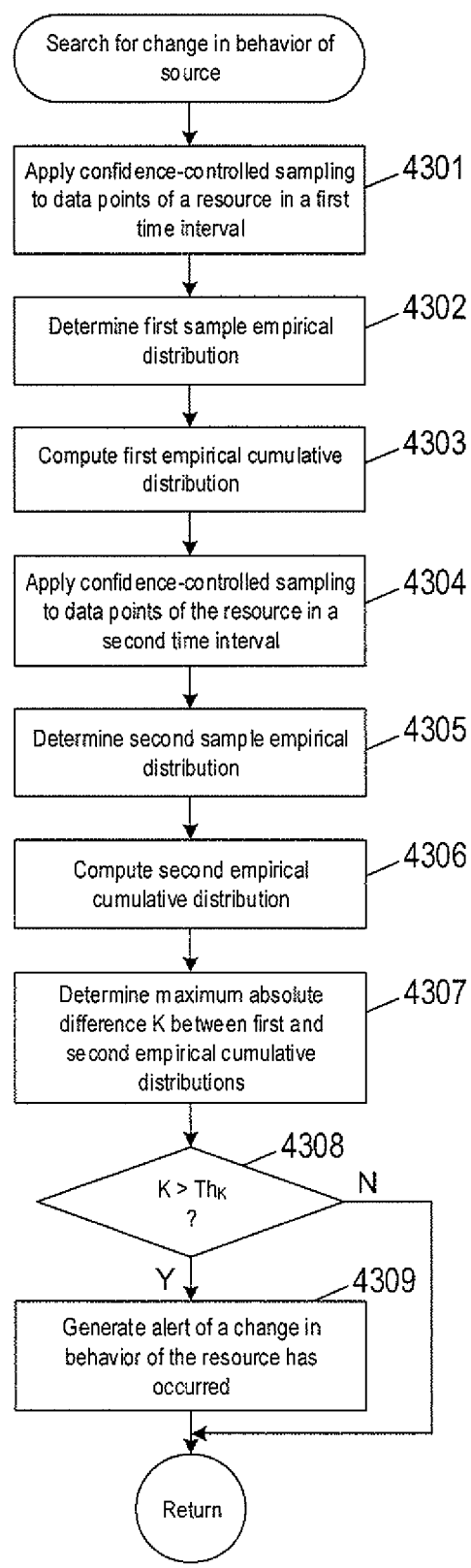
FIG. 43 shows a control-flow diagram of the routine "search for change in behavior of source" called in FIG. 35.

FIG. 43 shows a control-flow diagram of the routine "search for change in behavior of source" between two time intervals called in block 3507 of FIG. 35. FIG. 43 compares the behavior of a sources based on monitoring data generated in two different time intervals to detect a change in behavior. In block 4301, confidence-controlled sampling is applied to monitoring data generated by a source in a first time interval, as described above with reference to FIG. 33. In block 4302, a first sample empirical distribution is computed from the samples of data points, as described above with reference to FIG. 33. In block 4303, a first empirical cumulative distribution is computed from the first sample empirical distribution as described above with reference to FIG. 33. In block 4304, confidence-controlled sampling is applied to monitoring data generated by a source in a later occurring second time interval, as described above with reference to FIG. 33. In block 4305, a second sample empirical distribution is computed from the samples of data points, as described above with reference to FIG. 33. In block 4306, a second empirical cumulative distribution is computed from the first sample empirical distribution as described above with reference to FIG. 33. In block 4307, a maximum absolute difference K is determined between the first and second empirical cumulative distributions, as described above with reference Equation (23) and FIG. 34. In decision block 4308, when the maximum absolute difference K is greater than a cumulative distribution difference threshold, control flows to block 4309. In block 4309, an alert is generated indicating that a change in behavior of the source has occurred.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated method stored in one or more data-storage devices and executed using one or more processors of a computer system to analyze the behavior of a distributed computing system, the method comprising:

reading a sequence of monitoring data from a database stored in a data-storage device of a distributed computing system, the monitoring data generated by a first source in the distributed computing system;

evaluating the monitoring data to determine a monitoring interval of the monitoring data and if the monitoring data is normal or sparse based on confidence-controlled sampling of the monitoring data, wherein confidence-controlled sampling of the monitoring data includes randomly selecting monitoring data points of the monitoring data based on a selected confidence level;

when the monitoring data is normal, searching for a periodic pattern in behavior of the first source based on repeated confidence-controlled sampling of the monitoring data in two different time intervals separated by a period of time;

searching for a change in behavior of the first source based on a similarity of the monitoring data computed from confidence-controlled samples of the monitoring data in two different time intervals;

displaying an alert in a graphical user interface of an administrative console when a periodic pattern in the behavior of the first source is discovered; and displaying an alert in the graphical user interface of the administrative console when a change in behavior of the first source is detected.

2. The method of claim 1 further comprises when the monitoring data is normal, confidence-controlled sampling of the monitoring data based on a probability of success of increasing-to-decreasing monitoring data to obtain random samples of the monitoring data;

performing trend analysis on the samples of monitoring data to determine if the monitoring data is trendy or non-trendy monitoring data;

computing a threshold for the monitoring data based on the trendy or non-trendy samples of monitoring data; and displaying an alert in the graphical user interface of the administrative console, the alert indicating the first source is exhibiting anomalous behavior when the monitoring data violates the threshold.

3. The method of claim 1 further comprises when the monitoring data is normal, confidence-controlled sampling of the monitoring data in a time interval to obtain random samples of the monitoring data in the time interval;

confidence-controlled sampling of a second sequence of monitoring data generated by a second source in the time interval to obtain random samples of the second sequence of monitoring data in the time interval;

determining a correlation between the first source and the second source based on the random samples of the monitoring data and the random samples of the second source of monitoring data; and displaying a notice in the graphical user interface of the administrative console regarding correlation of the first source and the second source based on the correlation.

4. The method of claim 1 wherein evaluating the monitoring data comprises:

confidence-controlled sampling of time-stamp differences between data points of the monitoring data in the monitoring interval based on a probability of success that corresponds to a percentage of consecutive data points in the monitoring interval;

when more than half of the sampled time-stamp differences in the monitoring interval are equal,
identifying the monitoring data as normal, and
determining a monitoring interval as a time interval between the more than half sampled time-stamp differences that are equal;

identifying the monitoring data as sparse when less than half of the sampled time-stamp differences in the monitoring interval are equal; and when the monitoring data is normal, categorizing the monitoring data as constant, near-constant, semi-constant, or non-constant based on confidence-controlled sampling of the monitoring data.

5. The method of claim 1 wherein searching for the periodic pattern in behavior of the first source comprises:

partitioning time range of the monitoring data into time intervals; and for each pair of time intervals separated by the period of time,
confidence-controlled sampling of the monitoring data in each of the time intervals,
computing a first sample empirical distribution from values of sample data points in one of the time intervals,
computing a second sample empirical distribution from values of sample data points in one of the time intervals,
computing a similarity between the first and second sample empirical distribution, and
when the similarity is greater than an empirical distribution similarity threshold, identifying the pair of time intervals as corresponding to a periodic pattern in the behavior of the first source.

6. The method of claim 1 wherein searching for the change in behavior of the first source comprises:

confidence-controlled sampling of the monitoring data in a first time interval;

computing a first sample empirical distribution from values of sample data points in the first time interval;

computing a first empirical cumulative distribution based on the first sample empirical distribution;

confidence-controlled sampling of the monitoring data in a second time interval;

computing a second sample empirical distribution from values of sample data points in the second time interval;

computing a second empirical cumulative distribution based on the second sample empirical distribution;

determining a maximum absolute difference between the first and second empirical cumulative distributions; and when the similarity is greater than a cumulative distribution difference threshold, displaying an alert in the graphical user interface of the administrative console, the alert indicating that behavior of the first source has changed.

7. The method of claim 1 further comprises:

confidence-controlled sampling of event messages generated by the first source in a time interval;

determine event types of event messages generated by the first source;

determine relative frequencies of the event types generated by the first source;

confidence-controlled sampling of event messages generated by a second source in the time interval;

determine event types of event messages generated by the second source;

determine relative frequencies of the event types generated by the second source;

computing a similarity based on relative frequencies of the event types generated by the first source and the second source; and when the similarity is greater than an event-type distribution similarity threshold, displaying an alert in the graphical user interface of the administrative console, the alert indicating that the first source and second source have dissimilar behavior.

8. The method of claim 1 further comprises:

confidence-controlled sampling of event messages generated by the first source in a first time interval;

determine event types of event messages in the first time interval;

determine relative frequencies of the event types in the first time interval;

confidence-controlled sampling of event messages generated by the first source in a second time interval;

determine event types of event messages in the second time interval;

determine relative frequencies of the event types in the second time interval;

computing a similarity based on relative frequencies of the event types in the first and second time intervals; and when the similarity is greater than an event-type distribution similarity threshold, displaying an alert in the graphical user interface of the administrative console, the alert indicating a change in behavior of the first source.

9. A system to analyze behavior of a distributed computing system, the system comprising:

one or more processors;

one or more data-storage devices; and machine-readable instructions stored in the one or more data-storage devices that when executed using the one or more processors controls the system to perform operations comprising:

reading a sequence of monitoring data from a database stored in a data-storage device of a distributed computing system, the monitoring data generated by a first source in the distributed computing system;

evaluating the monitoring data to determine a monitoring interval of the monitoring data and if the monitoring data is normal or sparse based on confidence-controlled sampling of the monitoring data, wherein confidence-controlled sampling of the monitoring data includes randomly selecting monitoring data points of the monitoring data based on a selected confidence level;

when the monitoring data is normal, searching for a periodic pattern in behavior of the first source based on repeated confidence-controlled sampling of the monitoring data in two different time intervals separated by a period of time;

searching for a change in behavior of the first source based on a similarity of the monitoring data computed from confidence-controlled samples of the monitoring data in two different time intervals;

displaying an alert in a graphical user interface of an administrative console when a periodic pattern in the behavior of the first source is discovered; and displaying an alert in the graphical user interface of the administrative console when a change in behavior of the first source is detected.

10. The system of claim 9 further comprises when the monitoring data is normal, confidence-controlled sampling of the monitoring data based on a probability of success of increasing-to-decreasing monitoring data to obtain random samples of the monitoring data;

performing trend analysis on the samples of monitoring data to determine if the monitoring data is trendy or non-trendy monitoring data;

computing a threshold for the monitoring data based on the trendy or non-trendy samples of monitoring data; and displaying an alert in the graphical user interface of the administrative console, the alert indicating the first source is exhibiting anomalous behavior when the monitoring data violates the threshold.

11. The system of claim 9 further comprises when the monitoring data is normal, confidence-controlled sampling of the monitoring data in a time interval to obtain random samples of the monitoring data in the time interval;

confidence-controlled sampling of a second sequence of monitoring data generated by a second source in the time interval to obtain random samples of the second sequence of monitoring data in the time interval;

determining a correlation between the first source and the second source based on the random samples of the monitoring data and the random samples of the second source of monitoring data; and displaying a notice in the graphical user interface of the administrative console regarding correlation of the first source and the second source based on the correlation.

12. The system of claim 9 wherein evaluating the monitoring data comprises:

confidence-controlled sampling of time-stamp differences between data points of the monitoring data based on a probability of success that corresponds to a percentage of consecutive data points in the monitoring interval;

when more than half of the sampled time-stamp differences in the monitoring interval are equal identifying the monitoring data as normal;

determining a monitoring interval as a time interval between the more than half sampled time-stamp differences that are equal;

identifying the monitoring data as sparse when less than half of the sampled time-stamp differences in the monitoring interval are equal; and when the monitoring data is normal, categorizing the monitoring data as constant, near-constant, semi-constant, or non-constant based on confidence-controlled sampling of the monitoring data.

13. The system of claim 9 wherein searching for the periodic pattern in behavior of the first source comprises:

partitioning time range of the monitoring data into time intervals; and for each pair of time intervals separated by the period of time, confidence-controlled sampling of the monitoring data in each of the time intervals, computing a first sample empirical distribution from values of sample data points in one of the time intervals, computing a second sample empirical distribution from values of sample data points in one of the time intervals, computing a similarity between the first and second sample empirical distribution, and when the similarity is greater than an empirical distribution similarity threshold, identifying the pair of time intervals as corresponding to a periodic pattern in the behavior of the first source.

14. The system of claim 9 wherein searching for the change in behavior of the first source comprises:

confidence-controlled sampling of the monitoring data in a first time interval;

computing a first sample empirical distribution from values of sample data points in the first time interval;

computing a first empirical cumulative distribution based on the first sample empirical distribution;

confidence-controlled sampling of the monitoring data in a second time interval;
computing a second sample empirical distribution from values of sample data points in the second time interval;
computing a second empirical cumulative distribution based on the second sample empirical distribution;
determining a maximum absolute difference between the first and second empirical cumulative distributions; and
when the similarity is greater than a cumulative distribution difference threshold, displaying an alert in the graphical user interface of the administrative console, the alert indicating that behavior of the first source has changed.

15. The system of claim 9 further comprises:
confidence-controlled sampling of event messages generated by the first source in a time interval;
determine event types of event messages generated by the first source;
determine relative frequencies of the event types generated by the first source;
confidence-controlled sampling of event messages generated by a second source in the time interval;
determine event types of event messages generated by the second source;
determine relative frequencies of the event types generated by the second source;
computing a similarity based on relative frequencies of the event types generated by the first source and the second source; and
when the similarity is greater than an event-type distribution similarity threshold, displaying an alert in the graphical user interface of the administrative console, the alert indicating that the first source and second source have dissimilar behavior.

16. The system of claim 9 further comprises:
confidence-controlled sampling of event messages generated by the first source in a first time interval;
determine event types of event messages in the first time interval;
determine relative frequencies of the event types in the first time interval;
confidence-controlled sampling of event messages generated by the first source in a second time interval;
determine event types of event messages in the second time interval;
determine relative frequencies of the event types in the second time interval;
computing a similarity based on relative frequencies of the event types in the first and second time intervals; and
when the similarity is greater than an event-type distribution similarity threshold, displaying an alert in the graphical user interface of the administrative console, the alert indicating a change in behavior of the first source.

17. A non-transitory computer-readable medium encoded with machine-readable instructions that implement a method carried out by one or more processors of a computer system to perform the operations comprising:
reading a sequence of monitoring data from a database stored in a data-storage device of a distributed computing system, the monitoring data generated by a first source in the distributed computing system;
evaluating the monitoring data to determine a monitoring interval of the monitoring data and if the monitoring data is normal or sparse based on confidence-controlled sampling of the monitoring data, wherein confidence-controlled sampling of the monitoring data includes randomly selecting monitoring data points of the monitoring data based on a selected confidence level;
when the monitoring data is normal,
searching for a periodic pattern in behavior of the first source based on repeated confidence-controlled sampling of the monitoring data in two different time intervals separated by a period of time;
searching for a change in behavior of the first source based on a similarity of the monitoring data computed from confidence-controlled samples of the monitoring data in two different time intervals;
displaying an alert in a graphical user interface of an administrative console when a periodic pattern in the behavior of the first source is discovered; and
displaying an alert in the graphical user interface of the administrative console when a change in behavior of the first source is detected.

18. The medium of claim 17 further comprises when the monitoring data is normal,
confidence-controlled sampling of the monitoring data based on a probability of success of increasing-to-decreasing monitoring data to obtain random samples of the monitoring data;
performing trend analysis on the samples of monitoring data to determine if the monitoring data is trendy or non-trendy monitoring data;
computing a threshold for the monitoring data based on the trendy or non-trendy samples of monitoring data; and
displaying an alert in the graphical user interface of the administrative console, the alert indicating the first source is exhibiting anomalous behavior when the monitoring data violates the threshold.

19. The medium of claim 17 further comprises when the monitoring data is normal,
confidence-controlled sampling of the monitoring data in a time interval to obtain random samples of the monitoring data in the time interval;
confidence-controlled sampling of a second sequence of monitoring data generated by a second source in the time interval to obtain random samples of the second sequence of monitoring data in the time interval;
determining a correlation between the first source and the second source based on the random samples of the monitoring data and the random samples of the second source of monitoring data; and
displaying a notice in the graphical user interface of the administrative console regarding correlation of the first source and the second source based on the correlation.

20. The medium of claim 17 wherein evaluating the monitoring data comprises:
confidence-controlled sampling of time-stamp differences between data points of the monitoring data based on a probability of success that corresponds to a percentage of consecutive data points in the monitoring interval;
when more than half of the sampled time-stamp differences are equal,
identifying the monitoring data as normal;
determining a monitoring interval as a time interval between the more than half sampled time-stamp differences that are equal;
identifying the monitoring data as sparse when less than half of the sampled time-stamp differences in the monitoring interval are equal; and when the monitoring data is normal, categorizing the monitoring data as constant, near-constant, semi-constant, or non-constant based on confidence-controlled sampling of the monitoring data.

21. The medium of claim 17 wherein searching for the periodic pattern in behavior of the first source comprises:
partitioning time range of the monitoring data into time intervals; and
for each pair of time intervals separated by the period of time,
confidence-controlled sampling of the monitoring data in each of the time intervals,
computing a first sample empirical distribution from values of sample data points in one of the time intervals,
computing a second sample empirical distribution from values of sample data points in one of the time intervals,
computing a similarity between the first and second sample empirical distribution, and
when the similarity is greater than an empirical distribution similarity threshold, identifying the pair of time intervals as corresponding to a periodic pattern in the behavior of the first source.

22. The medium of claim 17 wherein searching for the change in behavior of the first source comprises:
confidence-controlled sampling of the monitoring data in a first time interval;
computing a first sample empirical distribution from values of sample data points in the first time interval;
computing a first empirical cumulative distribution based on the first sample empirical distribution;
confidence-controlled sampling of the monitoring data in a second time interval;
computing a second sample empirical distribution from values of sample data points in the second time interval;
computing a second empirical cumulative distribution based on the second sample empirical distribution;
determining a maximum absolute difference between the first and second empirical cumulative distributions; and
when the similarity is greater than a cumulative distribution difference threshold, displaying an alert in the graphical user interface of the administrative console, the alert indicating that behavior of the first source has changed.

23. The medium of claim 17 further comprises:
confidence-controlled sampling of event messages generated by the first source in a time interval;
determine event types of event messages generated by the first source;
determine relative frequencies of the event types generated by the first source;
confidence-controlled sampling of event messages generated by a second source in the time interval;
determine event types of event messages generated by the second source;
determine relative frequencies of the event types generated by the second source;
computing a similarity based on relative frequencies of the event types generated by the first source and the second source; and
when the similarity is greater than an event-type distribution similarity threshold, displaying an alert in the graphical user interface of the administrative console, the alert indicating that the first source and second source have dissimilar behavior.

24. The medium of claim 17 further comprises:
confidence-controlled sampling of event messages generated by the first source in a first time interval;
determine event types of event messages in the first time interval;
determine relative frequencies of the event types in the first time interval;
confidence-controlled sampling of event messages generated by the first source in a second time interval;
determine event types of event messages in the second time interval;
determine relative frequencies of the event types in the second time interval;
computing a similarity based on relative frequencies of the event types in the first and second time intervals; and
when the similarity is greater than an event-type distribution similarity threshold, displaying an alert in the graphical user interface of the administrative console, the alert indicating a change in behavior of the first source.

* * * * *